(12) United States Patent
Lundberg

(10) Patent No.: US 11,714,839 B2
(45) Date of Patent: *Aug. 1, 2023

(54) APPARATUS AND METHOD FOR AUTOMATED AND ASSISTED PATENT CLAIM MAPPING AND EXPENSE PLANNING

(71) Applicant: Black Hills IP Holdings, LLC, Minneapolis, MN (US)

(72) Inventor: Steven W. Lundberg, Edina, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/125,979

(22) Filed: Dec. 17, 2020

(65) Prior Publication Data

US 2021/0173858 A1    Jun. 10, 2021

Related U.S. Application Data

(63) Continuation of application No. 15/722,868, filed on Oct. 2, 2017, now Pat. No. 10,885,078, which is a
(Continued)

(51) Int. Cl.
*G06F 16/00* (2019.01)
*G06F 16/332* (2019.01)
(Continued)

(52) U.S. Cl.
CPC ........ *G06F 16/3326* (2019.01); *G06F 16/338* (2019.01); *G06F 16/3329* (2019.01);
(Continued)

(58) Field of Classification Search
CPC ........... G06F 16/3323; G06F 16/90335; G06F 16/3322; G06F 16/3344; G06F 16/958;
(Continued)

(56) References Cited

U.S. PATENT DOCUMENTS 4,807,154 A 2/1989 Scully et al.
4,868,733 A 9/1989 Fujisawa et al.
(Continued)

FOREIGN PATENT DOCUMENTS

AU    2006272510        2/2012
AU    2012266701 B2     5/2014
(Continued)

OTHER PUBLICATIONS

Peter Schöhofen, "Annotating Documents by Wikipedia Concepts", 2008 IEEE/WIC/ACM International Conference on Web Intelligence and Intelligent Agent Technology, Dec. 2008, pp. 461-467.*
(Continued)

*Primary Examiner* — Srirama Channavajjala
(74) *Attorney, Agent, or Firm* — Schwegman Lundberg & Woessner, P.A.

(57) ABSTRACT

An apparatus and computer implemented method that include obtaining, into a computer, text of a patent, automatically finding and extracting, using the computer, a set of claim text from the patent text, identifying, using the computer, text of independent claims from the set of claim text, displaying in a first row on a computer monitor the text of the independent claims, automatically determining a plurality of preliminary scope-concept phrases from the text of the independent claims, displaying in a second row on the computer monitor the text of the plurality of preliminary scope-concept phrases, eliciting and receiving user input to specify a first one of the plurality of preliminary scope-concepts phrases, and highlighting each occurrence of the specified first one of the plurality of preliminary scope-concept phrases in a plurality of the independent claims displayed in the first row. A scope concept builder tool is also provided.

20 Claims, 32 Drawing Sheets

Related U.S. Application Data continuation of application No. 13/464,598, filed on May 4, 2012, now Pat. No. 9,904,726.

(60) Provisional application No. 61/561,502, filed on Nov. 18, 2011, provisional application No. 61/542,515, filed on Oct. 3, 2011, provisional application No. 61/482,596, filed on May 4, 2011.

(51) Int. Cl.
| | |
|---|---|
| *G06F 16/338* | (2019.01) |
| *G06F 16/34* | (2019.01) |
| *G06F 16/33* | (2019.01) |
| *G06Q 10/00* | (2023.01) |
| *G06F 16/35* | (2019.01) |
| *G06F 16/901* | (2019.01) |
| *G06F 16/951* | (2019.01) |
| *G06F 40/289* | (2020.01) |
| *G06F 16/40* | (2019.01) |
| *G06F 16/36* | (2019.01) |
| *G06F 16/93* | (2019.01) |
| *G06F 40/247* | (2020.01) |
| *G06F 40/30* | (2020.01) |
| *G09G 5/00* | (2006.01) |

(52) U.S. Cl.
CPC ........ *G06F 16/3344* (2019.01); *G06F 16/345* (2019.01); *G06F 16/35* (2019.01); *G06F 16/374* (2019.01); *G06F 16/40* (2019.01); *G06F 16/9017* (2019.01); *G06F 16/93* (2019.01); *G06F 16/951* (2019.01); *G06F 40/247* (2020.01); *G06F 40/289* (2020.01); *G06F 40/30* (2020.01); *G06Q 10/00* (2013.01); *G09G 5/00* (2013.01)

(58) Field of Classification Search
CPC ...... G06F 16/3326; G06F 16/40; G06F 16/93; G06F 16/35; G06F 16/374; G06F 16/3329; G06F 16/338; G06F 16/9017; G06F 16/951; G06F 16/345; G06F 40/106; G06F 40/247; G06F 40/211; G06Q 10/00

See application file for complete search history.

(56) References Cited

U.S. PATENT DOCUMENTS

| | | | |
|---|---|---|---|
| 5,297,039 A * | 3/1994 | Kanaegami | G06F 16/3344 |
| | | | 707/999.005 |
| 5,329,447 A | 7/1994 | Leedom, Jr. | |
| 5,404,506 A | 4/1995 | Fujisawa et al. | |
| 5,410,646 A | 4/1995 | Tondevold et al. | |
| 5,530,852 A | 6/1996 | Meske et al. | |
| 5,548,506 A | 8/1996 | Srinivasan | |
| 5,548,753 A | 8/1996 | Linstead et al. | |
| 5,553,226 A | 9/1996 | Kiuchi et al. | |
| 5,555,408 A | 9/1996 | Fujisawa et al. | |
| 5,557,515 A | 9/1996 | Abbruzzese et al. | |
| 5,592,664 A | 1/1997 | Starkey | |
| 5,623,679 A | 4/1997 | Rivette et al. | |
| 5,623,681 A | 4/1997 | Rivette et al. | |
| 5,644,740 A | 7/1997 | Kiuchi | |
| 5,659,729 A | 8/1997 | Nielsen | |
| 5,664,063 A | 9/1997 | Johnson et al. | |
| 5,664,714 A | 9/1997 | Navarro et al. | |
| 5,694,523 A | 12/1997 | Wical | |
| 5,696,916 A | 12/1997 | Yamazaki et al. | |
| 5,699,528 A | 12/1997 | Hogan | |
| 5,721,910 A | 2/1998 | Unger et al. | |
| 5,742,834 A * | 4/1998 | Kobayashi | G06F 40/247 |
| | | | 704/10 |
| 5,745,745 A | 4/1998 | Tada et al. | |
| 5,754,840 A | 5/1998 | Rivette et al. | |
| 5,758,328 A | 5/1998 | Giovannoli | |
| 5,768,580 A | 6/1998 | Wical | |
| 5,774,833 A | 6/1998 | Newman | |
| 5,787,411 A | 7/1998 | Groff et al. | |
| 5,794,236 A | 8/1998 | Mehrle | |
| 5,799,325 A | 8/1998 | Rivette et al. | |
| 5,809,318 A | 9/1998 | Rivette et al. | |
| 5,850,520 A | 12/1998 | Griebenow et al. | |
| 5,870,745 A | 2/1999 | McCune | |
| 5,895,468 A | 4/1999 | Whitmyer, Jr. | |
| 5,903,881 A | 5/1999 | Schrader et al. | |
| 5,907,837 A | 5/1999 | Ferrel et al. | |
| 5,926,811 A | 7/1999 | Miller et al. | |
| 5,940,821 A | 8/1999 | Wical | |
| 5,953,726 A | 9/1999 | Carter et al. | |
| 5,970,463 A | 10/1999 | Cave et al. | |
| 5,991,751 A | 11/1999 | Rivette et al. | |
| 5,991,756 A | 11/1999 | Wu | |
| 5,991,780 A | 11/1999 | Rivette et al. | |
| 5,999,907 A | 12/1999 | Donner et al. | |
| 6,006,221 A | 12/1999 | Liddy et al. | |
| 6,014,663 A | 1/2000 | Rivette et al. | |
| 6,038,561 A | 3/2000 | Snyder et al. | |
| 6,049,801 A | 4/2000 | Whitmyer, Jr. | |
| 6,055,538 A | 4/2000 | Kessenich et al. | |
| 6,076,088 A | 6/2000 | Paik et al. | |
| 6,094,652 A | 7/2000 | Faisal | |
| 6,182,062 B1 | 1/2001 | Fujisawa et al. | |
| 6,182,078 B1 | 1/2001 | Whitmyer, Jr. | |
| 6,216,128 B1 | 4/2001 | Di-Criescenzo et al. | |
| 6,226,792 B1 | 5/2001 | Goiffon et al. | |
| 6,263,335 B1 | 7/2001 | Paik et al. | |
| 6,327,593 B1 | 12/2001 | Goiffon | |
| 6,339,767 B1 | 1/2002 | Rivette et al. | |
| 6,363,361 B1 | 3/2002 | Lundberg | |
| 6,363,375 B1 * | 3/2002 | Hoshino | G06F 16/3323 |
| | | | 707/999.005 |
| 6,363,378 B1 | 3/2002 | Conklin et al. | |
| 6,401,118 B1 | 6/2002 | Thomas | |
| 6,405,190 B1 | 6/2002 | Conklin | |
| 6,415,283 B1 | 7/2002 | Conklin | |
| 6,415,319 B1 | 7/2002 | Ambroziak | |
| 6,434,580 B1 | 8/2002 | Takano et al. | |
| 6,453,312 B1 | 9/2002 | Goiffon et al. | |
| 6,460,043 B1 | 10/2002 | Tabbara et al. | |
| 6,490,581 B1 | 12/2002 | Neshatfar et al. | |
| 6,499,026 B1 | 12/2002 | Rivette et al. | |
| 6,502,081 B1 | 12/2002 | Wiltshire, Jr. et al. | |
| 6,513,027 B1 | 1/2003 | Powers et al. | |
| 6,526,440 B1 | 2/2003 | Bharat | |
| 6,542,884 B1 | 4/2003 | Soderberg et al. | |
| 6,556,992 B1 | 4/2003 | Barney et al. | |
| 6,560,620 B1 | 5/2003 | Ching | |
| 6,574,632 B2 | 6/2003 | Fox et al. | |
| 6,629,097 B1 | 9/2003 | Keith | |
| 6,654,731 B1 | 11/2003 | Mahesh | |
| 6,662,178 B2 | 12/2003 | Lee | |
| 6,665,656 B1 | 12/2003 | Carter | |
| 6,665,670 B2 | 12/2003 | Winer et al. | |
| 6,675,159 B1 | 1/2004 | Lin et al. | |
| 6,678,692 B1 | 1/2004 | Hyatt | |
| 6,694,315 B1 | 2/2004 | Grow | |
| 6,694,331 B2 | 2/2004 | Lee | |
| 6,751,621 B1 | 6/2004 | Calistri-Yeh et al. | |
| 6,766,315 B1 | 7/2004 | Bratsos et al. | |
| 6,789,092 B1 | 9/2004 | Oppedahl et al. | |
| 6,823,331 B1 | 11/2004 | Abu-Hakima | |
| 6,839,665 B1 | 1/2005 | Meyers | |
| 6,847,960 B1 | 1/2005 | Li et al. | |
| 6,847,966 B1 | 1/2005 | Sommer et al. | |
| 6,847,979 B2 | 1/2005 | Allemang et al. | |
| 6,879,990 B1 | 4/2005 | Boyer et al. | |
| 6,885,999 B1 | 4/2005 | Corless | |
| 6,889,223 B2 | 5/2005 | Hattori et al. | |
| 6,941,553 B2 | 9/2005 | Eisler et al. | |
| 6,970,842 B1 | 11/2005 | Ashby | |
| 6,970,881 B1 | 11/2005 | Mohan et al. | |

(56) References Cited

U.S. PATENT DOCUMENTS

| | | |
|---|---|---|
| 6,976,016 B2 | 12/2005 | Chang et al. |
| 6,980,984 B1 | 12/2005 | Huffman et al. |
| 6,981,007 B1 | 12/2005 | Whitmyer, Jr. |
| 7,003,516 B2 | 2/2006 | Dehlinger et al. |
| 7,016,852 B1 | 3/2006 | Lee |
| 7,016,895 B2 | 3/2006 | Dehlinger et al. |
| 7,024,408 B2 | 4/2006 | Dehlinger et al. |
| 7,035,463 B1 | 4/2006 | Monobe et al. |
| 7,051,022 B1 | 5/2006 | Faisal |
| 7,054,854 B1 | 5/2006 | Hattori et al. |
| 7,054,856 B2 | 5/2006 | Won et al. |
| 7,080,067 B2 | 7/2006 | Nonomura et al. |
| 7,085,771 B2 | 8/2006 | Chung et al. |
| 7,158,983 B2 | 1/2007 | Willse et al. |
| 7,185,172 B1 | 2/2007 | Mick, Jr. et al. |
| 7,221,016 B2 | 5/2007 | Inoue |
| 7,231,384 B2 | 6/2007 | Wu et al. |
| 7,231,386 B2 | 6/2007 | Nonomura |
| 7,281,008 B1 | 10/2007 | Lawrence et al. |
| 7,293,018 B2 | 11/2007 | Hattori et al. |
| 7,296,015 B2 | 11/2007 | Poltorak |
| 7,305,625 B1 | 12/2007 | Zilka et al. |
| 7,369,701 B2 | 5/2008 | Lundberg |
| 7,383,294 B1 | 6/2008 | Tamer et al. |
| 7,386,460 B1 | 6/2008 | Frank et al. |
| 7,395,261 B1 | 7/2008 | Atzel |
| 7,433,884 B2 | 10/2008 | Breitzman |
| 7,444,589 B2 | 10/2008 | Zellner et al. |
| 7,483,829 B2 | 1/2009 | Murakami et al. |
| 7,493,253 B1 | 2/2009 | Ceusters et al. |
| 7,496,892 B2 * | 2/2009 | Nuss ............... G06F 8/31 709/200 |
| 7,523,126 B2 | 4/2009 | Rivette |
| 7,536,446 B2 | 5/2009 | Blumberg |
| 7,610,185 B1 | 10/2009 | Ershov |
| 7,653,631 B1 | 1/2010 | Lundberg |
| 7,676,375 B1 | 3/2010 | Neifeld et al. |
| 7,680,733 B1 | 3/2010 | Lundberg |
| 7,698,330 B2 | 4/2010 | Kim |
| 7,702,640 B1 | 4/2010 | Vermeulen et al. |
| 7,716,226 B2 | 5/2010 | Barney |
| 7,716,581 B2 | 5/2010 | Tran |
| 7,734,545 B1 | 6/2010 | Fogliano et al. |
| 7,739,240 B2 | 6/2010 | Saito et al. |
| 7,765,227 B1 | 7/2010 | Khoshnevisan et al. |
| 7,769,685 B2 | 8/2010 | Malackowski et al. |
| 7,783,619 B2 | 8/2010 | Mcbeath et al. |
| 7,801,889 B2 | 9/2010 | Kim et al. |
| 7,801,909 B2 | 9/2010 | Poltorak |
| 7,823,061 B2 | 10/2010 | Chan |
| 7,836,048 B2 | 11/2010 | Schneider |
| 7,881,937 B2 | 2/2011 | Hasan et al. |
| 7,962,511 B2 | 6/2011 | Barney |
| 7,966,328 B2 | 6/2011 | Germeraad et al. |
| 7,983,928 B2 | 7/2011 | Lee |
| 7,996,753 B1 | 8/2011 | Chan et al. |
| 8,000,528 B2 | 8/2011 | Ming et al. |
| 8,005,760 B1 | 8/2011 | Lee |
| 8,041,739 B2 | 10/2011 | Glasgow |
| 8,064,736 B2 | 11/2011 | Chan et al. |
| 8,078,545 B1 | 12/2011 | Zilka et al. |
| 8,095,581 B2 | 1/2012 | Stobbs et al. |
| 8,131,701 B2 | 3/2012 | Barney |
| 8,160,306 B1 | 4/2012 | Neustel et al. |
| 8,161,025 B2 | 4/2012 | Lundberg et al. |
| 8,161,041 B1 * | 4/2012 | Grushetskyy ......... G06F 40/247 707/750 |
| 8,196,030 B1 | 6/2012 | Wang et al. |
| 8,204,816 B2 | 6/2012 | Brodsky et al. |
| 8,254,692 B2 | 8/2012 | Ramachandrula et al. |
| 8,275,708 B1 | 9/2012 | Dennes et al. |
| 8,380,548 B2 | 2/2013 | Ng et al. |
| 8,386,456 B1 | 2/2013 | Paiz |
| 8,442,814 B2 | 5/2013 | Ceusters et al. |
| 8,447,758 B1 | 5/2013 | Adler et al. |
| 8,538,794 B2 | 9/2013 | Marko et al. |
| 8,543,511 B2 | 9/2013 | Wang |
| 8,589,413 B1 | 11/2013 | Mohan et al. |
| 8,600,900 B2 | 12/2013 | Lundberg |
| 8,713,078 B2 | 4/2014 | Kunjithapatham et al. |
| 8,812,292 B2 | 8/2014 | Ceusters et al. |
| 8,892,547 B2 | 11/2014 | Lundberg |
| 8,972,385 B2 | 3/2015 | Lundberg |
| 9,003,474 B1 | 4/2015 | Smith |
| 9,098,568 B2 | 8/2015 | Li et al. |
| 9,110,971 B2 | 8/2015 | Liao et al. |
| 9,146,985 B2 | 9/2015 | Carter |
| 9,201,956 B2 | 12/2015 | Lundberg et al. |
| 9,201,966 B2 | 12/2015 | Lundberg |
| 9,286,351 B2 | 3/2016 | Lundberg |
| 9,396,274 B2 | 7/2016 | Lundberg |
| 9,541,977 B1 | 1/2017 | Lee |
| 9,652,546 B2 | 5/2017 | Lundberg |
| 9,659,071 B2 | 5/2017 | Lundberg et al. |
| 9,679,019 B2 | 6/2017 | Lundberg |
| 9,858,319 B2 | 1/2018 | Lundberg et al. |
| 9,904,726 B2 | 2/2018 | Lundberg |
| 10,013,726 B1 | 7/2018 | Jung et al. |
| 10,268,731 B2 | 4/2019 | Lundberg |
| 10,546,273 B2 | 1/2020 | Lundberg et al. |
| 10,614,082 B2 | 4/2020 | Lundberg et al. |
| 10,628,429 B2 | 4/2020 | Lundberg |
| 10,810,693 B2 | 10/2020 | Lundberg et al. |
| 10,860,657 B2 | 12/2020 | Lundberg |
| 10,885,078 B2 | 1/2021 | Lundberg |
| 11,301,810 B2 | 4/2022 | Lundberg et al. |
| 2001/0007977 A1 | 7/2001 | Geary |
| 2001/0042064 A1 | 11/2001 | Davis et al. |
| 2001/0049688 A1 | 12/2001 | Fratkina et al. |
| 2002/0004775 A1 | 1/2002 | Kossovsky et al. |
| 2002/0007373 A1 | 1/2002 | Blair et al. |
| 2002/0022974 A1 | 2/2002 | Lindh |
| 2002/0023053 A1 | 2/2002 | Szoc et al. |
| 2002/0029208 A1 | 3/2002 | Josephson |
| 2002/0035499 A1 | 3/2002 | Germeraad et al. |
| 2002/0035571 A1 | 3/2002 | Coult |
| 2002/0042784 A1 | 4/2002 | Kerven et al. |
| 2002/0052971 A1 | 5/2002 | Okudera et al. |
| 2002/0059076 A1 | 5/2002 | Grainger et al. |
| 2002/0065675 A1 | 5/2002 | Grainger et al. |
| 2002/0065677 A1 | 5/2002 | Grainger et al. |
| 2002/0072920 A1 | 6/2002 | Grainger |
| 2002/0077835 A1 | 6/2002 | Hagelin |
| 2002/0078090 A1 | 6/2002 | Hwang et al. |
| 2002/0082778 A1 | 6/2002 | Barnett et al. |
| 2002/0091541 A1 | 7/2002 | Lundberg |
| 2002/0091542 A1 | 7/2002 | Grainger |
| 2002/0091702 A1 | 7/2002 | Mullins |
| 2002/0103654 A1 | 8/2002 | Poltorak |
| 2002/0107896 A1 | 8/2002 | Ronai |
| 2002/0111824 A1 | 8/2002 | Grainger |
| 2002/0111941 A1 | 8/2002 | Roux et al. |
| 2002/0111953 A1 | 8/2002 | Snyder |
| 2002/0116363 A1 | 8/2002 | Grainger |
| 2002/0129015 A1 | 9/2002 | Caudill et al. |
| 2002/0138384 A1 | 9/2002 | Malackowski |
| 2002/0138465 A1 | 9/2002 | Lee et al. |
| 2002/0138474 A1 | 9/2002 | Lee |
| 2002/0138475 A1 | 9/2002 | Lee et al. |
| 2002/0143496 A1 | 10/2002 | Maetas et al. |
| 2002/0143742 A1 | 10/2002 | Nonomura et al. |
| 2002/0147711 A1 | 10/2002 | Hattori et al. |
| 2002/0147738 A1 | 10/2002 | Reader |
| 2002/0161733 A1 | 10/2002 | Grainger |
| 2002/0163541 A1 | 11/2002 | Williams et al. |
| 2002/0174131 A1 | 11/2002 | Winer et al. |
| 2002/0175934 A1 | 11/2002 | Hand et al. |
| 2002/0175941 A1 | 11/2002 | Hand et al. |
| 2002/0177907 A1 | 11/2002 | Hand et al. |
| 2002/0184234 A1 | 12/2002 | Lundberg |
| 2003/0004843 A1 | 1/2003 | Frain |
| 2003/0004936 A1 | 1/2003 | Grune et al. |
| 2003/0026459 A1 | 2/2003 | Won et al. |
| 2003/0033295 A1 | 2/2003 | Adler et al. |

(56) References Cited

U.S. PATENT DOCUMENTS

| | | |
|---|---|---|
| 2003/0033333 A1 | 2/2003 | Nishino et al. |
| 2003/0046307 A1 | 3/2003 | Rivette et al. |
| 2003/0050915 A1 | 3/2003 | Allemang et al. |
| 2003/0066025 A1 | 4/2003 | Garner et al. |
| 2003/0074354 A1 | 4/2003 | Lee et al. |
| 2003/0084066 A1 | 5/2003 | Waterman et al. |
| 2003/0115191 A1 | 6/2003 | Copperman et al. |
| 2003/0154085 A1 | 8/2003 | Kelley |
| 2003/0167181 A1 | 9/2003 | Lundberg et al. |
| 2003/0187832 A1 | 10/2003 | Reader |
| 2003/0187874 A1 | 10/2003 | Peschel et al. |
| 2003/0191654 A1 | 10/2003 | Panchai et al. |
| 2003/0191780 A1 | 10/2003 | Heger et al. |
| 2003/0195764 A1 | 10/2003 | Baker et al. |
| 2003/0212572 A1 | 11/2003 | Poltorak |
| 2003/0212706 A1 | 11/2003 | Shih |
| 2003/0217335 A1 | 11/2003 | Chung et al. |
| 2003/0220891 A1 | 11/2003 | Fish |
| 2003/0225749 A1 | 12/2003 | Cox et al. |
| 2003/0229470 A1 | 12/2003 | Pejic |
| 2004/0002892 A1 | 1/2004 | Gluck et al. |
| 2004/0006457 A1 | 1/2004 | Dehlinger et al. |
| 2004/0006459 A1 | 1/2004 | Dehlinger et al. |
| 2004/0006547 A1 | 1/2004 | Dehlinger et al. |
| 2004/0006558 A1 | 1/2004 | Dehlinger et al. |
| 2004/0006594 A1 | 1/2004 | Boyer et al. |
| 2004/0010393 A1 | 1/2004 | Barney |
| 2004/0015481 A1 | 1/2004 | Zinda |
| 2004/0024733 A1 | 2/2004 | Won et al. |
| 2004/0024739 A1 | 2/2004 | Copperman et al. |
| 2004/0044688 A1 | 3/2004 | Brudz et al. |
| 2004/0049498 A1 | 3/2004 | Dehlinger et al. |
| 2004/0054672 A1 | 3/2004 | Tsuchitani et al. |
| 2004/0059736 A1 | 3/2004 | Willse et al. |
| 2004/0059994 A1 | 3/2004 | Fogel et al. |
| 2004/0064438 A1 | 4/2004 | Kostoff |
| 2004/0073443 A1 | 4/2004 | Gabrick et al. |
| 2004/0078190 A1* | 4/2004 | Fass ............... G06F 40/211 704/7 |
| 2004/0078192 A1 | 4/2004 | Poltorak |
| 2004/0078365 A1 | 4/2004 | Poltorak |
| 2004/0083206 A1 | 4/2004 | Wu et al. |
| 2004/0088306 A1 | 5/2004 | Murthy et al. |
| 2004/0088332 A1 | 5/2004 | Lee et al. |
| 2004/0103112 A1 | 5/2004 | Colson et al. |
| 2004/0122656 A1 | 6/2004 | Abir |
| 2004/0122841 A1 | 6/2004 | Goodman et al. |
| 2004/0133433 A1 | 7/2004 | Lee et al. |
| 2004/0133534 A1 | 7/2004 | Mahesh |
| 2004/0133555 A1 | 7/2004 | Toong et al. |
| 2004/0133566 A1 | 7/2004 | Ishiguro et al. |
| 2004/0167875 A1 | 8/2004 | Sneiders |
| 2004/0177068 A1 | 9/2004 | Beretich et al. |
| 2004/0181417 A1 | 9/2004 | Piller et al. |
| 2004/0181427 A1 | 9/2004 | Stobbs et al. |
| 2004/0186705 A1 | 9/2004 | Morgan et al. |
| 2004/0186738 A1 | 9/2004 | Reisman |
| 2004/0199400 A1 | 10/2004 | Lundberg et al. |
| 2004/0223648 A1 | 11/2004 | Hoene et al. |
| 2004/0236646 A1 | 11/2004 | Wu et al. |
| 2004/0260569 A1 | 12/2004 | Bell et al. |
| 2004/0268399 A1 | 12/2004 | Asakawa |
| 2005/0004806 A1 | 1/2005 | Lin et al. |
| 2005/0005239 A1 | 1/2005 | Richards et al. |
| 2005/0010555 A1 | 1/2005 | Gallivan |
| 2005/0010863 A1 | 1/2005 | Zernik |
| 2005/0021522 A1 | 1/2005 | Herman et al. |
| 2005/0060170 A1 | 3/2005 | Kummamura et al. |
| 2005/0060303 A1 | 3/2005 | Wu et al. |
| 2005/0060306 A1 | 3/2005 | Hattori et al. |
| 2005/0080656 A1 | 4/2005 | Crow et al. |
| 2005/0080723 A1 | 4/2005 | Burchetta et al. |
| 2005/0080775 A1 | 4/2005 | Colledge et al. |
| 2005/0080776 A1 | 4/2005 | Colledge et al. |
| 2005/0097628 A1 | 5/2005 | Lussier et al. |
| 2005/0108652 A1 | 5/2005 | Beretich, Jr. et al. |
| 2005/0114763 A1 | 5/2005 | Nonomura et al. |
| 2005/0119995 A1 | 6/2005 | Lee |
| 2005/0120011 A1 | 6/2005 | Dehlinger et al. |
| 2005/0120026 A1* | 6/2005 | Lee ............... G06F 16/958 |
| 2005/0125459 A1 | 6/2005 | Sutinen et al. |
| 2005/0131882 A1 | 6/2005 | Beretich et al. |
| 2005/0144177 A1 | 6/2005 | Hodes |
| 2005/0154673 A1 | 7/2005 | Fellenstein et al. |
| 2005/0165600 A1 | 7/2005 | Kasravi et al. |
| 2005/0165744 A1 | 7/2005 | Taylor et al. |
| 2005/0171760 A1* | 8/2005 | Tinkler ............. G06F 40/106 704/10 |
| 2005/0182755 A1 | 8/2005 | Tran |
| 2005/0198026 A1 | 9/2005 | Dehlinger et al. |
| 2005/0203768 A1 | 9/2005 | Florence et al. |
| 2005/0210008 A1 | 9/2005 | Tran et al. |
| 2005/0210009 A1 | 9/2005 | Tran |
| 2005/0210042 A1 | 9/2005 | Goedken |
| 2005/0216898 A1 | 9/2005 | Powell, Jr. et al. |
| 2005/0228684 A1 | 10/2005 | Pogodin |
| 2005/0234738 A1 | 10/2005 | Hodes |
| 2005/0234881 A1 | 10/2005 | Burago et al. |
| 2005/0240595 A1 | 10/2005 | Chandrasekaran |
| 2005/0246194 A1 | 11/2005 | Lundberg |
| 2005/0251383 A1 | 11/2005 | Murray |
| 2005/0256734 A1 | 11/2005 | Clikeman |
| 2005/0261927 A1 | 11/2005 | Bilak et al. |
| 2005/0289524 A1 | 12/2005 | McGinnes |
| 2006/0015485 A1 | 1/2006 | Hofmann |
| 2006/0026174 A1 | 2/2006 | Lundberg et al. |
| 2006/0026203 A1 | 2/2006 | Tan et al. |
| 2006/0036451 A1 | 2/2006 | Lundberg et al. |
| 2006/0036452 A1 | 2/2006 | Williams |
| 2006/0036453 A1 | 2/2006 | Williams |
| 2006/0036529 A1 | 2/2006 | Williams |
| 2006/0036632 A1 | 2/2006 | Williams |
| 2006/0036635 A1 | 2/2006 | Williams |
| 2006/0074836 A1 | 4/2006 | Gardner et al. |
| 2006/0074867 A1 | 4/2006 | Breitzman |
| 2006/0074991 A1 | 4/2006 | Lussier et al. |
| 2006/0085249 A1 | 4/2006 | Diaz et al. |
| 2006/0085478 A1 | 4/2006 | Landau et al. |
| 2006/0106793 A1 | 5/2006 | Liang |
| 2006/0106847 A1 | 5/2006 | Eckardt, III et al. |
| 2006/0112084 A1 | 5/2006 | Mcbeath et al. |
| 2006/0143162 A1 | 6/2006 | Bernacki et al. |
| 2006/0149720 A1 | 7/2006 | Dehlinger |
| 2006/0150074 A1 | 7/2006 | Zellner |
| 2006/0161562 A1 | 7/2006 | McFarland et al. |
| 2006/0173903 A1 | 8/2006 | Zimmerman et al. |
| 2006/0173920 A1 | 8/2006 | Adler et al. |
| 2006/0190449 A1 | 8/2006 | Lundberg et al. |
| 2006/0190807 A1 | 8/2006 | Tran |
| 2006/0212302 A1 | 9/2006 | Lundberg et al. |
| 2006/0212402 A1 | 9/2006 | Lundberg et al. |
| 2006/0212471 A1 | 9/2006 | Lundberg et al. |
| 2006/0212480 A1 | 9/2006 | Lundberg et al. |
| 2006/0218188 A1 | 9/2006 | Duncan et al. |
| 2006/0218491 A1 | 9/2006 | Grossman et al. |
| 2006/0224412 A1 | 10/2006 | Frank et al. |
| 2006/0224999 A1 | 10/2006 | Albrecht et al. |
| 2006/0225000 A1 | 10/2006 | Albrecht et al. |
| 2006/0229983 A1 | 10/2006 | Lundberg |
| 2006/0235811 A1 | 10/2006 | Fairweather |
| 2006/0258397 A1 | 11/2006 | Kaplan et al. |
| 2006/0287971 A1 | 12/2006 | Armstrong |
| 2007/0005575 A1 | 1/2007 | Dai et al. |
| 2007/0010994 A1 | 1/2007 | Mueller |
| 2007/0011154 A1 | 1/2007 | Musgrove et al. |
| 2007/0011175 A1 | 1/2007 | Langseth et al. |
| 2007/0050343 A1 | 3/2007 | Siddaramappa et al. |
| 2007/0057967 A1 | 3/2007 | Armstrong |
| 2007/0061384 A1 | 3/2007 | Harrington |
| 2007/0067297 A1 | 3/2007 | Kublickis |
| 2007/0073625 A1 | 3/2007 | Shelton |
| 2007/0073748 A1 | 3/2007 | Barney |
| 2007/0130112 A1 | 6/2007 | Lin |
| 2007/0136116 A1 | 6/2007 | Germeraad et al. |

(56) References Cited

U.S. PATENT DOCUMENTS

| | | |
|---|---|---|
| 2007/0136373 A1 | 6/2007 | Piasecki |
| 2007/0150298 A1 | 6/2007 | Barney |
| 2007/0174041 A1 | 7/2007 | Yeske |
| 2007/0192272 A1 | 8/2007 | Elfayoumy et al. |
| 2007/0198578 A1 | 8/2007 | Lundberg et al. |
| 2007/0208669 A1 | 9/2007 | Rivette et al. |
| 2007/0208719 A1 | 9/2007 | Tran |
| 2007/0219853 A1 | 9/2007 | Van Luchene et al. |
| 2007/0219988 A1 | 9/2007 | Mueller et al. |
| 2007/0220041 A1 | 9/2007 | Van Luchene et al. |
| 2007/0220042 A1 | 9/2007 | Mueller et al. |
| 2007/0239705 A1 | 10/2007 | Hunt et al. |
| 2007/0245380 A1 | 10/2007 | Dommer et al. |
| 2007/0250468 A1 | 10/2007 | Pieper |
| 2007/0250488 A1 | 10/2007 | Lee |
| 2007/0029461 A1 | 12/2007 | Ching |
| 2007/0288256 A1 | 12/2007 | Speier |
| 2007/0288856 A1 | 12/2007 | Butlin et al. |
| 2008/0005103 A1 | 1/2008 | Ratcliffe et al. |
| 2008/0005144 A1 | 1/2008 | Katz et al. |
| 2008/0016069 A1 | 1/2008 | Holt |
| 2008/0030800 A1 | 2/2008 | Matsukawa et al. |
| 2008/0077570 A1 | 3/2008 | Tang et al. |
| 2008/0077577 A1 | 3/2008 | Byrne et al. |
| 2008/0097931 A1 | 4/2008 | Grotto |
| 2008/0104032 A1 | 5/2008 | Sarkar |
| 2008/0109454 A1 | 5/2008 | Willse et al. |
| 2008/0140644 A1 | 6/2008 | Franks et al. |
| 2008/0154767 A1 | 6/2008 | D'agostino |
| 2008/0154848 A1 | 6/2008 | Haslam et al. |
| 2008/0162444 A1 | 7/2008 | Lee et al. |
| 2008/0183518 A1 | 7/2008 | Jiang et al. |
| 2008/0195568 A1 | 8/2008 | Chen et al. |
| 2008/0195595 A1 | 8/2008 | Masuyama et al. |
| 2008/0195601 A1 | 8/2008 | Ntoulas et al. |
| 2008/0216013 A1 | 9/2008 | Lundberg et al. |
| 2008/0243799 A1 | 10/2008 | Rozich |
| 2008/0281748 A1 | 11/2008 | Newman |
| 2008/0281821 A1 | 11/2008 | Chen et al. |
| 2008/0301138 A1 | 12/2008 | Hasan et al. |
| 2008/0306952 A1 | 12/2008 | Lynn et al. |
| 2008/0312981 A1 | 12/2008 | Marlett et al. |
| 2009/0006328 A1 | 1/2009 | Lindberg et al. |
| 2009/0006379 A1 | 1/2009 | Shen et al. |
| 2009/0007200 A1 | 1/2009 | Amento et al. |
| 2009/0012827 A1 | 1/2009 | Avrunin |
| 2009/0012937 A1 | 1/2009 | Lee et al. |
| 2009/0030713 A1 | 1/2009 | Venkatachalam |
| 2009/0043797 A1 | 2/2009 | Dorie et al. |
| 2009/0048925 A1 | 2/2009 | Song et al. |
| 2009/0055721 A1 | 2/2009 | Kahn |
| 2009/0063468 A1 | 3/2009 | Berg |
| 2009/0070301 A1 | 3/2009 | McLean et al. |
| 2009/0083049 A1 | 3/2009 | Sciarrino et al. |
| 2009/0150326 A1 | 6/2009 | Sheets |
| 2009/0157717 A1 | 6/2009 | Palahnuk et al. |
| 2009/0164431 A1 | 6/2009 | Zivkovic et al. |
| 2009/0177656 A1 | 7/2009 | Carter |
| 2009/0216994 A1 | 8/2009 | Hsieh et al. |
| 2009/0228578 A1 | 9/2009 | Demers et al. |
| 2009/0228777 A1 | 9/2009 | Henry et al. |
| 2009/0248468 A1 | 10/2009 | Cronin et al. |
| 2009/0257396 A1 | 10/2009 | Eliezer et al. |
| 2009/0259459 A1 | 10/2009 | Ceusters et al. |
| 2009/0259506 A1 | 10/2009 | Barney |
| 2009/0265274 A1 | 10/2009 | Hahn-carlson et al. |
| 2009/0282054 A1 | 11/2009 | Casey |
| 2010/0005094 A1 | 1/2010 | Poltorak et al. |
| 2010/0023386 A1 | 1/2010 | Avisar et al. |
| 2010/0030680 A1 | 2/2010 | Malackowski et al. |
| 2010/0057533 A1 | 3/2010 | Martinez Ruiz et al. |
| 2010/0077007 A1 | 3/2010 | White et al. |
| 2010/0082395 A1 | 4/2010 | De Andrade |
| 2010/0106752 A1 | 4/2010 | Eckardt, III et al. |
| 2010/0114587 A1 | 5/2010 | Masuyama et al. |
| 2010/0131513 A1 | 5/2010 | Lundberg et al. |
| 2010/0174698 A1 | 7/2010 | Odland et al. |
| 2010/0179948 A1 | 7/2010 | Xie et al. |
| 2010/0180223 A1 | 7/2010 | Speier |
| 2010/0185689 A1 | 7/2010 | Hu et al. |
| 2010/0191622 A1 | 7/2010 | Reiss et al. |
| 2010/0191702 A1 | 7/2010 | Hofmann |
| 2010/0235337 A1 | 9/2010 | Shanahan et al. |
| 2010/0250479 A1 | 9/2010 | Carter |
| 2010/0287478 A1 | 11/2010 | Avasarala et al. |
| 2010/0306825 A1 | 12/2010 | Spivack |
| 2010/0324991 A1 | 12/2010 | Colledge et al. |
| 2010/0332511 A1 | 12/2010 | Stockton et al. |
| 2011/0029476 A1 | 2/2011 | Kasravi et al. |
| 2011/0029526 A1* | 2/2011 | Knight .............. G06F 16/3322 707/E17.089 |
| 2011/0047166 A1 | 2/2011 | Stading et al. |
| 2011/0055192 A1 | 3/2011 | Tang et al. |
| 2011/0072014 A1 | 3/2011 | Lundberg et al. |
| 2011/0072024 A1 | 3/2011 | Barney |
| 2011/0093449 A1 | 4/2011 | Belenzon et al. |
| 2011/0099084 A1 | 4/2011 | Horn et al. |
| 2011/0099186 A1 | 4/2011 | Zohar et al. |
| 2011/0112824 A1 | 5/2011 | Sayers et al. |
| 2011/0113385 A1 | 5/2011 | Sayers et al. |
| 2011/0119134 A1 | 5/2011 | Zivkovic et al. |
| 2011/0153509 A1 | 6/2011 | Lundberg et al. |
| 2011/0153852 A1 | 6/2011 | Thomas |
| 2011/0179032 A1 | 7/2011 | Ceusters et al. |
| 2011/0191310 A1 | 8/2011 | Liao et al. |
| 2011/0191314 A1 | 8/2011 | Howes et al. |
| 2011/0197121 A1 | 8/2011 | Kletter |
| 2011/0202334 A1 | 8/2011 | Abir |
| 2011/0225159 A1 | 9/2011 | Murray |
| 2011/0231449 A1 | 9/2011 | Ashley et al. |
| 2011/0246379 A1 | 10/2011 | Maddox et al. |
| 2011/0246473 A1 | 10/2011 | Stec |
| 2011/0289096 A1 | 11/2011 | Barney |
| 2011/0302172 A1 | 12/2011 | Chandrasekar et al. |
| 2011/0307499 A1 | 12/2011 | Elias et al. |
| 2011/0320367 A1 | 12/2011 | Kan et al. |
| 2011/0320582 A1 | 12/2011 | Lewis |
| 2012/0016678 A1* | 1/2012 | Gruber ................ G06N 5/041 704/E21.001 |
| 2012/0016859 A1 | 1/2012 | Sears |
| 2012/0078913 A1 | 3/2012 | Muni et al. |
| 2012/0078979 A1 | 3/2012 | Ghimire |
| 2012/0095984 A1 | 4/2012 | Wren-hilton et al. |
| 2012/0095993 A1 | 4/2012 | Shau |
| 2012/0096027 A1 | 4/2012 | Coult |
| 2012/0102427 A1 | 4/2012 | Fenster et al. |
| 2012/0109642 A1 | 5/2012 | Stobbs et al. |
| 2012/0116989 A1 | 5/2012 | Lai et al. |
| 2012/0117082 A1 | 5/2012 | Koperda et al. |
| 2012/0130773 A1 | 5/2012 | Abu-ghazalah et al. |
| 2012/0130993 A1 | 5/2012 | Lundberg et al. |
| 2012/0174017 A1 | 7/2012 | Tidwell et al. |
| 2012/0215768 A1 | 8/2012 | Zellweger |
| 2012/0221580 A1 | 8/2012 | Barney |
| 2012/0239591 A1 | 9/2012 | Powell, Jr. et al. |
| 2012/0240026 A1 | 9/2012 | Iyer et al. |
| 2012/0254155 A1 | 10/2012 | Heim et al. |
| 2012/0259787 A1 | 10/2012 | Speier |
| 2012/0278244 A1 | 11/2012 | Lee et al. |
| 2012/0284199 A1 | 11/2012 | Lundberg |
| 2012/0290487 A1 | 11/2012 | Lee et al. |
| 2012/0317041 A1 | 12/2012 | Shaffer et al. |
| 2013/0007578 A1 | 1/2013 | Shreck et al. |
| 2013/0013645 A1 | 1/2013 | Dias et al. |
| 2013/0041921 A1* | 2/2013 | Cooper ............. G06F 16/90335 707/E17.099 |
| 2013/0084009 A1 | 4/2013 | Lundberg |
| 2013/0085911 A1 | 4/2013 | Lundberg |
| 2013/0085912 A1 | 4/2013 | Lundberg |
| 2013/0085929 A1 | 4/2013 | Lundberg |
| 2013/0085933 A1 | 4/2013 | Lundberg |
| 2013/0085934 A1 | 4/2013 | Lundberg |
| 2013/0085946 A1 | 4/2013 | Lundberg |
| 2013/0085947 A1 | 4/2013 | Lundberg |

(56) References Cited

U.S. PATENT DOCUMENTS

| | | |
|---|---|---|
| 2013/0085948 A1 | 4/2013 | Lundberg |
| 2013/0085949 A1 | 4/2013 | Lundberg |
| 2013/0085950 A1 | 4/2013 | Marais |
| 2013/0085964 A1 | 4/2013 | Marais |
| 2013/0086032 A1 | 4/2013 | Lundberg |
| 2013/0086033 A1 | 4/2013 | Lundberg |
| 2013/0086042 A1 | 4/2013 | Lundberg |
| 2013/0086043 A1 | 4/2013 | Lundberg |
| 2013/0086044 A1 | 4/2013 | Lundberg |
| 2013/0086045 A1 | 4/2013 | Lundberg |
| 2013/0086046 A1 | 4/2013 | Lundberg |
| 2013/0086047 A1 | 4/2013 | Lundberg et al. |
| 2013/0086048 A1 | 4/2013 | Lundberg et al. |
| 2013/0086049 A1 | 4/2013 | Lundberg et al. |
| 2013/0086050 A1 | 4/2013 | Lundberg |
| 2013/0086070 A1 | 4/2013 | Lundberg |
| 2013/0086080 A1 | 4/2013 | Lundberg |
| 2013/0086084 A1 | 4/2013 | Lundberg |
| 2013/0086093 A1 | 4/2013 | Lundberg |
| 2013/0086094 A1 | 4/2013 | Lundberg |
| 2013/0086106 A1 | 4/2013 | Lundberg |
| 2013/0086117 A1 | 4/2013 | Lundberg |
| 2013/0086120 A1 | 4/2013 | Lundberg et al. |
| 2013/0086257 A1 | 4/2013 | Lundberg |
| 2013/0086469 A1 | 4/2013 | Lundberg |
| 2013/0132302 A1 | 5/2013 | Lundberg et al. |
| 2013/0144895 A1 | 6/2013 | Cameron |
| 2013/0282409 A1 | 10/2013 | Lundberg et al. |
| 2013/0282571 A1 | 10/2013 | Lundberg |
| 2013/0282599 A1 | 10/2013 | Kang et al. |
| 2013/0282735 A1 | 10/2013 | Pedersen et al. |
| 2013/0346116 A1 | 12/2013 | Lundberg |
| 2013/0346265 A1 | 12/2013 | Lundberg |
| 2013/0346323 A1 | 12/2013 | Lundberg |
| 2013/0346505 A1 | 12/2013 | Lundberg |
| 2014/0032513 A1 | 1/2014 | Gaither |
| 2014/0008921 A1 | 3/2014 | Lundberg |
| 2014/0379388 A1 | 12/2014 | Lundberg et al. |
| 2014/0379686 A1 | 12/2014 | Vadlamani et al. |
| 2015/0066842 A1 | 3/2015 | Lundberg |
| 2015/0134549 A1 | 5/2015 | Lundberg et al. |
| 2015/0149368 A1 | 5/2015 | Lundberg |
| 2015/0169777 A1 | 6/2015 | Lundberg |
| 2015/0347604 A1 | 12/2015 | Lundberg |
| 2015/0347605 A1 | 12/2015 | Lundberg et al. |
| 2015/0348217 A1 | 12/2015 | Lundberg |
| 2015/0371349 A1 | 12/2015 | Lundberg et al. |
| 2016/0078109 A1 | 3/2016 | Lundberg et al. |
| 2016/0154863 A1 | 6/2016 | Lundberg |
| 2016/0358274 A1 | 12/2016 | George |
| 2016/0378766 A1 | 12/2016 | Lundberg |
| 2017/0046398 A1 | 2/2017 | Beretich, Jr. et al. |
| 2017/0075929 A1 | 3/2017 | Lundberg |
| 2017/0213291 A1 | 7/2017 | Plow et al. |
| 2017/0316036 A1 | 11/2017 | Lundberg |
| 2017/0351682 A1 | 12/2017 | Lundberg |
| 2018/0137194 A1 | 5/2018 | Lundberg et al. |
| 2018/0157665 A1 | 6/2018 | Lundberg et al. |
| 2018/0204180 A1 | 7/2018 | Lundberg et al. |
| 2020/0050609 A1 | 2/2020 | Lundberg |
| 2020/0210440 A1 | 7/2020 | Lundberg et al. |
| 2020/0279222 A1 | 9/2020 | Lundberg et al. |
| 2021/0073932 A1 | 3/2021 | Lundberg et al. |
| 2022/0230137 A1 | 7/2022 | Lundberg et al. |

FOREIGN PATENT DOCUMENTS

| | | |
|---|---|---|
| AU | 2013270517 B2 | 4/2016 |
| EP | 0638870 A1 | 2/1995 |
| EP | 1814047 A1 * | 8/2007 |
| GB | 2156112 A | 10/1985 |
| GB | 2260007 A | 3/1993 |
| WO | WO-9816890 A1 | 4/1998 |
| WO | WO-0054185 A1 | 9/2000 |
| WO | WO2002019155 A2 * | 3/2002 |
| WO | WO-0243306 A2 | 5/2002 |
| WO | WO-02080039 A1 | 10/2002 |
| WO | WO-2006015110 A2 | 2/2006 |
| WO | WO-2006015110 A3 | 2/2006 |
| WO | WO-2006128183 A2 | 11/2006 |
| WO | WO-2006128183 A3 | 11/2006 |
| WO | WO-2007014341 A2 | 2/2007 |
| WO | WO-2007014341 A3 | 2/2007 |
| WO | WO-2007014341 C2 | 2/2007 |
| WO | WO2011017133 A2 * | 2/2011 |
| WO | WO-2011123517 A1 | 10/2011 |
| WO | WO2011130055 A1 * | 10/2011 |

OTHER PUBLICATIONS

Jia-Long Wu et al., "Automating keyphrase extraction with multi-objective genetic algorithms", 37th Annual Hawaii International Conference on System Sciences, 2004. Proceedings of the, Jan. 2004, pp.*

"U.S. Appl. No. 10/915,265, Advisory Action dated Jul. 31, 2008", 3 pgs.

"U.S. Appl. No. 10/915,265, Final Office Action dated Jul. 10, 2007", 26 pgs.

"U.S. Appl. No. 10/915,265, Final Office Action dated Jul. 14, 2008", 23 pgs.

"U.S. Appl. No. 10/915,265, Non Final Office Action dated Jan. 22, 2007", 15 pgs.

"U.S. Appl. No. 10/915,265, Non-Final Office Action dated Apr. 13, 2009", 27 pgs.

"U.S. Appl. No. 10/915,265, Non-Final Office Action dated Jun. 2, 2010", 29 pgs.

"U.S. Appl. No. 10/915,265, Non-Final Office dated Nov. 5, 2008", 27 pgs.

"U.S. Appl. No. 10/915,265, Non-Final Office Action dated Dec. 28, 2007", 25 pgs.

"U.S. Appl. No. 10/915,265, Response filed Feb. 5, 2009 to Non-Final Office Action dated Nov. 5, 2008", 11 pgs.

"U.S. Appl. No. 10/915,265, Response filed Apr. 28, 2008 to Non-Final Office Action dated Dec. 28, 2007", 14 pgs.

"U.S. Appl. No. 10/915,265, Response filed May 18, 2007 to Noon Final Office Action dated Jan. 22, 2007", 9 pgs.

"U.S. Appl. No. 10/915,265, Response filed Jul. 18, 2008 to Final Office Action dated Jul. 14, 2008", 17 pgs.

"U.S. Appl. No. 10/915,265, Response filed Sep. 1, 2010 to Non Final Office Action dated Jun. 2, 2010", 12 pgs.

"U.S. Appl. No. 10/915,265, Response filed Oct. 10, 2007 to Final Office Action filed Jul. 10, 2007", 15 pgs.

"U.S. Appl. No. 10/915,265, Response filed Nov. 13, 2006 to Restriction Requirement dated Oct. 11, 2006", 5 pgs.

"U.S. Appl. No. 10/915,265, Restriction Requirement dated Oct. 13, 2006", 10 pgs.

"U.S. Appl. No. 12/658,113, Non Final Office Action dated Feb. 28, 2011", 26 pgs.

"U.S. Appl. No. 12/958,113, Examiner Interview Summary dated Aug. 24, 2015", 2 pgs.

"U.S. Appl. No. 12/958,113, Final Office Action dated Aug. 8, 2011", 26 pgs.

"U.S. Appl. No. 12/958,113, Final Office Action dated Nov. 3, 2014", 25 pgs.

"U.S. Appl. No. 12/958,113, Non Final Office Action dated Feb. 4, 2016", 25 pgs.

"U.S. Appl. No. 12/958,113, Non Final Office Action dated Apr. 30, 2014", 21 pgs.

"U.S. Appl. No. 12/958,113, Non Final Office Action dated Aug. 20, 2015", 25 pgs.

"U.S. Appl. No. 12/958,113, Notice of Allowance dated Mar. 1, 2017", 14 pgs.

"U.S. Appl. No. 12/958,113, Response filed Feb. 3, 2015 to Final Office Action dated Nov. 3, 2014", 11 pgs.

"U.S. Appl. No. 12/958,113, Response filed Feb. 8, 2012 to Final Office Action dated Aug. 8, 2011", 12 pgs.

"U.S. Appl. No. 12/958,113, Response filed May 3, 2016 to Non Final Office Action dated Feb. 4, 2016", 11 pgs.

(56) References Cited

OTHER PUBLICATIONS

"U.S. Appl. No. 12/958,113, Response filed May 20, 2011 to Non Final Office Action dated Feb. 28, 2011", 13 pgs.
"U.S. Appl. No. 12/958,113, Response filed Jul. 16, 2014 to Non Final Office Action dated Apr. 30, 2014", 12 pgs.
"U.S. Appl. No. 12/958,113, Response filed Nov. 6, 2015 to Non Final Office Action dated Aug. 20, 2015", 12 pgs.
"U.S. Appl. No. 13/109,080, Response filed Mar. 28, 2013 to Final Office Action dated Nov. 5, 2012", 10 pgs.
"U.S. Appl. No. 13/253,801, Final Office Action dated Jul. 18, 2013", 39 pgs.
"U.S. Appl. No. 13/253,801, Final Office Action dated Oct. 1, 2012", 41 pgs.
"U.S. Appl. No. 13/253,801, Non Final Office Action dated Apr. 10, 2013", 37 pgs.
"U.S. Appl. No. 13/253,801, Non Final Office Action dated Aug. 2, 2012", 42 pgs.
"U.S. Appl. No. 13/253,801, Notice of Allowance dated May 16, 2014", 10 pgs.
"U.S. Appl. No. 13/253,801, Notice of Allowance dated Jul. 16, 2014", 9 pgs.
"U.S. Appl. No. 13/253,801, Preliminary Amendment filed Oct. 5, 2011", 4 pgs.
"U.S. Appl. No. 13/253,801, Response filed Mar. 20, 2013 to Final Office Action dated Oct. 1, 2012", 16 pgs.
"U.S. Appl. No. 13/253,801, Response filed Jul. 5, 2013 to Non Final Office Action dated Apr. 10, 2013", 18 pgs.
"U.S. Appl. No. 13/253,801, Response filed Sep. 7, 2012 to Non Final Office Action dated Aug. 2, 2012", 17 pgs.
"U.S. Appl. No. 13/253,801, Response filed Nov. 18, 2013 to Final Office Action dated Jul. 18, 2013", 16 pgs.
"U.S. Appl. No. 13/253,811, Appeal Decision mailed Nov. 1, 2017", 21 pgs.
"U.S. Appl. No. 13/253,811, Final Office Action dated Apr. 11, 2016", 14 pgs.
"U.S. Appl. No. 13/253,811, Final Office Action dated Jul. 2, 2013", 12 pgs.
"U.S. Appl. No. 13/253,811, Final Office Action dated Dec. 9, 2014", 13 pgs.
"U.S. Appl. No. 13/253,811, Non Final Office Action dated May 1, 2014", 13 pgs.
"U.S. Appl. No. 13/253,811, Non Final Office Action dated Jun. 18, 2015", 12 pgs.
"U.S. Appl. No. 13/253,811, Non Final Office Action dated Oct. 18, 2012", 12 pgs.
"U.S. Appl. No. 13/253,811, Preliminary Amendment filed Oct. 5, 2011", 4 pgs.
"U.S. Appl. No. 13/253,811, Response filed Jan. 2, 2014 to Final Office Action dated Jul. 2, 2013", 13 pgs.
"U.S. Appl. No. 13/253,811, Response filed Mar. 18, 2013 to Non Final Office Action dated Oct. 18, 2012", 13 pgs.
"U.S. Appl. No. 13/253,811, Response filed Apr. 9, 2015 to Final Office Action dated Dec. 9, 2014", 11 pgs.
"U.S. Appl. No. 13/253,811, Response filed Oct. 1, 2014 to Non Final Office Action dated May 1, 2014", 10 pgs.
"U.S. Appl. No. 13/253,811, Response filed Oct. 19, 2015 to Non Final Office Action dated Jun. 18, 2015", 9 pgs.
"U.S. Appl. No. 13/253,825, Examiner Interview Summary dated Aug. 13, 2013", 3 pgs.
"U.S. Appl. No. 13/253,825, Final Office Action dated Aug. 14, 2013", 35 pgs.
"U.S. Appl. No. 13/253,825, Final Office Action dated Nov. 21, 2012", 33 pgs.
"U.S. Appl. No. 13/253,825, Non Final Office Action dated Feb. 11, 2014", 45 pgs.
"U.S. Appl. No. 13/253,825, Non Final Office Action dated Apr. 25, 2013", 32 pgs.
"U.S. Appl. No. 13/253,825, Non Final Office Action dated Aug. 3, 2012", 32 pgs.
"U.S. Appl. No. 13/253,825, Notice of Allowance dated Oct. 23, 2014", 16 pgs.
"U.S. Appl. No. 13/253,825, Preliminary Amendment filed Oct. 5, 2011", 4 pgs.
"U.S. Appl. No. 13/253,825, Response filed Mar. 20, 2013 to Final Office Action dated Nov. 21, 2012", 17 pgs.
"U.S. Appl. No. 13/253,825, Response filed Jun. 11, 2014 to Non Final Office Action dated Feb. 11, 2014", 16 pgs.
"U.S. Appl. No. 13/253,825, Response filed Jul. 18, 2013 to Non Final Office Action dated Apr. 25, 2013", 16 pgs.
"U.S. Appl. No. 13/253,825, Response filed Oct. 3, 2013 to Final Office Action dated Aug. 14, 2013", 15 pgs.
"U.S. Appl. No. 13/253,846, Advisory Action dated Sep. 10, 2013", 3 pgs.
"U.S. Appl. No. 13/253,846, Decision on Pre-Appeal Brief Request mailed Dec. 26, 2013", 2 pgs.
"U.S. Appl. No. 13/253,846, Final Office Action dated Apr. 12, 2016", 22 pgs.
"U.S. Appl. No. 13/253,846, Final Office Action dated Jun. 19, 2013", 21 pgs.
"U.S. Appl. No. 13/253,846, Final Office Action dated Oct. 23, 2014", 19 pgs.
"U.S. Appl. No. 13/253,846, Non Final Office Action dated Mar. 7, 2014", 20 pgs.
"U.S. Appl. No. 13/253,846, Non Final Office Action dated Jun. 25, 2015", 19 pgs.
"U.S. Appl. No. 13/253,846, Non Final Office Action dated Oct. 29, 2012", 12 pgs.
"U.S. Appl. No. 13/253,846, Pre-Appeal Brief Request filed Oct. 21, 2013", 4 pgs.
"U.S. Appl. No. 13/253,846, Response filed Jan. 23, 2015 to Final Office Action dated Oct. 23, 2014", 15 pgs.
"U.S. Appl. No. 13/253,846, Response filed Mar. 26, 2013 to Non Final Office Action dated Oct. 29, 1012", 17 pgs.
"U.S. Appl. No. 13/253,846, Response filed Aug. 16, 2013 to Final Office Action dated Jun. 19, 2013", 16 pgs.
"U.S. Appl. No. 13/253,846, Response filed Oct. 26, 2015 to Non Final Office Action dated Jun. 25, 2015", 14 pgs.
"U.S. Appl. No. 13/253,931, Advisory Action dated Sep. 11, 2013", 3 pgs.
"U.S. Appl. No. 13/253,931, Examiner Interview Summary dated Sep. 12, 2013", 2 pgs.
"U.S. Appl. No. 13/253,931, Final Office Action dated Jun. 20, 2013", 11 pgs.
"U.S. Appl. No. 13/253,931, Final Office Action dated Dec. 3, 2014", 11 pgs.
"U.S. Appl. No. 13/253,931, Non Final Office Action dated Apr. 18, 2014", 11 pgs.
"U.S. Appl. No. 13/253,931, Non Final Office Action dated Nov. 28, 2012", 13 pgs.
"U.S. Appl. No. 13/253,931, Response filed Mar. 26, 2013 to Non Final Office Action dated Nov. 28, 2012", 13 pgs.
"U.S. Appl. No. 13/253,931, Response filed Aug. 16, 2013 to Final Office Action dated Jun. 20, 2013", 14 pgs.
"U.S. Appl. No. 13/253,931, Response filed Sep. 18, 2014 to Non Final Office Action dated Apr. 18, 2014", 9 pgs.
"U.S. Appl. No. 13/253,931, Response filed Sep. 20, 2013 to Final Office Action dated Jun. 20, 2013", 13 pgs.
"U.S. Appl. No. 13/253,936, Appeal Brief filed Jan. 8, 2016", 10 pgs.
"U.S. Appl. No. 13/253,936, Appeal Brief filed Jun. 8, 2015", 13 pgs.
"U.S. Appl. No. 13/253,936, Appeal Decision mailed Aug. 3, 2017", 10 pgs.
"U.S. Appl. No. 13/253,936, Corrected Notice of Allowability dated Sep. 21, 2020", 2 pgs.
"U.S. Appl. No. 13/253,936, Corrected Notice of Allowability dated Sep. 25, 2020", 2 pgs.
"U.S. Appl. No. 13/253,936, Corrected Notice of Allowability dated Oct. 2, 2020", 2 pgs.
"U.S. Appl. No. 13/253,936, Examiner's Answer to Appeal Brief dated Jun. 23, 2016", 6 pgs.

(56) References Cited

OTHER PUBLICATIONS

"U.S. Appl. No. 13/253,936, Final Office Action dated Feb. 4, 2015", 14 pgs.
"U.S. Appl. No. 13/253,936, Final Office Action dated Apr. 9, 2020", 14 pgs.
"U.S. Appl. No. 13/253,936, Final Office Action dated Jun. 24, 2013", 13 pgs.
"U.S. Appl. No. 13/253,936, Final Office Action dated Jul. 11, 2018", 18 pgs.
"U.S. Appl. No. 13/253,936, Non Final Office Action dated Feb. 7, 2018", 16 pgs.
"U.S. Appl. No. 13/253,936, Non Final Office Action dated Jun. 18, 2014", 14 pgs.
"U.S. Appl. No. 13/253,936, Non Final Office Action dated Aug. 9, 2019", 15 pgs.
"U.S. Appl. No. 13/253,936, Non Final Office Action dated Oct. 8, 2015", 15 pgs.
"U.S. Appl. No. 13/253,936, Non Final Office Action dated Nov. 28, 2012", 11 pgs.
"U.S. Appl. No. 13/253,936, Notice of Allowance dated Aug. 5, 2020", 13 pgs.
"U.S. Appl. No. 13/253,936, Reply Brief filed Aug. 23, 2016", 4 pgs.
"U.S. Appl. No. 13/253,936, Response filed Feb. 10, 2020 to Non Final Office Action dated Aug. 9, 2019", 10 pgs.
"U.S. Appl. No. 13/253,936, Response filed Mar. 27, 2013 to Non Final Office Action dated Nov. 28, 2012", 11 pgs.
"U.S. Appl. No. 13/253,936, Response filed May 10, 2019 to Final Office Action dated Jul. 11, 2018", 13 pgs.
"U.S. Appl. No. 13/253,936, Response Filed Jun. 7, 2018 to Non Final Office Action dated Feb. 7, 2018", 13 pgs.
"U.S. Appl. No. 13/253,936, Response filed Jul. 9, 2020 to Final Office Action dated Apr. 9, 2020", 12 pgs.
"U.S. Appl. No. 13/253,936, Response filed Oct. 3, 2017 to Appeal Decision mailed Aug. 3, 2017", 8 pgs.
"U.S. Appl. No. 13/253,936, Response filed Dec. 16, 2014 to Non Final Office Action dated Jun. 18, 2014", 9 pgs.
"U.S. Appl. No. 13/253,936, Response filed Dec. 23, 2013 to Final Office Action dated Jun. 24, 2013", 5 pgs.
"U.S. Appl. No. 13/253,941, Final Office Action dated Jun. 6, 2013", 16 pgs.
"U.S. Appl. No. 13/253,941, Final Office Action dated Dec. 26, 2014", 18 pgs.
"U.S. Appl. No. 13/253,941, Non Final Office Action dated May 7, 2014", 18 pgs.
"U.S. Appl. No. 13/253,941, Non Final Office Action dated Nov. 15, 2012", 14 pgs.
"U.S. Appl. No. 13/253,941, Response filed Apr. 15, 2013 to Non Final Office Action dated Nov. 15, 2012", 13 pgs.
"U.S. Appl. No. 13/253,941, Response filed Nov. 6, 2013 to Final Office Action dated Jun. 6, 2013", 11 pgs.
"U.S. Appl. No. 13/253,941, Response filed Nov. 7, 2014 to Non Final Office Action dated May 7, 2014", 10 pgs.
"U.S. Appl. No. 13/253,846, Response filed Aug. 6, 2014 to Non Final Office Action dated Mar. 7, 2014", 14 pgs.
"U.S. Appl. No. 13/255,825, Response filed Oct. 30, 2012 to Non Final Office Action dated Aug. 3, 2012", 18 pgs.
"U.S. Appl. No. 13/275,707, Appeal Brief filed May 26, 2015", 37 pgs.
"U.S. Appl. No. 13/275,707, Examiner Interview Summary dated Apr. 8, 2015", 3 pgs.
"U.S. Appl. No. 13/275,707, Examiner Interview Summary dated Jul. 29, 2013", 3 pgs.
"U.S. Appl. No. 13/275,707, Examiner Interview Summary dated Nov. 28, 2014", 2 pgs.
"U.S. Appl. No. 13/275,707, Final Office Action dated Jul. 30, 2013", 90 pgs.
"U.S. Appl. No. 13/275,707, Final Office Action dated Nov. 28, 2014", 57 pgs.
"U.S. Appl. No. 13/275,707, Non Final Office Action dated Apr. 30, 2014", 94 pgs.
"U.S. Appl. No. 13/275,707, Non Final Office Action dated Dec. 12, 2012", 39 pgs.
"U.S. Appl. No. 13/275,707, Notice of Allowance dated Jul. 27, 2015", 19 pgs.
"U.S. Appl. No. 13/275,707, Response filed Jan. 30, 2014 to Final Office Action dated Jul. 30, 2013", 14 pgs.
"U.S. Appl. No. 13/275,707, Response filed Apr. 9, 2013 to Non Final Office Action dated Dec. 12, 2012", 14 pgs.
"U.S. Appl. No. 13/275,707, Response filed Aug. 28, 2014 to Non Final Office Action dated Apr. 30, 2014", 11 pgs.
"U.S. Appl. No. 13/309,039, Advisory Action dated Apr. 16, 2013", 3 pgs.
"U.S. Appl. No. 13/309,039, Appeal Brief filed Jul. 5, 2013", 18 pgs.
"U.S. Appl. No. 13/309,039, Appeal Brief filed Sep. 3, 2014", 20 pgs.
"U.S. Appl. No. 13/309,039, Appeal Decision mailed Sep. 23, 2016", 10 pgs.
"U.S. Appl. No. 13/309,039, Decision on Pre-Appeal Brief Request mailed Jun. 7, 2013", 2 pgs.
"U.S. Appl. No. 13/309,039, Examiner Interview Summary dated Oct. 23, 2012", 3 pgs.
"U.S. Appl. No. 13/309,039, Examiner's Answer to Appeal Brief dated Nov. 14, 2014", 11 pgs.
"U.S. Appl. No. 13/309,039, Final Office Action dated Jan. 2, 2013", 11 pgs.
"U.S. Appl. No. 13/309,039, Non Final Office Action dated Sep. 11, 2012", 9 pgs.
"U.S. Appl. No. 13/309,039, Non Final Office Action dated Sep. 11, 2013", 13 pgs.
"U.S. Appl. No. 13/309,039, Pre-Appeal Brief Request filed May 6, 2013", 5 pgs.
"U.S. Appl. No. 13/309,039, Response filed Jan. 14, 2015 to Examiner's Answer to Appeal Brief dated Nov. 14, 2014", 8 pgs.
"U.S. Appl. No. 13/309,039, Response filed Apr. 1, 2013 to Final Office Action dated Jan. 2, 2013", 13 pgs.
"U.S. Appl. No. 13/309,039, Response filed Oct. 22, 2012 to Non Final Office Action dated Sep. 11, 2012", 13 pgs.
"U.S. Appl. No. 13/309,060, Advisory Action dated Apr. 18, 2014", 3 pgs.
"U.S. Appl. No. 13/309,060, Appeal Brief filed Apr. 21, 2015", 16 pgs.
"U.S. Appl. No. 13/309,060, Appeal Decision mailed Aug. 25, 2017", 9 pgs.
"U.S. Appl. No. 13/309,060, Final Office Action dated Oct. 11, 2013", 13 pgs.
"U.S. Appl. No. 13/309,060, Final Office Action dated Nov. 28, 2014", 13 pgs.
"U.S. Appl. No. 13/309,060, Final Office Action dated Dec. 7, 2012", 10 pgs.
"U.S. Appl. No. 13/309,060, Non Final Office Action dated May 30, 2013", 11 pgs.
"U.S. Appl. No. 13/309,060, Non Final Office Action dated Jun. 17, 2014", 12 pgs.
"U.S. Appl. No. 13/309,060, Non Final Office Action dated Aug. 1, 2012", 8 pgs.
"U.S. Appl. No. 13/309,060, Notice of Allowance dated Nov. 27, 2017", 7 pgs.
"U.S. Appl. No. 13/309,060, Response filed Mar. 4, 2014 to Final Office Action dated Dec. 24, 2013", 11 pgs.
"U.S. Appl. No. 13/309,060, Response filed Apr. 8, 2013 to Final Office Action dated Dec. 7, 2012", 10 pgs.
"U.S. Appl. No. 13/309,060, Response filed Aug. 15, 2013 to Non Final Office Action dated May 30, 2013", 10 pgs.
"U.S. Appl. No. 13/309,060, Response filed Sep. 20, 2012 to Non Final Office Action dated Aug. 1, 2012", 8 pgs.
"U.S. Appl. No. 13/309,060, Response filed Nov. 17, 2014 to Non Final Office Action dated Jun. 17, 2014", 6 pgs.
"U.S. Appl. No. 13/309,080, Appeal Brief filed May 20, 2014", 12 pgs.

(56) References Cited

OTHER PUBLICATIONS

"U.S. Appl. No. 13/309,080, Appeal Decision mailed May 27, 2016", 8 pgs.
"U.S. Appl. No. 13/309,080, Examiner Interview Summary dated Sep. 5, 2012", 3 pgs.
"U.S. Appl. No. 13/309,080, Examiner Interview Summary dated Dec. 17, 2012", 3 pgs.
"U.S. Appl. No. 13/309,080, Final Office Action dated Oct. 11, 2013", 11 pgs.
"U.S. Appl. No. 13/309,080, Final Office Action dated Nov. 5, 2012", 8 pgs.
"U.S. Appl. No. 13/309,080, Non Final Office Action dated Jun. 10, 2013", 12 pgs.
"U.S. Appl. No. 13/309,080, Non Final Office Action dated Jul. 30, 2012", 8 pgs.
"U.S. Appl. No. 13/309,080, Notice of Non-Compliant Appeal Brief dated Jun. 3, 2014", 2 pgs.
"U.S. Appl. No. 13/309,080, Notice of Panel Decision from Pre-Appeal Brief Review dated May 1, 2014", 2 pgs.
"U.S. Appl. No. 13/309,080, Pre-Appeal Brief Request for Review filed Mar. 4, 2014", 5 pgs.
"U.S. Appl. No. 13/309,080, Response filed Aug. 15, 2013 to Non Final Office Action dated Jun. 10, 2013", 14 pgs.
"U.S. Appl. No. 13/309,080, Response filed Aug. 29, 2012 to Non Final Office Action dated Jul. 30, 2012", 11 pgs.
"U.S. Appl. No. 13/309,080, Response filed Sep. 30, 2014 to Examiner's Answer to Appeal Brief dated Aug. 1, 2014", 5 pgs.
"U.S. Appl. No. 13/309,080, Examiner's Answer to Appeal Brief dated Aug. 1, 2014", 7 pgs.
"U.S. Appl. No. 13/309,102, Appeal Brief filed Jun. 5, 2014", 19 pgs.
"U.S. Appl. No. 13/309,102, Appeal Decision mailed Jun. 1, 2016", 13 pgs.
"U.S. Appl. No. 13/309,102, Decision on Pre-Appeal Brief Request mailed May 1, 2014", 2 pgs.
"U.S. Appl. No. 13/309,102, Examiner's Answer to Appeal Brief dated Jul. 31, 2014", 6 pgs.
"U.S. Appl. No. 13/309,102, Final Office Action dated Nov. 27, 2013", 12 pgs.
"U.S. Appl. No. 13/309,102, Final Office Action dated Dec. 10, 2012", 10 pgs.
"U.S. Appl. No. 13/309,102, Non Final Office Action dated May 30, 2013", 13 pgs.
"U.S. Appl. No. 13/309,102, Non Final Office Action dated Aug. 6, 2012", 7 pgs.
"U.S. Appl. No. 13/309,102, Pre-Appeal Brief Request filed Mar. 26, 2014", 5 pgs.
"U.S. Appl. No. 13/309,102, Response filed Apr. 9, 2013 to Final Office Action dated Dec. 10, 2012", 13 pgs.
"U.S. Appl. No. 13/309,102, Response filed Sep. 5, 2013 to Non Final Office Action dated May 30, 2013", 13 pgs.
"U.S. Appl. No. 13/309,102, Response filed Sep. 25, 2012 to Non Final Office Action dated Aug. 6, 2012", 10 pgs.
"U.S. Appl. No. 13/309,102, Response filed Sep. 30, 2014 to Examiner's Answer to Appeal Brief dated Jul. 31, 2014", 4 pgs.
"U.S. Appl. No. 13/309,127, Appeal Brief filed Apr. 30, 2014", 19 pgs.
"U.S. Appl. No. 13/309,127, Appeal Decision mailed Jul. 26, 2017", 16 pgs.
"U.S. Appl. No. 13/309,127, Final Office Action dated Oct. 10, 2012", 18 pgs.
"U.S. Appl. No. 13/309,127, Final Office Action dated Oct. 22, 2013", 19 pgs.
"U.S. Appl. No. 13/309,127, Non Final Office Action dated Apr. 25, 2013", 19 pgs.
"U.S. Appl. No. 13/309,127, Non Final Office Action dated Jun. 25, 2012", 15 pgs.
"U.S. Appl. No. 13/309,127, Pre-Appeal Brief Request filed Feb. 28, 2014", 5 pgs.

"U.S. Appl. No. 13/309,127, Response filed Mar. 25, 2013 to Final Office Action dated Oct. 10, 2012", 13 pgs.
"U.S. Appl. No. 13/309,127, Response filed Jul. 24, 2013 to Non Final Office Action dated Apr. 25, 2013", 11 pgs.
"U.S. Appl. No. 13/309,127, Response filed Aug. 1, 2012 to Non Final Office Action dated Jun. 25, 2012", 15 pgs.
"U.S. Appl. No. 13/309,127, Response filed Sep. 30, 2014 to Examiner's Answer to Appeal Brief dated Jul. 31, 2014", 6 pgs.
"U.S. Appl. No. 13/309,127, Examiner's Answer to Appeal Brief dated Jul. 31, 2014", 9 pgs.
"U.S. Appl. No. 13/309,146, Advisory Action dated Feb. 12, 2015", 3 pgs.
"U.S. Appl. No. 13/309,146, Appeal Brief filed Jan. 12, 2015", 10 pgs.
"U.S. Appl. No. 13/309,146, Appeal Decision mailed Jun. 1, 2016", 10 pgs.
"U.S. Appl. No. 13/309,146, Final Office Action dated Jun. 27, 2014", 14 pgs.
"U.S. Appl. No. 13/309,146, Non Final Office Action dated Dec. 19, 2013", 10 pgs.
"U.S. Appl. No. 13/309,146, Response filed Apr. 24, 2014 to Non Final Office Action dated Dec. 19, 2013", 10 pgs.
"U.S. Appl. No. 13/309,166, Advisory Action dated Dec. 1, 2017", 3 pgs.
"U.S. Appl. No. 13/309,166, Appeal Brief filed Sep. 1, 2016", 17 pgs.
"U.S. Appl. No. 13/309,166, Examiner Interview Summary dated May 20, 2015", 3 pgs.
"U.S. Appl. No. 13/309,166, Examiner Interview Summary dated Nov. 13, 2017", 5 pgs.
"U.S. Appl. No. 13/309,166, Final Office Action dated Aug. 10, 2017", 15 pgs.
"U.S. Appl. No. 13/309,166, Final Office Action dated Sep. 1, 2015", 11 pgs.
"U.S. Appl. No. 13/309,166, Final Office Action dated Nov. 13, 2013", 9 pgs.
"U.S. Appl. No. 13/309,166, Non Final Office Action dated Feb. 13, 2015", 10 pgs.
"U.S. Appl. No. 13/309,166, Non Final Office Action dated Feb. 22, 2013", 9 pgs.
"U.S. Appl. No. 13/309,166, Non Final Office Action dated May 23, 2013", 9 pgs.
"U.S. Appl. No. 13/309,166, Non Final Office Action dated Dec. 29, 2016", 15 pgs.
"U.S. Appl. No. 13/309,166, Response filed Jan. 10, 2018 to Final Office Action dated Aug. 10, 2017", 9 pgs.
"U.S. Appl. No. 13/309,166, Response filed Apr. 11, 2014 to Final Office Action dated Nov. 13, 2013", 13 pgs.
"U.S. Appl. No. 13/309,166, Response filed May 1, 2017 to Non Final Office Action dated Dec. 29, 2016", 14 pgs.
"U.S. Appl. No. 13/309,166, Response filed May 13, 2015 to Non Final Office Action dated Feb. 13, 2015", 8 pgs.
"U.S. Appl. No. 13/309,166, Response filed May 14, 2013 to Non Final Office Action dated Feb. 22, 2013", 10 pgs.
"U.S. Appl. No. 13/309,166, Response filed Aug. 15, 2013 to Non Final Office Action dated May 23, 2013", 11 pgs.
"U.S. Appl. No. 13/309,166, Response filed Nov. 6, 2017 to Final Office Action dated Aug. 10, 2017", 11 pgs.
"U.S. Appl. No. 13/309,200, Appeal Brief Filed Jun. 8, 2015", 17 pgs.
"U.S. Appl. No. 13/309,200, Appeal Decision mailed Aug. 28, 2017", 12 pgs.
"U.S. Appl. No. 13/309,200, Corrected Notice of Allowability dated Jan. 9, 2019", 2 pgs.
"U.S. Appl. No. 13/309,200, Final Office Action dated Jan. 8, 2015", 14 pgs.
"U.S. Appl. No. 13/309,200, Final Office Action dated Jan. 14, 2014", 15 pgs.
"U.S. Appl. No. 13/309,200, Final Office Action dated Jun. 18, 2018", 18 pgs.
"U.S. Appl. No. 13/309,200, Non Final Office Action dated Jul. 2, 2013", 14 pgs.

(56) References Cited

OTHER PUBLICATIONS

"U.S. Appl. No. 13/309,200, Non Final Office Action dated Sep. 10, 2012", 12 pgs.
"U.S. Appl. No. 13/309,200, Non Final Office Action dated Sep. 24, 2014", 14 pgs.
"U.S. Appl. No. 13/309,200, Non Final Office Action dated Dec. 4, 2017", 17 pgs.
"U.S. Appl. No. 13/309,200, Notice of Allowance dated Dec. 6, 2018", 9 pgs.
"U.S. Appl. No. 13/309,200, Preliminary Amendment filed Dec. 8, 2011", 8 pgs.
"U.S. Appl. No. 13/309,200, Response filed Jan. 2, 2014 to Non Final Office Action dated Jul. 2, 2013", 12 pgs.
"U.S. Appl. No. 13/309,200, Response filed Mar. 11, 2013 to Non Final Office Action dated Sep. 10, 2012", 13 pgs.
"U.S. Appl. No. 13/309,200, Response filed Apr. 4, 2018 to Non Final Office Action dated Dec. 4, 2017", 11 pgs.
"U.S. Appl. No. 13/309,200, Response filed Jul. 10, 2014 to Final Office Action dated Jan. 14, 2014", 13 pgs.
"U.S. Appl. No. 13/309,200, Response filed Jan. 17, 2018 to Final Office Action dated Jun. 18, 2018", 38 pgs.
"U.S. Appl. No. 13/309,200, Response filed Oct. 30, 2017 to Final Office Action dated Jan. 8, 2017", 12 pgs.
"U.S. Appl. No. 13/309,200, Response filed Dec. 23, 2014 to Non Final Office Action dated Sep. 24, 2014", 9 pgs.
"U.S. Appl. No. 13/310,279, Appeal Brief filed Nov. 3, 2014", 19 pgs.
"U.S. Appl. No. 13/310,279, Appeal Brief filed Sep. 11, 2019", 19 pgs.
"U.S. Appl. No. 13/310,279, Appeal Decision mailed Aug. 30, 2017", 9 pgs.
"U.S. Appl. No. 13/310,279, Examiner Interview Summary dated Nov. 19, 2013", 3 pgs.
"U.S. Appl. No. 13/310,279, Final Office Action dated Jul. 23, 2020", 23 pgs.
"U.S. Appl. No. 13/310,279, Final Office Action dated Sep. 10, 2018", 24 pgs.
"U.S. Appl. No. 13/310,279, Final Office Action dated Dec. 3, 2013", 14 pgs.
"U.S. Appl. No. 13/310,279, Non Final Office Action dated Jan. 31, 2020", 25 pgs.
"U.S. Appl. No. 13/310,279, Non Final Office Action dated Feb. 2, 2018", 21 pgs.
"U.S. Appl. No. 13/310,279, Non Final Office Action dated Jun. 17, 2013", 12 pgs.
"U.S. Appl. No. 13/310,279, Pre-Appeal Brief Request filed Apr. 3, 2014", 5 pgs.
"U.S. Appl. No. 13/310,279, Reply Brief dated Jan. 4, 2016 to Appeal Brief filed Nov. 3, 2014", 3 pgs.
"U.S. Appl. No. 13/310,279, Response filed May 2, 2018 to Non Final Office Action dated Feb. 2, 2018", 10 pgs.
"U.S. Appl. No. 13/310,279, Response filed Jun. 1, 2020 to Non Final Office Action dated Jan. 31, 2020", 11 pgs.
"U.S. Appl. No. 13/310,279, Response filed Sep. 13, 2013 to Non Final Office Action dated Jun. 17, 2013", 15 pgs.
"U.S. Appl. No. 13/310,279, Response filed Oct. 30, 2017 to Non Final Office Action dated Dec. 3, 2017", 8 pgs.
"U.S. Appl. No. 13/310,279, Response filed Nov. 23, 2020 to Final Office Action dated Jul. 23, 2020", 11 pgs.
"U.S. Appl. No. 13/310,322, Appeal Brief filed Jan. 15, 2015", 17 pgs.
"U.S. Appl. No. 13/310,322, Appeal Decision mailed Sep. 20, 2017", 18 pgs.
"U.S. Appl. No. 13/310,322, Decision on Pre-Appeal Brief Request mailed Sep. 15, 2015", 2 pgs.
"U.S. Appl. No. 13/310,322, Final Office Action dated Feb. 13, 2014", 15 pgs.
"U.S. Appl. No. 13/310,322, Final Office Action dated Mar. 31, 2015", 16 pgs.
"U.S. Appl. No. 13/310,322, Non Final Office Action dated Jul. 2, 2013", 16 pgs.
"U.S. Appl. No. 13/310,322, Non Final Office Action dated Oct. 3, 2014", 16 pgs.
"U.S. Appl. No. 13/310,322, Pre-Appeal Brief Request filed Jul. 31, 2015", 5 pgs.
"U.S. Appl. No. 13/310,322, Reply Brief filed Aug. 15, 2016", 4 pgs.
"U.S. Appl. No. 13/310,322, Response filed Jan. 5, 2015 to Non Final Office Action dated Oct. 3, 2014", 12 pgs.
"U.S. Appl. No. 13/310,322, Response filed Nov. 1, 2013 to Non Final Office Action dated Jul. 2, 2013", 12 pgs.
"U.S. Appl. No. 13/310,332, Response filed Jul. 14, 2014 to Final Office Action dated Feb. 13, 2014", 12 pgs.
"U.S. Appl. No. 13/310,368, Advisory Action dated Jun. 9, 2015", 3 pgs.
"U.S. Appl. No. 13/310,368, Advisory Action dated Jul. 8, 2015", 2 pgs.
"U.S. Appl. No. 13/310,368, Advisory Action dated Aug. 21, 2015", 2 pgs.
"U.S. Appl. No. 13/310,368, Appeal Brief filed Aug. 2, 2018", 17 pgs.
"U.S. Appl. No. 13/310,368, Appeal Brief filed Aug. 17, 2015", 27 pgs.
"U.S. Appl. No. 13/310,368, Appeal Decision mailed Aug. 30, 2017", 11 pgs.
"U.S. Appl. No. 13/310,368, Final Office Action dated Jan. 7, 2014", 17 pgs.
"U.S. Appl. No. 13/310,368, Final Office Action dated Mar. 18, 2015", 15 pgs.
"U.S. Appl. No. 13/310,368, Final Office Action dated Jul. 18, 2019", 12 pgs.
"U.S. Appl. No. 13/310,368, Non Final Office Action dated Jun. 17, 2013", 17 pgs.
"U.S. Appl. No. 13/310,368, Non Final Office Action dated Sep. 12, 2014", 19 pgs.
"U.S. Appl. No. 13/310,368, Non Final Office Action dated Nov. 29, 2018", 16 pgs.
"U.S. Appl. No. 13/310,368, Non Final Office Action dated Dec. 1, 2017", 17 pgs.
"U.S. Appl. No. 13/310,368, Notice of Allowance dated Dec. 5, 2019", 11 pgs.
"U.S. Appl. No. 13/310,368, Response filed May 18, 2015 to Final Office Action dated Mar. 18, 2015", 11 pgs.
"U.S. Appl. No. 13/310,368, Response filed Jul. 7, 2014 to Final Office Action dated Jan. 7, 2014", 12 pgs.
"U.S. Appl. No. 13/310,368, Response filed Sep. 17, 2013 to Non Final Office Action dated Jun. 17, 2013", 15 pgs.
"U.S. Appl. No. 13/310,368, Response filed Oct. 18, 2019 to Final Office Action dated Jul. 18, 2019", 10 pgs.
"U.S. Appl. No. 13/310,368, Response filed Oct. 30, 2017 to Final Office Action dated Mar. 18, 2015", 8 pgs.
"U.S. Appl. No. 13/310,368, Response filed Dec. 12, 2014 to Non Final Office Action dated Sep. 12, 2014", 9 pgs.
"U.S. Appl. No. 13/310,368, Response filed Apr. 29, 2019 to Non Final Office Action dated Nov. 29, 2018", 12 pgs.
"U.S. Appl. No. 13/310,417, Appeal Brief filed Sep. 11, 2015", 19 pgs.
"U.S. Appl. No. 13/310,417, Final Office Action dated Jan. 9, 2014", 17 pgs.
"U.S. Appl. No. 13/310,417, Final Office Action dated Mar. 11, 2015", 17 pgs.
"U.S. Appl. No. 13/310,417, Non Final Office Action dated Feb. 11, 2016", 12 pgs.
"U.S. Appl. No. 13/310,417, Non Final Office Action dated Jun. 17, 2013", 13 pgs.
"U.S. Appl. No. 13/310,417, Non Final Office Action dated Sep. 8, 2014", 17 pgs.
"U.S. Appl. No. 13/310,417, Response filed May 27, 2014 to Final Office Action dated Jan. 9, 2014", 14 pgs.
"U.S. Appl. No. 13/310,417, Response filed Sep. 17, 2013 to Non Final Office Action dated Jun. 17, 2013", 14 pgs.

(56) References Cited

OTHER PUBLICATIONS

"U.S. Appl. No. 13/310,452, Advisory Action dated Jul. 17, 2014", 3 pgs.
"U.S. Appl. No. 13/310,452, Appeal Brief filed Oct. 17, 2016", 25 pgs.
"U.S. Appl. No. 13/310,452, Appeal Decision mailed Sep. 29, 2017", 20 pgs.
"U.S. Appl. No. 13/310,452, Decision on Pre-Appeal Brief mailed Apr. 17, 2015", 2 pgs.
"U.S. Appl. No. 13/310,452, Final Office Action dated May 1, 2014", 18 pgs.
"U.S. Appl. No. 13/310,452, Final Office Action dated Dec. 15, 2015", 21 pgs.
"U.S. Appl. No. 13/310,452, Non Final Office Action dated May 4, 2015", 17 pgs.
"U.S. Appl. No. 13/310,452, Non Final Office Action dated Jul. 10, 2013", 14 pgs.
"U.S. Appl. No. 13/310,452, Non Final Office Action dated Oct. 6, 2014", 18 pgs.
"U.S. Appl. No. 13/310,452, Pre-Appeal Brief Request filed Mar. 5, 2015", 5 pgs.
"U.S. Appl. No. 13/310,452, Response filed Jan. 10, 2014 to Non Final Office Action dated Jul. 10, 2013", 11 pgs.
"U.S. Appl. No. 13/310,452, Response filed Jul. 1, 2014 to Final Office Action dated May 1, 2014", 11 pgs.
"U.S. Appl. No. 13/310,452, Response filed Sep. 3, 2015 to Non Final Office Action dated May 4, 2015", 14 pgs.
"U.S. Appl. No. 13/312,507, Final Office Action dated Nov. 21, 2014", 12 pgs.
"U.S. Appl. No. 13/312,507, Non Final Office Action dated Mar. 26, 2015", 13 pgs.
"U.S. Appl. No. 13/312,507, Non Final Office Action dated May 27, 2014", 13 pgs.
"U.S. Appl. No. 13/312,507, Notice of Allowance dated Oct. 30, 2015", 19 pgs.
"U.S. Appl. No. 13/312,507, PTO Response to Rule 312 Communication dated Feb. 16, 2016", 2 pgs.
"U.S. Appl. No. 13/312,507, Response filed Feb. 19, 2015 to Final Office Action dated Nov. 21, 2014", 10 pgs.
"U.S. Appl. No. 13/312,507, Response filed Jul. 27, 2015 to Non Final Office Action dated Mar. 26, 2015", 11 pgs.
"U.S. Appl. No. 13/312,507, Response filed Oct. 27, 2014 to Non Final Office Action dated May 27, 2014", 10 pgs.
"U.S. Appl. No. 13/351,533, Final Office Action dated Jan. 23, 2013", 33 pgs.
"U.S. Appl. No. 13/351,533, Final Office Action dated Mar. 20, 2015", 28 pgs.
"U.S. Appl. No. 13/351,533, Non Final Office Action dated Feb. 4, 2014", 26 pgs.
"U.S. Appl. No. 13/351,533, Non Final Office Action dated May 25, 2012", 20 pgs.
"U.S. Appl. No. 13/351,533, Non Final Office Action dated Sep. 6, 2012", 26 pgs.
"U.S. Appl. No. 13/351,533, Non Final Office Action dated Oct. 14, 2014", 25 pgs.
"U.S. Appl. No. 13/351,533, Response filed Jan. 14, 2015 to Non Final Office Action dated Oct. 14, 2014", 18 pgs.
"U.S. Appl. No. 13/351,533, Response filed Apr. 10, 2013 to Final Office Action dated Jan. 23, 2013", 12 pgs.
"U.S. Appl. No. 13/351,533, Response Filed Jun. 3, 2014 to Non Final Office Action dated Feb. 4, 2014", 14 pgs.
"U.S. Appl. No. 13/351,533, Response filed Jun. 8, 2012 to Non Final Office Action dated May 25, 2012", 12 pgs.
"U.S. Appl. No. 13/351,533, Response filed Nov. 20, 2012 to Non Final Office Action dated Sep. 6, 2012", 14 pgs.
"U.S. Appl. No. 13/408,877, Appeal Brief filed Nov. 10, 2015", 14 [gs/.
"U.S. Appl. No. 13/408,877, Appeal Decision mailed Sep. 6, 2017", 23 pgs.
"U.S. Appl. No. 13/408,877, Final Office Action dated May 8, 2015", 24 pgs.
"U.S. Appl. No. 13/408,877, Final Office Action dated Sep. 3, 2013", 27 pgs.
"U.S. Appl. No. 13/408,877, Non Final Office Action dated Feb. 28, 2013", 22 pgs.
"U.S. Appl. No. 13/408,877, Non Final Office Action dated Oct. 8, 2014", 26 pgs.
"U.S. Appl. No. 13/408,877, Response filed Jan. 8, 2015 to Non Final Office Action dated Oct. 8, 2014", 15 pgs.
"U.S. Appl. No. 13/408,877, Response filed May 16, 2013 to Non Final Office Action dated Feb. 28, 2013", 17 pgs.
"U.S. Appl. No. 13/408,877, Response filed Dec. 3, 2013 to Final Office Action dated Sep. 3, 2013", 18 pgs.
"U.S. Appl. No. 13/408,917, Appeal Brief filed Jan. 19, 2016", 18 pgs.
"U.S. Appl. No. 13/408,917, Appeal Decision mailed Sep. 12, 2017", 19 pgs.
"U.S. Appl. No. 13/408,917, Decision on Pre-Appeal Brief Request mailed Sep. 17, 2015", 2 pgs.
"U.S. Appl. No. 13/408,917, Examiner Interview Summary dated Aug. 28, 2013", 3 pgs.
"U.S. Appl. No. 13/408,917, Final Office Action dated May 11, 2015", 23 pgs.
"U.S. Appl. No. 13/408,917, Final Office Action dated Aug. 28, 2013", 24 pgs.
"U.S. Appl. No. 13/408,917, Non Final Office Action dated Mar. 5, 2013", 18 pgs.
"U.S. Appl. No. 13/408,917, Non Final Office Action dated Oct. 9, 2014", 24 pgs.
"U.S. Appl. No. 13/408,917, Pre-Appeal Brief Request filed Aug. 12, 2015", 5 pgs.
"U.S. Appl. No. 13/408,917, Reply Brief filed Oct. 3, 2016", 4 pgs.
"U.S. Appl. No. 13/408,917, Response filed Jan. 9, 2015 to Non Final Office Action dated Oct. 9, 2014", 13 pgs.
"U.S. Appl. No. 13/408,917, Response filed Jun. 3, 2013 to Non Final Office Action dated Mar. 5, 2013", 16 pgs.
"U.S. Appl. No. 13/408,917, Response filed Nov. 27, 2013 to Final Office Action dated Aug. 28, 2013", 17 pgs.
"U.S. Appl. No. 13/409,189 Examiner's Answer dated Jan. 4, 2017", 12 pgs.
"U.S. Appl. No. 13/409,189, Appeal Brief filed Oct. 25, 2016", 30 pgs.
"U.S. Appl. No. 13/409,189, Appeal Decision mailed Dec. 18, 2017", 14 pgs.
"U.S. Appl. No. 13/409,189, Examiner Interview Summary dated Aug. 30, 2013", 3 pgs.
"U.S. Appl. No. 13/409,189, Final Office Action dated May 8, 2015", 23 pgs.
"U.S. Appl. No. 13/409,189, Final Office Action dated Aug. 28, 2013", 22 pgs.
"U.S. Appl. No. 13/409,189, Non Final Office Action dated Feb. 28, 2013", 20 pgs.
"U.S. Appl. No. 13/409,189, Non Final Office Action dated Oct. 9, 2014", 23 pgs.
"U.S. Appl. No. 13/409,189, Non Final Office Action dated Dec. 23, 2015", 12 pgs.
"U.S. Appl. No. 13/409,189, Response filed Jan. 9, 2015 to Non Final Office Action dated Oct. 9, 2014", 13 pgs.
"U.S. Appl. No. 13/409,189, Response filed May 28, 2013 to Non Final Office Action dated Feb. 28, 2013", 16 pgs.
"U.S. Appl. No. 13/409,189, Response filed Sep. 8, 2005 to Final Office Action dated May 8, 2015", 16 pgs.
"U.S. Appl. No. 13/409,189, Response filed Nov. 27, 2013 to Final Office Action dated Aug. 28, 2013", 15 pgs.
"U.S. Appl. No. 13/422,750, Final Office Action dated Jun. 15, 2016", 37 pgs.
"U.S. Appl. No. 13/422,750, Final Office Action dated Aug. 7, 2013", 29 pgs.
"U.S. Appl. No. 13/422,750, Non Final Office Action dated Apr. 1, 2014", 32 pgs.
"U.S. Appl. No. 13/422,750, Non Final Office Action dated Apr. 12, 2013", 19 pgs.

(56) References Cited

OTHER PUBLICATIONS

"U.S. Appl. No. 13/422,750, Non Final Office Action dated Oct. 31, 2014", 32 pgs.
"U.S. Appl. No. 13/422,750, Response filed Jan. 30, 2014 to Final Office Action dated Aug. 7, 2013", 13 pgs.
"U.S. Appl. No. 13/422,750, Response filed Feb. 2, 2015 to Non Final Office Action dated Oct. 31, 2014", 11 pgs.
"U.S. Appl. No. 13/422,750, Response filed Jul. 12, 2013 to Non Final Office Action dated Apr. 12, 2013", 14 pgs.
"U.S. Appl. No. 13/422,750, Response filed Sep. 2, 2014 to Non Final Office Action dated Apr. 1, 2014", 10 pgs.
"U.S. Appl. No. 13/424,682, Non Final Office Action dated Apr. 11, 2013", 6 pgs.
"U.S. Appl. No. 13/424,682, Notice of Allowance dated Jul. 30, 2013", 13 pgs.
"U.S. Appl. No. 13/424,682, Response filed Jul. 5, 2013 to Non Final Office Action dated Apr. 11, 2013", 10 pgs.
"U.S. Appl. No. 13/424,705, Advisory Action dated Nov. 29, 2013", 3 pgs.
"U.S. Appl. No. 13/424,705, Final Office Action dated Sep. 11, 2015", 28 pgs.
"U.S. Appl. No. 13/424,705, Final Office Action dated Sep. 19, 2013", 11 pgs.
"U.S. Appl. No. 13/424,705, Non Final Office Action dated Apr. 12, 2013", 14 pgs.
"U.S. Appl. No. 13/424,705, Non Final Office Action dated Jun. 16, 2014", 21 pgs.
"U.S. Appl. No. 13/424,705, Non Final Office Action dated Jul. 23, 2014", 21 pgs.
"U.S. Appl. No. 13/424,705, Response filed Jul. 12, 2013 to Non Final Office Action dated Apr. 12, 2013", 11 pgs.
"U.S. Appl. No. 13/424,705, Response filed Nov. 19, 2013 to Final Office Action dated Sep. 19, 2013", 11 pgs.
"U.S. Appl. No. 13/424,705, Response filed Nov. 24, 2014 to Non Final Office Action dated Jul. 23, 2014", 14 pgs.
"U.S. Appl. No. 13/452,400, Examiner Interview Summary dated Sep. 11, 2013", 3 pgs.
"U.S. Appl. No. 13/452,400, Final Office Action dated Jul. 5, 2013", 25 pgs.
"U.S. Appl. No. 13/452,400, Final Office Action dated Jul. 30, 2015", 32 pgs.
"U.S. Appl. No. 13/452,400, Non Final Office Action dated Jan. 15, 2015", 24 pgs.
"U.S. Appl. No. 13/452,400, Non Final Office Action dated Oct. 5, 2012", 23 pgs.
"U.S. Appl. No. 13/452,400, Preliminary Amendment filed May 16, 2012", 3 pgs.
"U.S. Appl. No. 13/452,400, Response filed Jan. 7, 2013 to Non Final Office Action dated Oct. 5, 2012", 12 pgs.
"U.S. Appl. No. 13/452,400, Response filed Apr. 15, 2015 to Non Final Office Action dated Jan. 15, 2015", 31 pgs.
"U.S. Appl. No. 13/452,400, Response filed Sep. 26, 2013 to Final Office Action", 12 pgs.
"U.S. Appl. No. 13/553,572 Response filed Jun. 3, 2013 to Non-Final Office Action dated Mar. 7, 2013", 17 pgs.
"U.S. Appl. No. 13/553,572, Final Office Action dated Jul. 2, 2013", 12 pgs.
"U.S. Appl. No. 13/553,572, Non Final Office Action dated Mar. 7, 2013", 14 pgs.
"U.S. Appl. No. 13/553,572, Non Final Office Action dated Nov. 4, 2014", 13 pgs.
"U.S. Appl. No. 13/553,572, Preliminary Amendment filed Sep. 17, 2012", 7 pgs.
"U.S. Appl. No. 13/553,572, Response filed Jan. 2, 2014 to Final Office Action dated Jul. 2, 2013", 15 pgs.
"U.S. Appl. No. 13/553,596, Advisory Action dated Apr. 29, 2015", 3 pgs.
"U.S. Appl. No. 13/553,596, Final Office Action dated Feb. 4, 2015", 16 pgs.
"U.S. Appl. No. 13/553,596, Non Final Office Action dated Jul. 28, 2014", 14 pgs.
"U.S. Appl. No. 13/553,596, Non Final Office Action dated Aug. 31, 2015", 17 pgs.
"U.S. Appl. No. 13/553,596, Response filed Apr. 6, 2015 to Final Office Action dated Feb. 4, 2015", 10 pgs.
"U.S. Appl. No. 13/553,596, Response filed Nov. 26, 2014 to Non Final Office Action dated Jul. 28, 2014", 8 pgs.
"U.S. Appl. No. 13/573,803, Appeal Brief filed Dec. 29, 2015", 20 pgs.
"U.S. Appl. No. 13/573,803, Appeal Decision mailed Jul. 28, 2017", 24 pgs.
"U.S. Appl. No. 13/573,803, Final Office Action dated Apr. 7, 2015", 16 pgs.
"U.S. Appl. No. 13/573,803, Non Final Office Action dated Sep. 15, 2014", 15 pgs.
"U.S. Appl. No. 13/573,803, Non Final Office Action dated Dec. 5, 2013", 16 pgs.
"U.S. Appl. No. 13/573,803, Reply Brief filed Jul. 13, 2016", 6 pgs.
"U.S. Appl. No. 13/573,803, Response filed Jun. 5, 2014 to Non Final Office Action dated Dec. 5, 2013", 12 pgs.
"U.S. Appl. No. 13/573,803, Response filed Dec. 15, 2014 to Non Final Office Action dated Sep. 15, 2014", 12 pgs.
"U.S. Appl. No. 13/573,804, Final Office Action dated Mar. 23, 2015", 16 pgs.
"U.S. Appl. No. 13/573,804, Non Final Office Action dated Oct. 20, 2014", 15 pgs.
"U.S. Appl. No. 13/573,804, Response filed Jan. 20, 2015 to Non Final Office Action dated Oct. 20, 2014", 15 pgs.
"U.S. Appl. No. 13/573,804, Response filed Aug. 29, 2014 to Restriction Requirement dated Jun. 30, 2014", 8 pgs.
"U.S. Appl. No. 13/573,804, Restriction Requirement dated Jun. 30, 2014", 5 pgs.
"U.S. Appl. No. 13/594,002, Final Office Action dated Mar. 19, 2015", 36 pgs.
"U.S. Appl. No. 13/594,002, Final Office Action dated Jul. 31, 2013", 24 pgs.
"U.S. Appl. No. 13/594,002, Final Office Action dated Sep. 6, 2016", 55 pgs.
"U.S. Appl. No. 13/594,002, Non Final Office Action dated Feb. 27, 2013", 21 pgs.
"U.S. Appl. No. 13/594,002, Non Final Office Action dated Nov. 30, 2015", 41 pgs.
"U.S. Appl. No. 13/594,002, Non Final Office Action dated Dec. 4, 2014", 29 pgs.
"U.S. Appl. No. 13/594,002, Response filed Mar. 3, 2015 to Non Final Office Action dated Dec. 4, 2014", 23 pgs.
"U.S. Appl. No. 13/594,002, Response filed May 14, 2013 to Non Final Office Action dated Feb. 27, 2013", 11 pgs.
"U.S. Appl. No. 13/594,002, Response filed May 31, 2016 to Non Final Office Action dated Nov. 30, 2015", 12 pgs.
"U.S. Appl. No. 13/594,002, Response filed Aug. 19, 2015 to Final Office Action dated Mar. 19, 2015", 14 pgs.
"U.S. Appl. No. 13/594,002, Response filed Oct. 28, 2013 to Final Office Action dated Jul. 31, 2013", 11 pgs.
"U.S. Appl. No. 13/679,830, Examiner Interview Summary dated Sep. 28, 2017", 3 pgs.
"U.S. Appl. No. 13/679,830, Final Office Action dated Jan. 31, 2014", 27 pgs.
"U.S. Appl. No. 13/679,830, Final Office Action dated Apr. 23, 2015", 36 pgs.
"U.S. Appl. No. 13/679,830, Final Office Action dated Sep. 9, 2016", 59 pgs.
"U.S. Appl. No. 13/679,830, Final Office Action dated Nov. 15, 2017", 98 pgs.
"U.S. Appl. No. 13/679,830, Non Final Office Action dated Jan. 4, 2016", 61 pgs.
"U.S. Appl. No. 13/679,830, Non Final Office Action dated Jun. 14, 2013", 21 pgs.
"U.S. Appl. No. 13/679,830, Non Final Office Action dated Jun. 15, 2017", 82 pgs.
"U.S. Appl. No. 13/679,830, Non Final Office Action dated Nov. 6, 2014", 36 pgs.

(56) References Cited

OTHER PUBLICATIONS

"U.S. Appl. No. 13/679,830, Response filed Feb. 6, 2015 to Non Final Office Action dated Nov. 6, 2014", 12 pgs.
"U.S. Appl. No. 13/679,830, Response filed Feb. 9, 2017 to Final Office Action dated Sep. 9, 2016", 19 pgs.
"U.S. Appl. No. 13/679,830, Response filed Jun. 12, 2014 to Final Office Action dated Jan. 31, 2014", 16 pgs.
"U.S. Appl. No. 13/679,830, Response filed Jul. 5, 2016 to Non Final Office Action dated Jan. 4, 2016", 11 pgs.
"U.S. Appl. No. 13/679,830, Response filed Sep. 23, 2015 to Final Office Action dated Apr. 23, 2015", 14 pgs.
"U.S. Appl. No. 13/679,830, Response Filed Oct. 16, 2017 to Non Final Office Action dated Jun. 15, 2017", 13 pgs.
"U.S. Appl. No. 13/679,830, Response filed Nov. 14, 2013 to Non Final Office Action dated Jun. 14, 2013", 14 pgs.
"U.S. Appl. No. 14/010,376, Appeal Brief filed Apr. 19, 2016", 19 pgs.
"U.S. Appl. No. 14/010,376, Appeal Decision mailed Sep. 8, 2017", 17 pgs.
"U.S. Appl. No. 14/010,376, Final Office Action dated Aug. 19, 2015", 13 pgs.
"U.S. Appl. No. 14/010,376, Non Final Office Action dated Mar. 24, 2015", 10 pgs.
"U.S. Appl. No. 14/010,376, Reply Brief filed Nov. 22, 2016", 5 pgs.
"U.S. Appl. No. 14/010,376, Response filed Jun. 24, 2015 to Non Final Office Action dated Mar. 24, 2015", 10 pgs.
"U.S. Appl. No. 14/010,380, Appeal Decision mailed Sep. 27, 2017", 18 pgs.
"U.S. Appl. No. 14/010,380, Examiners Answer dated Nov. 9, 2016", 8 pgs.
"U.S. Appl. No. 14/010,380, Final Office Action dated Oct. 6, 2015", 11 pgs.
"U.S. Appl. No. 14/010,380, Non Final Office Action dated Apr. 15, 2015", 11 pgs.
"U.S. Appl. No. 14/010,380, Reply Brief filed Jan. 9, 2017", 6 pgs.
"U.S. Appl. No. 14/010,380, Response filed Aug. 17, 2015 to Non Final Office Action dated Apr. 15, 2015", 11 pgs.
"U.S. Appl. No. 14/010,391, Appeal Brief filed Aug. 15, 2016", 23 pgs.
"U.S. Appl. No. 14/010,391, Appeal Decision mailed Oct. 25, 2017", 19 pgs.
"U.S. Appl. No. 14/010,391, Examiners Answer dated Nov. 9, 2016", 10 pgs.
"U.S. Appl. No. 14/010,391, Final Office Action dated Sep. 15, 2015", 11 pgs.
"U.S. Appl. No. 14/010,391, Non Final Office Action dated Mar. 23, 2015", 11 pgs.
"U.S. Appl. No. 14/010,391, Reply Brief filed Jan. 9, 2017", 6 pgs.
"U.S. Appl. No. 14/010,391, Response filed Jul. 22, 2015 to Non Final Office Action dated Mar. 23, 2015", 10 pgs.
"U.S. Appl. No. 14/010,400, Appeal Brief filed Aug. 8, 2016", 17 pgs.
"U.S. Appl. No. 14/010,400, Appeal Decision mailed Nov. 3, 2017", 16 pgs.
"U.S. Appl. No. 14/010,400, Examiners Answer dated Nov. 9, 2016", 9 pgs.
"U.S. Appl. No. 14/010,400, Final Office Action dated Sep. 10, 2015", 9 pgs.
"U.S. Appl. No. 14/010,400, Non Final Office Action dated Apr. 22, 2015", 11 pgs.
"U.S. Appl. No. 14/010,400, Response filed Jul. 22, 2015 to Non Final Office Action dated Apr. 22, 2015", 10 pgs.
"U.S. Appl. No. 14/010,903, Examiners Answer dated Nov. 9, 2016", 9 pgs.
"U.S. Appl. No. 14/094,542, Final Office Action dated Feb. 9, 2015", 6 pgs.
"U.S. Appl. No. 14/094,542, Final Office Action dated Sep. 2, 2015", 6 pgs.

"U.S. Appl. No. 14/094,542, Non Final Office Action dated Feb. 12, 2014", 7 pgs.
"U.S. Appl. No. 14/094,542, Non Final Office Action dated May 19, 2015", 5 pgs.
"U.S. Appl. No. 14/094,542, Non Final Office Action dated Aug. 15, 2014", 7 pgs.
"U.S. Appl. No. 14/094,542, Response filed Jan. 15, 2015 to Non Final Office Action dated Aug. 15, 2014", 10 pgs.
"U.S. Appl. No. 14/094,542, Response filed May 11, 2015 to Final Office Action dated Feb. 9, 2015", 12 pgs.
"U.S. Appl. No. 14/094,542, Response filed Jul. 14, 2014 to Non Final Office Action dated Feb. 12, 2014", 12 pgs.
"U.S. Appl. No. 14/094,542, Response filed Aug. 19, 2015 to Non Final Office Action dated May 19, 2015", 12 pgs.
"U.S. Appl. No. 14/483,903, Appeal Brief filed Oct. 11, 2016", 21 pgs.
"U.S. Appl. No. 14/483,903, Appeal Decision mailed Sep. 25, 2017", 18 pgs.
"U.S. Appl. No. 14/483,903, Final Office Action dated Feb. 10, 2016", 11 pgs.
"U.S. Appl. No. 14/483,903, Non Final Office Action dated Sep. 1, 2015", 10 pgs.
"U.S. Appl. No. 14/483,903, Reply Brief filed Jan. 9, 2017", 6 pgs.
"U.S. Appl. No. 14/483,903, Response filed Jan. 4, 2016 to Non Final Office Action dated Sep. 1, 2015", 11 pgs.
"U.S. Appl. No. 14/540,346, Non Final Office Action dated Aug. 24, 2015", 16 pgs.
"U.S. Appl. No. 14/540,346, Notice of Allowance dated Mar. 18, 2016", 7 pgs.
"U.S. Appl. No. 14/540,346, Preliminary Amendment filed Dec. 11, 2014", 8 pgs.
"U.S. Appl. No. 14/540,346, Response filed Dec. 23, 2015 to Non Final Office Action dated Aug. 24, 2015", 7 pgs.
"U.S. Appl. No. 14/608,520, Appeal Brief filed May 12, 2017", 25 pgs.
"U.S. Appl. No. 14/608,520, Appeal Decision mailed Nov. 27, 2017", 14 pgs.
"U.S. Appl. No. 14/608,520, Final Office Action dated Oct. 12, 2016", 44 pgs.
"U.S. Appl. No. 14/608,520, Non Final Office Action dated Mar. 18, 2016", 39 pgs.
"U.S. Appl. No. 14/608,520, Non Final Office Action dated Oct. 15, 2015", 19 pgs.
"U.S. Appl. No. 14/608,520, Preliminary Amendment filed Feb. 26, 2015", 10 pgs.
"U.S. Appl. No. 14/608,520, Response filed Jan. 15, 2016 to Non Final Office Action dated Oct. 15, 2015", 9 pgs.
"U.S. Appl. No. 14/608,520, Response filed Sep. 19, 2016 to Non Final Office Action dated Mar. 18, 2016", 12 pgs.
"U.S. Appl. No. 14/628,941, Appeal Brief filed May 12, 2017".
"U.S. Appl. No. 14/628,941, Appeal Decision mailed Dec. 6, 2017", 14 pgs.
"U.S. Appl. No. 14/628,941, Final Office Action dated Oct. 13, 2016", 43 pgs.
"U.S. Appl. No. 14/628,941, Non Final Office Action dated Mar. 18, 2016", 38 pgs.
"U.S. Appl. No. 14/628,941, Non Final Office Action dated Sep. 24, 2015", 21 pgs.
"U.S. Appl. No. 14/628,941, Preliminary Amendment filed Feb. 26, 2015", 9 pgs.
"U.S. Appl. No. 14/628,941, Response filed Sep. 19, 2016 to Non Final Office Action dated Mar. 18, 2016", 12 pgs.
"U.S. Appl. No. 14/628,941, Response filed Dec. 23, 2015 to Non Final Office Action dated Sep. 24, 2015", 9 pgs.
"U.S. Appl. No. 14/826,006, Advisory Action dated May 10, 2017", 3 pgs.
"U.S. Appl. No. 14/826,006, Final Office dated Jan. 17, 2017", 13 pgs.
"U.S. Appl. No. 14/826,006, Final Office Action dated Jan. 19, 2018", 17 pgs.
"U.S. Appl. No. 14/826,006, Non Final Office Action dated Jun. 2, 2016", 11 pgs.

(56) References Cited

OTHER PUBLICATIONS

"U.S. Appl. No. 14/826,006, Non Final Office Action dated Aug. 18, 2017", 16 pgs.
"U.S. Appl. No. 14/826,006, Preliminary Amendment filed Aug. 28, 2015", 6 pgs.
"U.S. Appl. No. 14/826,006, Response filed Apr. 18, 2017 to Final Office Action dated Jan. 17, 2017", 13 pgs.
"U.S. Appl. No. 14/826,006, Response filed Nov. 1, 2016 to Non Final Office Action dated Jun. 2, 2016", 7 pgs.
"U.S. Appl. No. 14/826,006, Response filed Nov. 17, 2017 to Non Final Office Action dated Aug. 18, 2017", 11 pgs.
"U.S. Appl. No. 14/826,018, Non Final Office Action dated Jan. 11, 2017", 19 pgs.
"U.S. Appl. No. 14/826,018, Notice of Allowance dated Aug. 28, 2017", 13 pgs.
"U.S. Appl. No. 14/826,018, Preliminary Amendment filed Aug. 28, 2015", 8 pgs.
"U.S. Appl. No. 14/826,018, Response Filed May 11, 2017 to Non Final Office Action dated Jan. 11, 2017", 14 pgs.
"U.S. Appl. No. 14/826,025, Final Office Action dated May 15, 2017", 13 pgs.
"U.S. Appl. No. 14/826,025, Non Final Office Action dated Aug. 25, 2016", 14 pgs.
"U.S. Appl. No. 14/826,025, Preliminary Amendment filed Aug. 28, 2015", 6 pgs.
"U.S. Appl. No. 14/826,025, Response filed Jan. 25, 2017 to Non Final Office Action dated Aug. 25, 2016", 13 pgs.
"U.S. Appl. No. 14/952,699, Non Final Office Action dated Jun. 8, 2016", 9 pgs.
"U.S. Appl. No. 14/952,699, Notice of Allowability dated Oct. 7, 2016", 5 pgs.
"U.S. Appl. No. 14/952,699, Notice of Allowance dated Jan. 9, 2017", 9 pgs.
"U.S. Appl. No. 14/952,699, Notice of Allowance dated Sep. 19, 2016", 8 pgs.
"U.S. Appl. No. 14/952,699, Preliminary Amendment filed May 27, 2016", 8 pgs.
"U.S. Appl. No. 14/952,699, Response filed Sep. 8, 2016 to Non Final Office Action dated Jun. 8, 2016", 8 pgs.
"U.S. Appl. No. 15/057,047, Non Final Office Action dated Sep. 29, 2016", 19 pgs.
"U.S. Appl. No. 15/057,047, Notice of Allowance dated Feb. 10, 2017", 11 pgs.
"U.S. Appl. No. 15/057,047, Preliminary Amendment filed Sep. 15, 2016", 5 pgs.
"U.S. Appl. No. 15/057,047, Response Filed Dec. 29, 2016 to Non Final Office Action dated Sep. 29, 2016", 11 pgs.
"U.S. Appl. No. 15/211,917, Non Final Office Action dated Nov. 15, 2017", 13 pgs.
"U.S. Appl. No. 15/211,917, Preliminary Amendment filed Dec. 2, 2016", 8 pgs.
"U.S. Appl. No. 15/595,629, Preliminary Amendment filed Jul. 24, 2017", 8 pgs.
"U.S. Appl. No. 15/619,150, Preliminary Amendment filed Aug. 28, 2017", 8 pgs.
"U.S. Appl. No. 15/849,362, Final Office Action dated May 2, 2019", 8 pgs.
"U.S. Appl. No. 15/849,362, Non Final Office Action dated Oct. 5, 2018", 9 pgs.
"U.S. Appl. No. 15/849,362, Notice of Allowance dated Jul. 18, 2019", 10 pgs.
"U.S. Appl. No. 15/849,362, Notice of Allowance dated Nov. 20, 2019", 11 pgs.
"U.S. Appl. No. 15/849,362, Preliminary Amendment filed Feb. 22, 2018", 7 pgs.
"U.S. Appl. No. 15/849,362, Response filed Jan. 7, 2019 to Non Final Office Action dated Oct. 5, 2018", 14 pgs.
"U.S. Appl. No. 15/849,362, Response filed Jul. 2, 2019 to Final Office Action dated May 2, 2019", 10 pgs.
"U.S. Appl. No. 16/352,364, Non Final Office Action dated Aug. 27, 2020", 10 pgs.
"U.S. Appl. No. 16/352,364, Preliminary Amendment filed Dec. 27, 2019", 8 pgs.
"U.S. Appl. No. 16/730,678, Corrected Notice of Allowability dated Nov. 8, 2021", 2 pgs.
"U.S. Appl. No. 16/730,678, Non Final Office Action dated May 7, 2021", 10 pgs.
"U.S. Appl. No. 16/730,678, Notice of Allowance dated Oct. 29, 2021", 9 pgs.
"U.S. Appl. No. 16/730,678, Response filed Oct. 7, 2021 to Non Final Office Action dated May 7, 2021", 8 pgs.
"U.S. Appl. No. 17/025,847, Preliminary Amendment filed Feb. 3, 2021", 8 pgs.
"U.S. Appl. No. 13/310,417, Response filed Dec. 8, 2014 to Non Final Office Action dated Sep. 8, 2014", 11 pgs.
"U.S. Appl. No. 13/408,877, Reply Brief dated Aug. 8, 2016", 5 pgs.
"ClaimMaster Software User Guide", ClaimMaster Software LLP, (2009), 36 pgs.
"Definition of Timeline", [Online] Retrieved from the Internet: <URL: https://www.yourdictionary.com/>, (Mar. 17, 2015), 1 pg.
"East Text Search Training", (Jan. 2000), 155 pgs.
"Google Definition: System", [Online] Retrieved from the Internet: <URL: http://www.google.com>, (Retrieved Aug. 13, 2012), 3 pgs.
"International Search Report and Written Opinion in PCT/US05/26768, dated Mar. 7, 2007", 15 pgs.
"Module", Dictionary.com, [Online] Retrieved from Internet: <URL: http://dictionary.reference.com/browse/module>, (Retrieved Aug. 13, 2012), 5 pgs.
"Patent Rank: A Network-Dominant Logic for Innovation", Submitted to Marketing Science, manuscript MKSC-Oct 10-0356, (Oct. 2010), 36 pgs.
"Patentoptimizer", LexisNexis, (2009), 2 pgs.
Brinn, Michael W, et al., "Investigation of forward citation count as a patent analysis method", Proceedings of the 2003 Systems and Information Engineering Design Symposium, (2003), 6 pgs.
Fenton, Gillian M., et al., "Freedom to Operate: The Law Firms Approach and Role", In: Intellectual Property Management in Health and Agricultural Innovation: A Handbook of Best Practices, [online], [retrieved on Mar. 17, 2015], Retrieved from the Internet: <URL: www.iphandbook.org/handbook/ch14/p04/index_print.html>, (2007), 11 pgs.
Gipp, Bela, et al., "Comparative Evaluation of Text- and Citation based Plagiarism Detection Approaches using GuttenPlag", [Online] Retrieved from the Internet: <URL: http://gipp.com/wp-content/papercite-data/pdf/gipp11b.pdf>, (2011), 4 pgs.
Hall, et al., "Market Value and Patent Citations", The RAND Journal of Economics, vol. 36, No. 1, (2005), 16-38.
Jagalla, Christopher, "Searching USPTO Assignments on the Web", (Nov. 20, 2010), 4 pgs.
Larkey, Leah S, et al., "Collection Selection and Results Merging with Topically Organized U.S. Patents and TREC Data", Proc. of the 9th Int'l Conference on Information and Knowledge Management, (2000), 8 pgs.
Mahesh, K., "Ontology Development for Machine Translation: Ideology and Methodology", Technical Report MCCS-96-292, Computing Research Laboratory, New Mexico State University, (1996), 87 pgs.
Mary, Ellen Mogee, et al., "Patent co-citation analysis of Eli Lilly & Co. patents", Expert Opinion on Therapeutic Patents, (Feb. 25, 2005)
Sheremetyeva, Svetlana, "Natural Language Analysis of Patent Claims", Department of Computational Linguistics Copenhagen Business School, Bernhard Bangs Alle 17 B, DK-year 2000, Denmark, (2000), 66-73.
Woods, W. A, "Conceptual Indexing: A Better Way to Organize Knowledge", Sun Microsystems, Inc., (1997), 99 pgs.
U.S. Appl. No. 16/730,678, Notice of Allowability dated Mar. 16, 2022, 2 pgs.
U.S. Appl. No. 17/025,847, Non Final Office Action dated Sep. 29, 2022, 18 pgs.
U.S. Appl. No. 17/589,635, Non Final Office Action dated Oct. 25, 2022, 11 pgs.

(56) References Cited

OTHER PUBLICATIONS

"U.S. Appl. No. 10/710,656, Non Final Office Action dated Jan. 17, 2007", 16 pgs.
"U.S. Appl. No. 10/710,656, Response filed Nov. 13, 2006 to Restriction Requirement dated Oct. 13, 2006", 6 pgs.
"U.S. Appl. No. 10/710,656, Restriction Requirement dated Oct. 13, 2006", 9 pgs/
"U.S. Appl. No. 11/494,278, Final Office Action dated Mar. 23, 2009", 21 pgs.
"U.S. Appl. No. 11/494,278, Final Office Action dated Apr. 1, 2010", 20 pgs.
"U.S. Appl. No. 11/494,278, Non Final Office Action dated Oct. 8, 2009", 21 pgs.
"U.S. Appl. No. 11/494,278, Non-Final Office Action dated Mar. 5, 2008", 14 pgs.
"U.S. Appl. No. 11/494,278, Notice of Allowance dated May 3, 2011", 12 pgs.
"U.S. Appl. No. 11/494,278, Notice of Allowance dated Dec. 15, 2011", 14 pgs.
"U.S. Appl. No. 11/494,278, Notice of Non-Compliant Amendment dated Jun. 7, 2010", 2 pgs.
"U.S. Appl. No. 11/494,278, Preliminary Amendment filed Oct. 30, 2007", 6 pgs.
"U.S. Appl. No. 11/494,278, Response filed Feb. 10, 2010 to Non Final Office Action dated Oct. 8, 2009", 8 pgs.
"U.S. Appl. No. 11/494,278, Response filed Jun. 2, 2010 to Final Office Action dated Apr. 1, 2010", 7 pgs.
"U.S. Appl. No. 11/494,278, Response filed Jun. 5, 2008 to Non-Final Office Action dated Mar. 5, 2008", 12 pgs.
"U.S. Appl. No. 11/494,278, Response filed Jun. 9, 2010 to Notice of Non-Compliant Amendment dated Jun. 7, 2010", 7 pgs.
"U.S. Appl. No. 11/494,278, Response filed Jun. 23, 2009 to Final Office Action dated Mar. 23, 2009", 8 pgs.
"U.S. Appl. No. 11/888,632, Amendment filed Jun. 12, 2012", 8 pgs.
"U.S. Appl. No. 11/888,632, Appeal Brief filed Jun. 4, 2015", 16 pgs.
"U.S. Appl. No. 11/888,632, Appeal Decision mailed Jan. 19, 2017", 8 pgs.
"U.S. Appl. No. 11/888,632, Decision on Pre-Appeal Brief mailed Mar. 9, 2012", 2 pgs.
"U.S. Appl. No. 11/888,632, Final Office Action dated Sep. 8, 2014", 12 pgs.
"U.S. Appl. No. 11/888,632, Final Office Action dated Oct. 19, 2011", 9 pgs.
"U.S. Appl. No. 11/888,632, Non Final Office Action dated Jan. 19, 2011", 12 pgs.
"U.S. Appl. No. 11/888,632, Non Final Office Action dated Jan. 24, 2014", 12 pgs.
"U.S. Appl. No. 11/888,632, Pre-Appeal Brief Request filed Feb. 21, 2012", 4 pgs.
"U.S. Appl. No. 11/888,632, Response filed Jun. 24, 2014 to Non Final Office Action dated Jan. 24, 2014", 9 pgs.
"U.S. Appl. No. 11/888,632, Response filed Jul. 19, 2011 to Non Final Office Action dated Jan. 19, 2011", 8 pgs.
"U.S. Appl. No. 11/888,632, Response filed Dec. 7, 2010, to Restriction Requirement dated Jul. 7, 2010", 7 pgs.
"U.S. Appl. No. 11/888,632, Restriction Requirement dated Jul. 7, 2010", 5 pgs.
"U.S. Appl. No. 11/915,718, Advisory Action dated Feb. 15, 2012", 3 pgs.
"U.S. Appl. No. 11/915,718, Final Office Action dated Dec. 30, 2011", 13 pgs.
"U.S. Appl. No. 11/915,718, Non Final Office Action dated May 26, 2011", 9 pgs.
"U.S. Appl. No. 11/915,718, Non Final Office Action dated Jul. 7, 2014", 17 pgs.
"U.S. Appl. No. 11/915,718, Notice of Non-Compliant Amendment dated Oct. 6, 2011", 2 pgs.
"U.S. Appl. No. 11/915,718, Preliminary Amendment filed Nov. 27, 2007", 2 pgs.
"U.S. Appl. No. 11/915,718, Response filed Feb. 8, 2012 to Final Office Action dated Dec. 30, 2011", 13 pgs.
"U.S. Appl. No. 11/915,718, Response filed Sep. 26, 2011 to Non-Final Office Action dated May 26, 2011", 9 pgs.
"U.S. Appl. No. 11/915,718, Response filed Oct. 11, 2011 to Notice of Non-Compliant Amendment dated Oct. 6, 2011", 4 pgs.
"U.S. Appl. No. 12/605,030, Appeal Decision mailed Sep. 1, 2017", 14 pgs.
"U.S. Appl. No. 12/605,030, Final Office Action dated May 21, 2012", 10 pgs.
"U.S. Appl. No. 12/605,030, Final Office Action dated Jul. 16, 2014", 16 pgs.
"U.S. Appl. No. 12/605,030, Non Final Office Action dated Oct. 7, 2011", 12 pgs.
"U.S. Appl. No. 12/605,030, Non Final Office dated Nov. 7, 2013", 16 pgs.
"U.S. Appl. No. 12/605,030, Response filed Feb. 7, 2012 to Non Final Office Action dated Oct. 7, 2011", 9 pgs.
"U.S. Appl. No. 12/605,030, Response Filed May 7, 2014 to Non Final Office Action dated Nov. 7, 2013", 8 pgs.
"U.S. Appl. No. 12/605,030, Response filed Oct. 22, 2012 to Final Office Action dated May 21, 2012", 8 pgs.
"U.S. Appl. No. 13/365,062, Non Final Office Action dated Mar. 19, 2015", 14 pgs.
"U.S. Appl. No. 13/365,062, Non Final Office Action dated Apr. 30, 2014", 13 pgs.
"U.S. Appl. No. 13/365,062, Non Final Office Action dated Aug. 19, 2013", 14 pgs.
"U.S. Appl. No. 13/365,062, Non Final Office Action dated Oct. 9, 2014", 13 pgs.
"U.S. Appl. No. 13/365,062, Non Final Office Action dated Nov. 30, 2012", 19 pgs.
"U.S. Appl. No. 13/365,062, Non-Final Office Action dated Jul. 3, 2012", 20 pgs.
"U.S. Appl. No. 13/365,062, Notice of Allowance dated Jul. 24, 2015", 11 pgs.
"U.S. Appl. No. 13/365,062, Response filed Feb. 9, 2015 to Non Final Office Action dated Oct. 9, 2014", 6 pgs.
"U.S. Appl. No. 13/365,062, Response filed May 29, 2013 to Non Final Office Action dated Nov. 30, 2012", 8 pgs.
"U.S. Appl. No. 13/365,062, Response filed Jun. 19, 2015 to Non Final Office Action dated Mar. 19, 2015", 9 pgs.
"U.S. Appl. No. 13/365,062, Response filed Sep. 2, 2014 to Non Final Office Action dated Jul. 30, 2014", 8 pgs.
"U.S. Appl. No. 13/365,062, Response filed Oct. 3, 2012 to Non Final Office Action dated Jul. 3, 2012", 8 pgs.
"U.S. Appl. No. 13/365,062, Response filed Dec. 19, 2013 to Non Final Office Action dated Aug. 19, 2013", 10 pgs.
"U.S. Appl. No. 13/464,598, Appeal Brief filed Jan. 28, 2016", 19 pgs.
"U.S. Appl. No. 13/464,598, Appeal Decision mailed Jul. 31, 2017", 18 pgs.
"U.S. Appl. No. 13/464,598, Examiner Interview Summary dated May 1, 2014", 3 pgs.
"U.S. Appl. No. 13/464,598, Final Office Action dated Jul. 28, 2015", 38 pgs.
"U.S. Appl. No. 13/464,598, Non Final Office Action dated Mar. 16, 2015", 51 pgs.
"U.S. Appl. No. 13/464,598, Non Final Office Action dated Dec. 4, 2013", 26 pgs.
"U.S. Appl. No. 13/464,598, Notice of Allowance dated Oct. 12, 2017", 5 pgs.
"U.S. Appl. No. 13/464,598, Response filed Apr. 5, 2014 to Non Final Office Action dated Dec. 4, 2013", 44 pgs.
"U.S. Appl. No. 13/464,598. Response filed Jul. 16, 2015 to Non Final Office Action dated Mar. 16, 2015", 24 pgs.
"U.S. Appl. No. 13/464,598, Response filed Oct. 2, 2017 to Final Office Action dated Jul. 28, 2017", 17 pgs.
"U.S. Appl. No. 14/536,320, Non Final Office Action dated Mar. 25, 2015", 9 pgs.

(56) References Cited

OTHER PUBLICATIONS

"U.S. Appl. No. 14/750,559, Final Office Action dated Nov. 29, 2018", 22 pgs.
"U.S. Appl. No. 14/750,559, Non Final Office Action dated Feb. 27, 2018", 15 pgs.
"U.S. Appl. No. 14/750,559, Non Final Office Action dated Jun. 13, 2019", 11 pgs.
"U.S. Appl. No. 14/750,559, Notice of Allowance dated Jan. 14, 2020", 10 pgs.
"U.S. Appl. No. 14/750,559, Notice of Allowance dated Jun. 11, 2020", 9 pgs.
"U.S. Appl. No. 14/750,559, Preliminary Amendment filed Jun. 26, 2015 t", 9 pgs.
"U.S. Appl. No. 14/750,559, Response filed Jul. 27, 2018 to Non Final Office Action dated Feb. 27, 2018", 12 pgs.
"U.S. Appl. No. 14/750,559, Response filed Mar. 29, 2019 to Final Office Action dated Nov. 29, 2018", 13 pgs.
"U.S. Appl. No. 14/750,559, Response filed Sep. 13, 2019 to Non-Final Office Action dated Jun. 13, 2019", 12 pgs.
"U.S. Appl. No. 14/949,549, Notice of Allowance dated Jan. 18, 2017", 11 pgs.
"U.S. Appl. No. 14/949,549, Response filed Jul. 20, 2016 to Non Final Office Action dated Apr. 20, 2016", 8 pgs.
"U.S. Appl. No. 14/949,549, Response filed Aug. 26, 2016 to Non Final Office Action dated Apr. 20, 2016", 8 pgs.
"U.S. Appl. No. 14/949,549, Response filed Dec. 27, 2016 to Final Office Action dated Oct. 27, 2016", 7 pgs.
"U.S. Appl. No. 15/722,868, Advisory Action dated Apr. 8, 2020", 3 pgs.
"U.S. Appl. No. 15/722,868, Examiner Interview Summary dated Aug. 27, 2020", 3 pgs.
"U.S. Appl. No. 15/722,868, Final Office Action dated Jan. 28, 2020", 23 pgs.
"U.S. Appl. No. 15/722,868, Non Final Office Action dated May 18, 2020", 26 pgs.
"U.S. Appl. No. 15/722,868, Non Final Office Action dated Oct. 4, 2019", 19 pgs.
"U.S. Appl. No. 15/722,868, Notice of Allowance dated Sep. 3, 2020", 22 pgs.
"U.S. Appl. No. 15/722,868, Preliminary Amendment filed Jan. 19, 2018", 8 pgs.
"U.S. Appl. No. 15/722,868, Response filed Jan. 6, 2020 to Non Final Office Action dated Oct. 4, 2019", 12 pgs.
"U.S. Appl. No. 75/722,786, Response filed Mar. 30, 2020 to Final Office Action dated Jan. 28, 2020", 11 pgs.
"U.S. Appl. No. 15/722,868, Response filed Aug. 18, 2020 to Non Final Office Action dated May 18, 2020", 12 pgs.
"U.S. Appl. No. 15/801,056, Corrected Notice of Allowability dated Nov. 7, 2019", 2 pgs.
"U.S. Appl. No. 15/801,056, Corrected Notice of Allowability dated Dec. 17, 2019", 2 pgs.
"U.S. Appl. No. 15/801,056, Final Office Action dated Jan. 25, 2019", 12 pgs.
"U.S. Appl. No. 15/801,056, Non Final Office Action dated Jul. 11, 2018", 13 pgs.
"U.S. Appl. No. 15/801,056, Notice of Allowance dated Sep. 13, 2019", 11 pgs.
"U.S. Appl. No. 15/801,056, Preliminary Amendment filed Apr. 30, 2018", 9 pgs.
"U.S. Appl. No. 15/801,056, Response filed Jul. 25, 2019 to Final Office Action dated Jan. 25, 2019", 10 pgs.
"U.S. Appl. No. 16/730,678, Preliminary Amendment filed May 26, 2020", 8 pgs.
"U.S. Appl. No. 14/949,549, Final Office Action dated Oct. 27, 2016", 14 pgs.
"U.S. Appl. No. 14/949,549, Non Final Office Action dated Apr. 20, 2016", 14 pgs.
"Australian Application Serial No. 2006272510, Office Action dated Oct. 22, 2010", 3 pgs.
"Australian Application Serial No. 2006272510, Response filed Oct. 6, 2011 to Office Action dated Oct. 22, 2011", 15 pgs.
"Australian Application Serial No. 2012200701, Office Action dated Aug. 21, 2013", 2 pgs.
"Australian Application Serial No. 2012200701, Response filed Dec. 12, 2013 to Office Action dated Aug. 21, 2013", 33 pgs.
"Australian Application Serial No. 2013270518, Response filed May 25, 2016 to Subsequent Examiners Report dated Feb. 1, 2016", 13 pgs.
"Australian Application Serial No. 2613270518, Subsequent Examiners Report dated Feb. 1, 2016", 2 pgs.
"Australian Application Serial No. 2013270518, Subsequent Examiners Report dated Jun. 7, 2016", 2 pgs.
"Casefinder Manual, Ch. 1: Overview; Ch. 8: Hyperlinking", [Online], Retrieved from the Internet: <URL: http://web.archive.org/web/20040419155315/http://www.casefinder.com/downloads/manual-5.00.pdf>, (Archived Apr. 19, 2004), 13 pgs.
"European Application Serial No. 05775617.3, Emended European Search dated Mar. 24, 2009", 8 pgs.
"European Application Serial No. 06800464.7, Amendment filed Mar. 21, 2011", 7 pgs.
"European Application Serial No. 06800464.7, Examination Notification Art. 94(3) mailed May 2, 2014", 8 pgs.
"European Application Serial No. 06800464.7, Extended European Search Report dated Aug. 24, 2010", 8 pgs.
"European Application Serial No. 06800464.7, Response filed Sep. 11, 2014 to Office Action dated May 2, 2014", 16 pgs.
"European Application Serial No. 06800464.7, Summons to Attend Oral Proceedings mailed Oct. 10, 2017", 10 pgs.
"International Application Serial No. PCT/US2005/026768, Demand mailed Mar. 7, 2007", 9 pgs.
"International Application Serial No. PCT/US2005/026768, International Preliminary Report on Patentability dated Mar. 29, 2007", 8 pgs.
"International Application Serial No. PCT/US2005/026768, International Search Report dated Mar. 7, 2007", 5 pgs.
"International Application Serial No. PCT/US2005/026768, Written Opinion dated Mar. 7, 2007", 5 pgs.
"International Application Serial No. PCT/US2006/020950, International Preliminary Report on Patentability dated Dec. 13, 2007", 6 pgs.
"International Application Serial No. PCT/US2006/020950, International Search Report dated Feb. 5, 2007", 2 pgs.
"International Application Serial No. PCT/US2006/020950, Written Opinion dated Feb. 5, 2007", 4 pgs.
"International Application Serial No. PCT/US2006/029456, International Preliminary Report on Patentability dated Feb. 7, 2008", 9 pgs.
"International Application Serial No. PCT/US2006/029456, International Search Report dated Oct. 1, 2007", 5 pgs.
"International Application Serial No. PCT/US2006029456, Written Opinion dated Oct. 1, 2007", 7 pgs.
"Notice from the European Patent Office dated Oct. 1, 2007 concerning business methods", Official Journal of the European Patent Office, 30(11), (Nov. 1, 2007), 592-593.
"PatentPleeze Overview", [Online], Retrieved from the Internet: <URL: http://web.archive.org/web/20060824063540/web.ncf.ca/ex133/patnow.pdf>, (Archived Aug. 24, 2006), 33 pgs.
"Using Citation Link", Delphion, [Online], Retrieved from the Internet: <URL: http://web.archive.org/web/20041204224023/www.delphion.com/help/citelink_help, (Archived Dec. 4, 2004), 10 pgs.
"What is Pair?", USPTO, [Online] Retrieved from the internet: URL: http://web.archive.org/web/20040606224528/pair.uspto.gov/cgi-bin/final/help.pl>, (Archived Jun. 6, 2004), 9 pgs.
Broekstra, Joen, et al., "Sesame: A Generic Architecture for Storing and Querying RDF and RDF Schema", Int'l Semantic Web Conference (ISWC). Lecture Notes in Computer Science, vol. 2342. Springer, Berlin, Heidelberg, (2002), 16 pgs.
Chang, Muchiu, "Sun Tzu and sustainable competitive advantage", IEEE Int'l Engineering Management Conference, vol. 1, (Oct. 18-21, 2004), 153-157.

(56) References Cited

OTHER PUBLICATIONS

Davis, Lee, "The Strategic Use of Patents in International Business", The 28th Annual EIBA Conference, Athens, Greece, (Dec. 2002), 27 pgs.
East, T. W, "Patent Claims—How to Keep Track of Them", IEEE Aerospace and Electronic Systems Magazine, 10(8), (Aug. 1995), 32-33.
Fall, C.J., et al., "Literature Survey: Issue to be considered in the automatic classifications of patents", World Intellectual Property Organization, (Oct. 2002), 64 pgs.
Gruber, T R, et al., "A Translation Approach to Portable Ontology Specifications", KSL Report KSL-92-71, Knowledge Systems Laboratory, Stanford University, (1993), 24 pgs.
Hoover, A. E, "Electronic Filing Top 10 Wish List", IP Today, (Jul. 2006), 2 pgs.
Hutzell, Paula, "Image File Wrapper (IFW) Processing", USPTO PPT Presentation, (May 8, 2003), 25 pgs.
Indukuri, Kishore Varma, et al., "Similarity Analysis of Patent Claims Using Natural Language Processing Techniques", International Conference on Computational Intelligence and Multimedia Applications, (2007), 169-175.
Langan-Fox, Janice, "Team Mental Models: Techniques, Methods, and Analytic Approaches", The Journal of the Human Factors and Ergonomics Society, vol. 42, No. 2, (2000), 30 pgs.
Larkey, L. S, "A Patent Search and Classification System", Proc. of the 4th ACM Conference of Digital Libraries, (1999), 179-187.
Luo, Si, et al., "A Semisupervised Learning Method to Merge Search Engine results", ACM Transactions on Information Systems, vol. 21, No. 4, (Oct. 2002), 35 pgs.
Madrid, Juan M, et al., "Incorporating Conceptual Matching in Search", Proc. of the 11th Conference on Information and Knowledge Management, (2002), 17 pgs.
Mase, H., et al., "Proposal of Two-Stage Patent Retrieval Method Considering the Claim T Structure", ACM Transactions on Asian Language Information Processing (TALIP), 4(2), (Jun. 2005), 190-206.
Paul, Stockwell, et al., "Use of an automatic content analysis tool: Atechnique for seeing both local and global scope", Int. J. Human-Computer Studies 67, (2009), 424-436.
Quinn, B., "Internet Access to Patent Application Files Now Available", Press Release, [Online], Retrieved from the Internet: <URL: http://web.archive.org/web/200408132W925/http://www.uspto.gov/web/offices/com/speeches/04-13.htm>, (Aug. 2, 2004), 1 pg.
Roubtsov, Emma, "Mapping patents to products: Why should you care?" [Online] Retrieved from the Internet on Dec. 18, 2019: <URL: https://www.cpaglobai.com/cpa-giobal-blog/mapping-patents-to-products-why-should-you-care>, (Dec. 2009), 7 pgs.
Sheremetyeva, S., et al., "Generating Patent Claims from Interactive input", Proc. of the 8th International Workshop on Natural Language Generation (INLG), (Jun. 1996), 61-70.
Sheremetyeva, S., et al., "Knowledge Elicitation for Authoring Patent Claims", IEEE Computer, 29(7), (Jul. 1996), 57-63.
Sheremetyeva, S., "Natural Language Analysis of Patent Claims", Proc. of the ACL-2003 Workshop on Patent Corpus Processing, (2003), 66-73.
Sheremetyeva, S., et al., "On Creating Metadata with Authoring Tools", Proc. of the ECAI Workshop on Semantic Authoring, Annotation and Knowledge Markup (SAAKM), (Jul. 2002), 22-26.
Von-Wun, Soo, et al., "A Cooperative Multi-Agent Platform for Invention based on Ontology and Patent Document Analysis", The 9th International Conference on Computer Supported Cooperative Work in Design Proceedings, (2005), 411-416.
"U.S. Appl. No. 17/589,635, Response filed Feb. 27, 2023 to Non Final Office Action dated Oct. 25, 2022", 11 pgs.
"U.S. Appl. No. 17/025,847, Response filed Feb. 28, 2023 to Non Final Office Action dated Sep. 29, 2022", 11 pgs.

\* cited by examiner

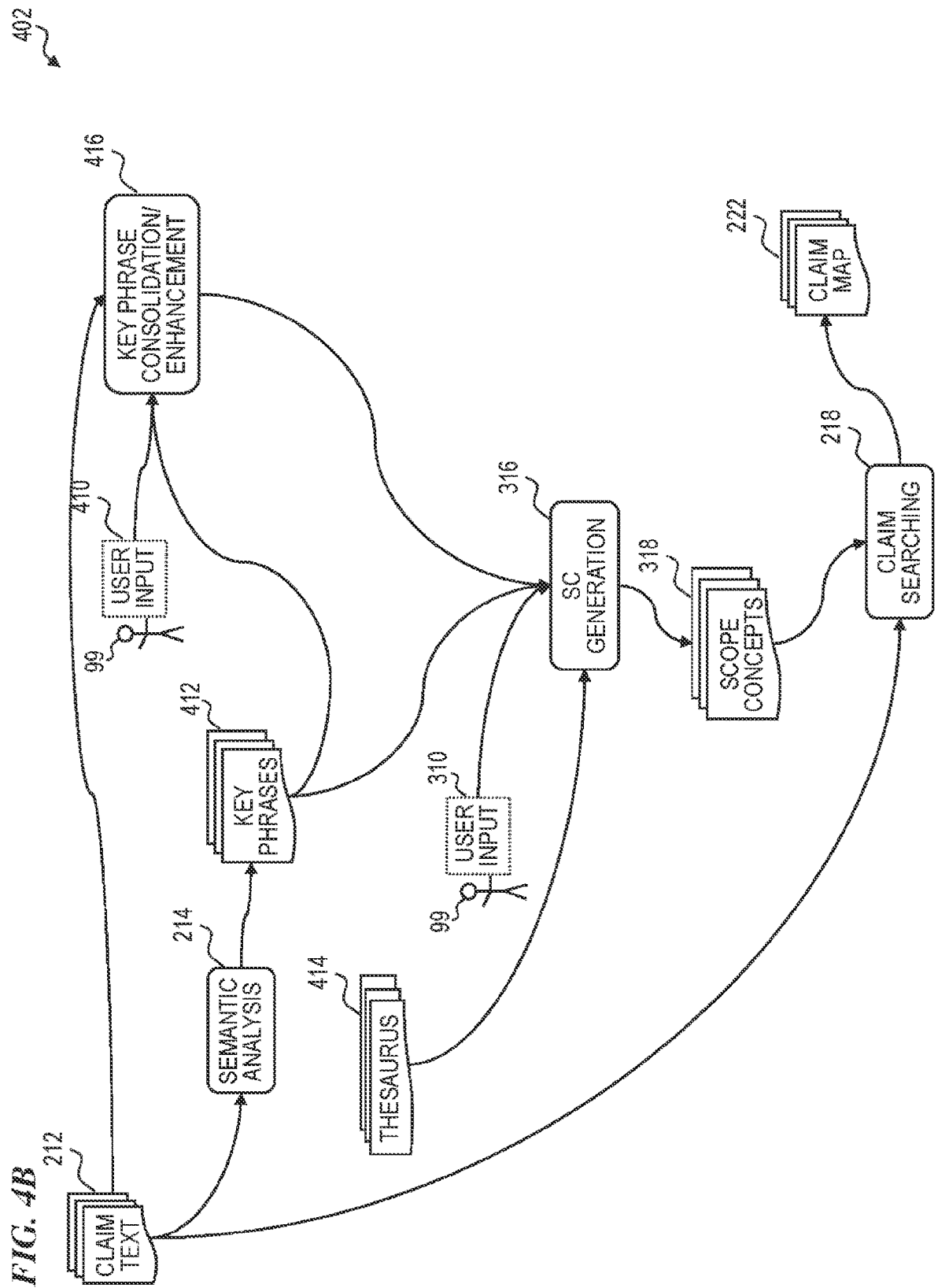

FIG. 8A

12. A FLASHLIGHT, COMPRISING:

(A) A FLASHLIGHT HOUSING, THE HOUSING BEING SUITABLE FOR AT LEAST ONE OF RECEIVING THEREIN AND MOUNTING THEREON AT LEAST ONE DC VOLTAGE SOURCE THAT INCLUDES AT LEAST ONE BATTERY CELL;

(B) A LIGHT-EMITTING DIODE (LED) HOUSING CONNECTED TO THE FLASHLIGHT HOUSING, THE LED HOUSING COMPRISING ONE OR MORE FIRST LED UNITS THAT EACH EMIT LIGHT AND HAVE A REFLECTOR FOR COLLIMATING THE EMITTED LIGHT FORWARDLY THEREFROM GENERALLY ALONG AN LED OPTICAL AXIS; AND (C) A FIRST ELECTRICAL CIRCUIT THAT SELECTIVELY APPLIES POWER FROM THE DC VOLTAGE SOURCE TO THE LED UNITS, THE FIRST ELECTRICAL CIRCUIT FURTHER COMPRISING A CONTROL CIRCUIT FOR MAINTAINING A PREDETERMINED LIGHT OUTPUT LEVEL OF THE LED UNITS AS A CHARGE ON THE BATTERY CELL VARIES;

WHEREIN THE FLASHLIGHT IS OF SUCH COMPACT SIZE AND LOW WEIGHT AS TO BE SUITABLE FOR SINGLE-HANDED PORTABLE OPERATION BY A USER, THE FLASHLIGHT FURTHER HAVING A PURPOSE OF PROVIDING GENERAL-PURPOSE ILLUMINATION.

17. A METHOD OF PROVIDING GENERAL-PURPOSE ILLUMINATION OF SUCH COMPACT SIZE AND LOW WEIGHT AS TO BE SUITABLE FOR SINGLE-HANDED PORTABLE OPERATION BY A USER, COMPRISING THE STEPS OF:

(A) PROVIDING ONE OR MORE FIRST LED UNITS THAT EACH EMIT LIGHT AND HAVE A REFLECTOR FOR COLLIMATING THE EMITTED LIGHT FORWARDLY THEREFROM GENERALLY ALONG AN LED OPTICAL AXIS;

(B) SELECTIVELY APPLYING POWER FROM A DC VOLTAGE SOURCE TO THE LED UNITS; AND (C) MAINTAINING A PREDETERMINED LIGHT OUTPUT LEVEL OF THE LED UNITS AS A CHARGE ON THE DC VOLTAGE SOURCE VARIES BY CONTROLLING THE STEP (B).

21. AN ILLUMINATION SOURCE, COMPRISING:

(A) A LIGHT-EMITTING DIODE (LED) HOUSING COMPRISING ONE OR MORE LEDS; AND (B) A CONTROL CIRCUIT THAT SELECTIVELY APPLIES POWER FROM A SOURCE OF ELECTRIC POWER TO THE LEDS, THE CONTROL CIRCUIT SUBSTANTIALLY MAINTAINING A LIGHT OUTPUT CHARACTERISTIC OF THE LEDS AS A VOLTAGE OF THE VOLTAGE SOURCE VARIES OVER A RANGE THAT WOULD OTHERWISE VARY THE LIGHT OUTPUT CHARACTERISTIC.

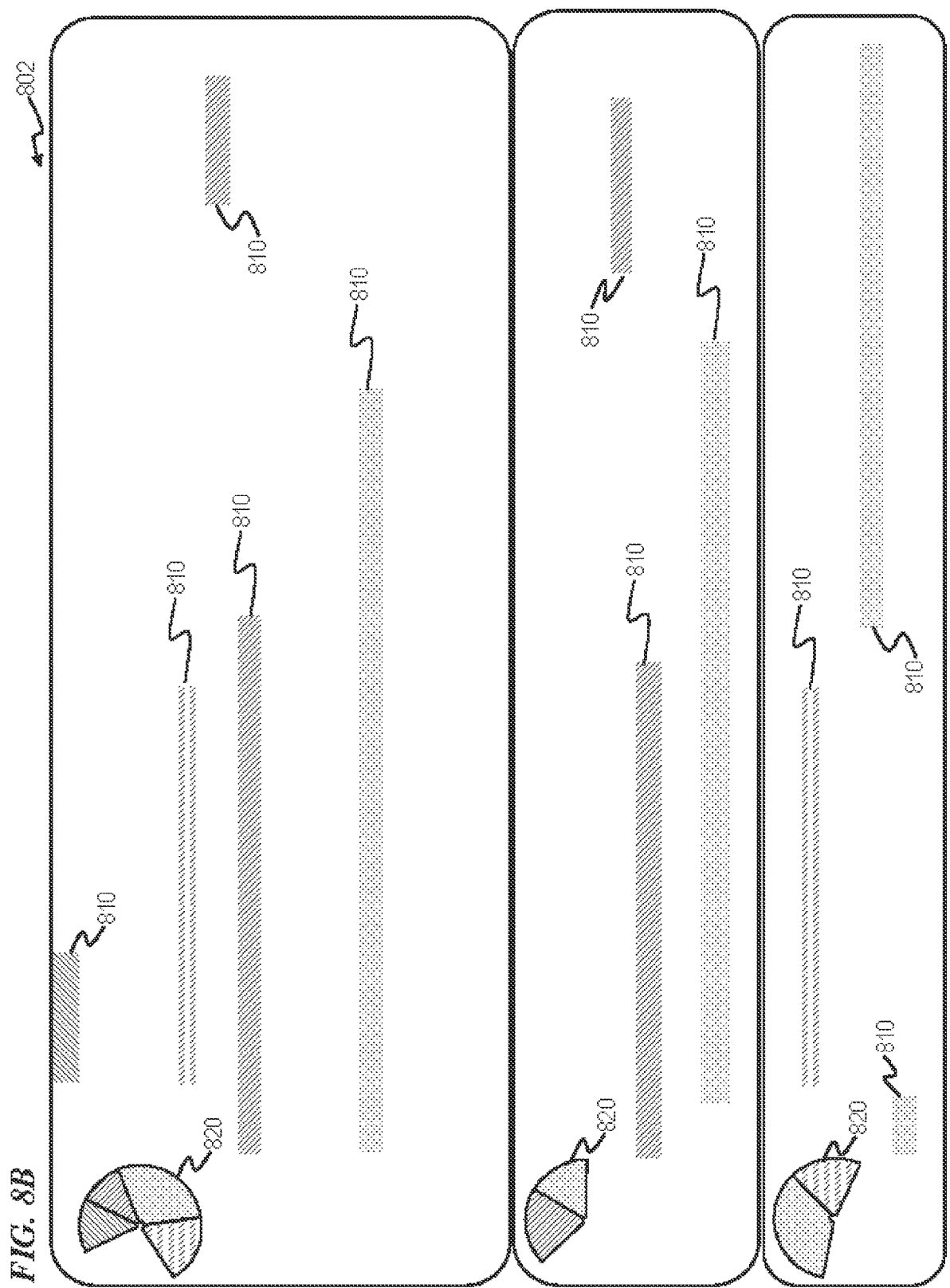

12. A FLASHLIGHT, COMPRISING:

(A) A FLASHLIGHT HOUSING, THE HOUSING BEING SUITABLE FOR AT LEAST ONE OF RECEIVING THEREIN AND MOUNTING THEREON AT LEAST ONE DC VOLTAGE SOURCE THAT INCLUDES AT LEAST ONE BATTERY CELL;

(B) A LIGHT EMITTING DIODE (LED) HOUSING CONNECTED TO THE FLASHLIGHT HOUSING, THE LED HOUSING COMPRISING ONE OR MORE FIRST LED UNITS WHERE EACH EMIT LIGHT AND HAVE A REFLECTOR FOR COLLIMATING THE EMITTED LIGHT FORWARDLY THEREFROM GENERALLY ALONG AN LED OPTICAL AXIS; AND (C) A FIRST ELECTRICAL CIRCUIT THAT SELECTIVELY APPLIES POWER FROM THE DC VOLTAGE SOURCE TO THE LED UNITS, THE FIRST ELECTRICAL CIRCUIT FURTHER COMPRISING A CONTROL CIRCUIT FOR MAINTAINING A PREDETERMINED LIGHT OUTPUT LEVEL OF THE LED UNITS AS A CHARGE ON THE BATTERY CELL VARIES;

WHEREIN THE FLASHLIGHT IS OF SUCH COMPACT SIZE AND LOW WEIGHT AS TO BE SUITABLE FOR SINGLE-HANDED PORTABLE OPERATION BY A USER, THE FLASHLIGHT FURTHER HAVING A PURPOSE OF PROVIDING GENERAL-PURPOSE ILLUMINATION.

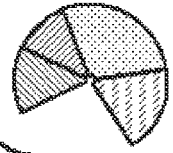

17. A METHOD OF PROVIDING GENERAL-PURPOSE ILLUMINATION OF SUCH COMPACT SIZE AND LOW WEIGHT AS TO BE SUITABLE FOR SINGLE-HANDED PORTABLE OPERATION BY A USER, COMPRISING THE STEPS OF:

(A) PROVIDING ONE OR MORE FIRST LED UNITS THAT EACH EMIT LIGHT AND HAVE A REFLECTOR FOR COLLIMATING THE EMITTED LIGHT FORWARDLY THEREFROM GENERALLY ALONG AN LED OPTICAL AXIS;

(B) SELECTIVELY APPLYING POWER FROM A DC VOLTAGE SOURCE TO THE LED UNITS; AND (C) MAINTAINING A PREDETERMINED LIGHT OUTPUT LEVEL OF THE LED UNITS AS A CHARGE ON THE DC VOLTAGE SOURCE VARIES BY CONTROLLING THE STEP (B).

21. AN ILLUMINATION SOURCE, COMPRISING:

(A) A LIGHT EMITTING DIODE (LED) HOUSING COMPRISING ONE OR MORE LEDS; AND (B) A CONTROL CIRCUIT THAT SELECTIVELY APPLIES POWER FROM A SOURCE OF ELECTRIC POWER TO THE LEDS, THE CONTROL CIRCUIT SUBSTANTIALLY MAINTAINING A LIGHT OUTPUT CHARACTERISTIC OF THE LEDS AS A VOLTAGE OF THE VOLTAGE SOURCE VARIES OVER A RANGE THAT WOULD OTHERWISE VARY THE LIGHT OUTPUT CHARACTERISTIC

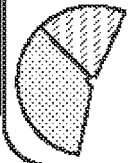

FIG. 9A

CLAIMS

[ RESULTS | SEARCH | EXPORT ]
DOCUMENT NUMBER
US6095661A1
8 INDEPENDENT CLAIMS

[ FIND ] [ CLEAR ]

SELECT CLAIMS: ☒ CLAIM 1  ☒ CLAIM 12  ☒ CLAIM 17  ☒ CLAIM 21
☒ CLAIM 26  ☒ CLAIM 30  ☒ CLAIM 31  ☒ CLAIM 34

[ SELECT CLAIMS ]

| SELECT | FIND | MAP | SPLIT | MATCHES | CLAIMS | STRING | FLASHLIGHT | SCOPE CONCEPT | INDEPENDENT CLAIM |
|---|---|---|---|---|---|---|---|---|---|
| ○ | | ▨ | | 1 | 12 | FLASHLIGHT | FLASHLIGHT | | 12. A ~~FLASHLIGHT~~ COMPRISING: (A) A FLASHLIGHT HOUSING, THE HOUSING BEING SUITABLE FOR AT LEAST ONE OF RECEIVING |

[ MULTIMAP ]

| SELECT | FIND | MAP | SPLIT | MATCHES | CLAIMS | STRING | SCOPE CONCEPT |
|---|---|---|---|---|---|---|---|
| ○ | ☐ | ▨ | ☐ | 1 | 12 | FLASHLIGHT | FLASHLIGHT |
| ○ | ☐ | ▨ | ☐ | 2 | 12, 17 | REFLECTOR FOR COLLIMATING THE EMITTED LIGHT FORWARDLY | REFLECTOR FOR COLLIMATING THE EMITTED LIGHT FORWARDLY |
| ○ | ☐ | ▨ | ☐ | 2 | 12, 17 | SUITABLE FOR SINGLE-HANDED PORTABLE OPERATION BY A USER | SINGLE HANDED OPERATION |

901B

12. A FLASHLIGHT COMPRISING:
(A) A FLASHLIGHT HOUSING, THE HOUSING BEING SUITABLE FOR AT LEAST ONE OF RECEIVING THEREIN AND MOUNTING THEREON AT LEAST ONE DC VOLTAGE SOURCE THAT INCLUDES AT LEAST ONE BATTERY CELL;
(B) A LIGHT-EMITTING DIODE (LED) HOUSING CONNECTED TO THE FLASHLIGHT HOUSING, THE LED HOUSING COMPRISING ONE OR MORE FIRST LED UNITS THAT EACH EMIT LIGHT AND HAVE A REFLECTOR FOR COLLIMATING THE EMITTED LIGHT FORWARDLY THEREFROM GENERALLY ALONG AN LED OPTICAL AXIS; AND
(C) A FIRST ELECTRICAL CIRCUIT THAT SELECTIVELY APPLIES POWER FROM THE DC VOLTAGE SOURCE TO THE LED UNITS,

FIG. 9C

| O | 2 | 12, 17 | MAINTAINING A PREDETERMINED LIGHT OUTPUT LEVEL OF THE LED UNITS AS A CHARGE ON THE BATTERY CELL VARIES | MAINTAIN CONSTANT LIGHT OUTPUT LEVEL |

THE FIRST ELECTRICAL CIRCUIT FURTHER COMPRISING A CONTROL CIRCUIT FOR MAINTAINING A PREDETERMINED LIGHT OUTPUT LEVEL OF THE LED UNITS AS A CHARGE ON THE BATTERY CELL VARIES.

WHEREIN THE FLASHLIGHT IS OF SUCH COMPACT SIZE AND LOW WEIGHT AS TO BE SUITABLE FOR SINGLE-HANDED PORTABLE OPERATION BY A USER, THE FLASHLIGHT FURTHER HAVING A PURPOSE OF PROVIDING GENERAL-PURPOSE ILLUMINATION.

17. A METHOD OF PROVIDING GENERAL-PURPOSE ILLUMINATION OF SUCH COMPACT SIZE AND LOW WEIGHT AS TO BE SUITABLE FOR SINGLE-HANDED PORTABLE OPERATION BY A USER COMPRISING THE STEPS OF: (A) PROVIDING ONE OR MORE FIRST LED UNITS THAT EACH EMIT LIGHT AND HAVE A REFLECTOR FOR

FIG. 12

EXAMPLE OF FINAL CLAIM MAP.

1200

| | | | |
|---|---|---|---|
| TITLE | METHOD AND APPARATUS FOR AN L.E.D. FLASHLIGHT | | L.E.D. ILLUMINATION |
| PATENT # | 6,095,661 | | 6,305,818 |
| ASSIGNEE NAME | LEMAIRE, CHARLES A. (APPLE VALLEY, MN) | | LEMAIRE, |
| FILING DATE | Mar 19, 1998 | | Jul 28, 2000 |
| TOTAL CLAIMS | 52 | | 20 |
| CLAIM ## (INDEPENDENT) | 1 | 12 | 17 | 21 | 26 | 30 | 31 | 34 | 1 | 11 | 18 |

| SCOPE CONCEPT (APPEARANCE, DESC.) | Total | | | | | | | | | | | |
|---|---|---|---|---|---|---|---|---|---|---|---|---|
| LED HOUSING | 20 | 7 | 7 | 5 | 5 | 3 | 4 | 4 | 5 | 7 | 5 | 4 |
| ALTERNATELY CONNECT AND DISCONNECT AN ELECTRICAL PATH BETWEEN BATTERY AND LED | 4 | | | | | | | | | | | |
| BATTERY POWER | 15 | | | | | | | | | | | |
| FLASHLIGHT HOUSING | 9 | | | | | | | | | | | |
| ILLUMINATION METHOD | 11 | | | | | | | | | | | |
| SINGLE-HANDED OPERATION | 18 | | | | | | | | | | | |
| ALTERNATELY CONNECT AND DISCONNECT ELECTRICAL POWER FROM BATTERY TO CONTROL CIRCUIT | 2 | | | | | | | | | | | |
| DOES NOT REQUIRE PULSING | 6 | | | | | | | | | | | |
| ILLUMINATION SOURCE | 19 | | | | | | | | | | | |
| LED OF FIRST COLOR AND LED OF SECOND COLOR | 5 | | | | | | | | | | | |
| CONTROL OUTPUT COLOR SPECTRUM | 10 | | | | | | | | | | | |
| PULSES TO LEDS | 24 | | | | | | | | | | | |
| MAINTAIN CONSTANT LIGHT OUTPUT LEVEL | 10 | | | | | | | | | | | |
| MAINTENANCE FEES | | US $xx | 1/2/12 | | | | | | | US $xx | 1/2/12 | |
| MAINTENANCE FEES | | PCT $xx | 2/3/12 | | | | | | | PCT $xx | 2/3/12 | |

FIG. 14

USER IDENTIFIES PATENT(S)

LOAD CLAIM TEXT

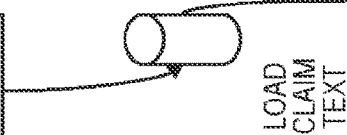

ALL CLAIMS

1400

1. A FLASHLIGHT COMPRISING:

(A) A FLASHLIGHT HOUSING, THE HOUSING BEING SUITABLE FOR AT LEAST ONE OF RECEIVING THEREIN AND MOUNTING THEREON AT LEAST ONE DC VOLTAGE SOURCE;

(B) A LIGHT-EMITTING DIODE (LED) HOUSING CONNECTED TO THE FLASHLIGHT HOUSING, THE LED HOUSING COMPRISING A FIRST PLURALITY OF LED UNITS THAT EACH EMIT LIGHT AND HAVE A REFLECTOR FOR COLLIMATING THE EMITTED LIGHT FORWARDLY THEREFROM GENERALLY ALONG AN OPTICAL AXIS OF ONE OF THE PLURALITY OF LED UNITS, THE FIRST PLURALITY OF LED UNITS INCLUDING AT LEAST SEVEN INDIVIDUAL LED UNITS; AND (C) A FIRST ELECTRICAL CIRCUIT THAT SELECTIVELY APPLIES PULSED POWER FROM THE DC VOLTAGE SOURCE TO THE LED UNITS, WHEREIN THE PULSES HAVE A FREQUENCY HIGH ENOUGH THAT LIGHT PRODUCED BY THE LED UNITS HAS AN APPEARANCE TO A HUMAN USER OF BEING CONTINUOUS RATHER THAN PULSED, AND THE PULSES HAVE AT LEAST ONE CHARACTERISTIC THAT IS CONTROLLED BY THE FIRST ELECTRICAL CIRCUIT IN ORDER TO MAINTAIN AN AVERAGE PREDETERMINED LIGHT OUTPUT LEVEL OF THE LED UNITS AS A VOLTAGE ON THE DC VOLTAGE SOURCE VARIES;

WHEREIN THE FLASHLIGHT IS OF SUCH COMPACT SIZE AND LOW WEIGHT AS TO BE SUITABLE FOR SINGLE-HANDED PORTABLE OPERATION BY A USER, THE FLASHLIGHT FURTHER HAVING A PURPOSE OF PROVIDING GENERAL-PURPOSE ILLUMINATION.

2. THE FLASHLIGHT OF CLAIM 1, WHEREIN THE LED OPTICAL AXES OF THE FIRST PLURALITY OF LED UNITS ARE SUBSTANTIALLY PARALLEL TO ONE ANOTHER.

3. THE FLASHLIGHT OF CLAIM 2, FURTHER COMPRISING:

A SECOND PLURALITY OF LED UNITS THAT EACH EMIT LIGHT AND HAVE A REFLECTOR FOR COLLIMATING THE EMITTED LIGHT FORWARDLY THEREFROM GENERALLY ALONG AN LED OPTICAL AXIS, WHEREIN THE LED OPTICAL AXES OF THE SECOND PLURALITY OF LED UNITS CONVERGE FORWARDLY FROM THE HOUSING.

4. THE FLASHLIGHT OF CLAIM 1, WHEREIN AN OPTICAL SPREAD ANGLE OF THE FIRST PLURALITY OF LED UNITS ARE SUBSTANTIALLY EQUAL TO ONE ANOTHER.

5. THE FLASHLIGHT OF CLAIM 4, FURTHER COMPRISING:

A SECOND PLURALITY OF LED UNITS THAT EACH EMIT LIGHT AND HAVE A REFLECTOR FOR COLLIMATING THE EMITTED LIGHT FORWARDLY THEREFROM GENERALLY ALONG AN LED OPTICAL AXIS, WHEREIN AN OPTICAL SPREAD ANGLE OF THE SECOND PLURALITY OF LED UNITS ARE SUBSTANTIALLY EQUAL TO ONE ANOTHER, AND DIFFERENT THAN THE OPTICAL SPREAD ANGLE OF THE FIRST PLURALITY OF LED UNITS.

FIG. 15

CLAIM TEXT → EXTRACT I-CLAIMS → LOAD, E.G., INDEPEN. CLAIM TEXT

FIRST SUBSET OF CLAIMS (E.G., INDEPENDENT CLAIMS) — 1500

1. A FLASHLIGHT, COMPRISING:

(A) A FLASHLIGHT HOUSING, THE HOUSING BEING SUITABLE FOR AT LEAST ONE OF RECEIVING THEREIN AND MOUNTING THEREON AT LEAST ONE DC VOLTAGE SOURCE;

(B) A LIGHT-EMITTING DIODE (LED) HOUSING CONNECTED TO THE FLASHLIGHT HOUSING, THE LED HOUSING COMPRISING A FIRST PLURALITY OF LED UNITS THAT EACH EMIT LIGHT AND HAVE A REFLECTOR FOR COLLIMATING THE EMITTED LIGHT FORWARDLY THEREFROM GENERALLY ALONG AN OPTICAL AXIS OF ONE OF THE PLURALITY OF LED UNITS, THE FIRST PLURALITY OF LED UNITS INCLUDING AT LEAST SEVEN INDIVIDUAL LED UNITS; AND (C) A FIRST ELECTRICAL CIRCUIT THAT SELECTIVELY APPLIES PULSED POWER FROM THE DC VOLTAGE SOURCE TO THE LED UNITS, WHEREIN THE PULSES HAVE A FREQUENCY HIGH ENOUGH THAT LIGHT PRODUCED BY THE LED UNITS HAS AN APPEARANCE TO A HUMAN USER OF BEING CONTINUOUS RATHER THAN PULSED, AND THE PULSES HAVE AT LEAST ONE CHARACTERISTIC THAT IS CONTROLLED BY THE FIRST ELECTRICAL CIRCUIT IN ORDER TO MAINTAIN AN AVERAGE PREDETERMINED LIGHT OUTPUT LEVEL OF THE LED UNITS AS A VOLTAGE ON THE DC VOLTAGE SOURCE VARIES;

WHEREIN THE FLASHLIGHT IS OF SUCH COMPACT SIZE AND LOW WEIGHT AS TO BE SUITABLE FOR SINGLE-HANDED PORTABLE OPERATION BY A USER, THE FLASHLIGHT FURTHER HAVING A PURPOSE OF PROVIDING GENERAL-PURPOSE ILLUMINATION.

12. A FLASHLIGHT, COMPRISING:

(A) A FLASHLIGHT HOUSING, THE HOUSING BEING SUITABLE FOR AT LEAST ONE OF RECEIVING THEREIN AND MOUNTING THEREON AT LEAST ONE DC VOLTAGE SOURCE THAT INCLUDES AT LEAST ONE BATTERY CELL;

(B) A LIGHT-EMITTING DIODE (LED) HOUSING CONNECTED TO THE FLASHLIGHT HOUSING, THE LED HOUSING COMPRISING ONE OR MORE FIRST LED UNITS THAT EACH EMIT LIGHT AND HAVE A REFLECTOR FOR COLLIMATING THE EMITTED LIGHT FORWARDLY THEREFROM GENERALLY ALONG AN LED OPTICAL AXIS; AND (C) A FIRST ELECTRICAL CIRCUIT THAT SELECTIVELY APPLIES POWER FROM THE DC VOLTAGE SOURCE TO THE LED UNITS, THE FIRST ELECTRICAL CIRCUIT FURTHER COMPRISING A CONTROL CIRCUIT FOR MAINTAINING A PREDETERMINED LIGHT OUTPUT LEVEL OF THE LED UNITS AS A CHARGE ON THE BATTERY CELL VARIES,

WHEREIN THE FLASHLIGHT IS OF SUCH COMPACT SIZE AND LOW WEIGHT AS TO BE SUITABLE FOR SINGLE-HANDED PORTABLE OPERATION BY A USER, THE FLASHLIGHT FURTHER HAVING A PURPOSE OF PROVIDING GENERAL-PURPOSE ILLUMINATION.

17. A METHOD OF PROVIDING GENERAL-PURPOSE ILLUMINATION OF SUCH COMPACT SIZE AND LOW WEIGHT AS TO BE SUITABLE FOR SINGLE-HANDED PORTABLE OPERATION BY A USER, COMPRISING THE STEPS OF:

(A) PROVIDING ONE OR MORE FIRST LED UNITS THAT EACH EMIT LIGHT AND HAVE A REFLECTOR FOR COLLIMATING THE EMITTED LIGHT FORWARDLY THEREFROM GENERALLY ALONG AN LED OPTICAL AXIS;

(B) SELECTIVELY APPLYING POWER FROM A DC VOLTAGE SOURCE TO THE LED UNITS; AND (C) MAINTAINING A PREDETERMINED LIGHT OUTPUT LEVEL OF THE LED UNITS AS A CHARGE ON THE DC VOLTAGE SOURCE VARIES BY CONTROLLING THE STEP (B).

| Map New TC | TC List | Map New SC | SC List | | | ☑ Show Title ☑ Show Abstract ☑ Show TC ☑ Show SC |
|---|---|---|---|---|---|---|

DM Directly mapped, DNM Does Not Map, U Unresolved, NO No Operation
Claim(s) 1 - 2 of 1 (2 with no filters)    Show [100] claims per page [GO]

| | Matter | Claim # | Claim Text | TC | SC |
|---|---|---|---|---|---|
| ○ ○ ○<br>DM DNM U<br>⦿ NO<br>⦿ ○ ○<br>DM DNM U<br>○ NO<br>Go To USPTO | 6,205,469<br>TC SC KW Rank | 1 | 1. A method for communicating between a client and a server through a limited communication interface, the method comprising:<br>providing continuation functions associated with each of a plurality of links, wherein a continuation function includes a reference to a continuation argument representing a remaining sequence of instructions for subsequent execution;<br>sending the plurality of links through the limited communication interface from the server to the client;<br>sending a selected one of the plurality of links from the client to the server, and executing the continuation function associated with the selected link in the server including executing the remaining sequence of instructions. | 0, 0, 0 | 0, 0, 0 |
| ○ ○ ○<br>DM DNM U<br>⦿ NO<br>⦿ ○ ○<br>DM DNM U<br>○ NO<br>Go To USPTO | 6,205,469<br>TC SC KW Rank | 10 | 10. A method for communicating between a plurality of clients and a web server through a limited communication interface, the method comprising:<br>providing continuation functions associated with each of a plurality of links, wherein a continuation function includes a reference to a continuation argument representing a remaining sequence of instructions fro subsequent execution;<br>sending the plurality of links through the limited communications interface from one of the plurality of clients to the server to the plurality of clients;<br>sending a selected one of the plurality of links from one of the plurality of clients to the server, and<br>executing the continuation function associated with the selected link in the server including executing the remaining sequence of instructions. | 0, 0, 0 | 0, 0, 0 |

| | Matter | Claim # | Claim Text | TC | SC |
|---|---|---|---|---|---|
| ○ DM ○ DNM ○ U ● NO<br>Go To USPTO | 6,205,469<br>TC SC KW Rank | 1 | 1. A method for communicating between a client and a server through a limited communication interface, the method comprising:<br>providing continuation functions associated with each of a plurality of links, wherein a continuation function includes a reference to a continuation argument representing a remaining sequence of instructions for subsequent execution;<br>sending the plurality of links through the limited communication interface from the server to the client;<br>sending a selected one of the plurality of links from the client to the server, and executing the continuation function associated with the selected link in the server including executing the remaining sequence of instructions. | 0,0,0 | 0,0,0 |
| ○ DM ○ DNM ○ U ● NO<br>Go To USPTO | 6,205,469<br>TC SC KW Rank | 10 | 10. A method for communicating between a plurality of clients and a web server through a limited communication interface, the method comprising:<br>providing continuation functions associated with each of a plurality of links, wherein a continuation function includes a reference to a continuation argument representing a remaining sequence of instructions fro subsequent execution;<br>sending the plurality of links through the limited communications interface from the server to the plurality of clients;<br>sending a selected one of the plurality of links from one of the plurality of clients to the server, and<br>executing the continuation function associated with the selected link in the server including executing the remaining sequence of instructions. | 0,0,0 | 0,0,0 |

| Claim # | ☐ Mark Dependant |
|---|---|
| Claim # | Claim Text |
| 1 | 1. A method for communicating between a client and a server through a limited communication interface, the method comprising: providing continuation functions associated with each of a plurality of links, wherein a continuation function includes a reference to a continuation argument representing a remaining sequence of instructions for subsequent execution; sending the plurality of links through the limited communication interface from the server to the client; sending a selected one of the plurality of links from the client to the server, and executing the continuation function associated with the selected link in the server including executing the remaining sequence of instructions, |
| 10 | 10. A method for communicating between a plurality of clients and a web server through a limited communication interface, the method comprising: providing continuation functions associated with each of a plurality of links, wherein a continuation function includes a reference to a continuation argument representing a remaining sequence of instructions fro subsequent execution; sending the plurality of links through the limited communications interface from the server to the plurality of clients; sending a selected one of the plurality of links from one of the plurality of clients to the server, and executing the continuation function associated with the selected link in the server including executing the remaining sequence of instructions. |

*FIG. 18*

| Keywords | Claim 1 | Claim 10 |
|---|---|---|
| ☐ 📄 communication | ✓ | ✓ |
| ☐ 📄 interface | ✓ | ✓ |
| ☐ 📄 limited | ✓ | ✓ |
| ☐ 📄 link | ✓ | ✓ |
| ☐ 📄 plurality | ✓ | ✓ |
| ☐ 📄 sending | ✓ | ✓ |

*FIG. 19*

| Claim # | Mark Dependant | Claim Text |
|---|---|---|
| Claim # | | |
| 1 | | 1. A method for communicating between a client and a server through a limited communication interface, the method comprising: providing continuation functions associated with each of a plurality of links, wherein a continuation function includes a reference to a continuation argument representing a remaining sequence of instructions for subsequent execution; sending the plurality of links through the limited communication interface from the server to the client; sending a selected one of the plurality of links from the client to the server, and executing the continuation function associated with the selected link in the server including executing the remaining sequence of instructions, |
| 10 | | 10. A method for communicating between a plurality of clients and a web server through a limited communication interface, the method comprising: providing continuation functions associated with each of a plurality of links, wherein a continuation functions includes a reference to a continuation argument representing a remaining sequence of instructions fro subsequent execution; sending the plurality of links through the limited communications interface from the server to the plurality of clients; sending a selected one of the plurality of links from one of the plurality of clients to the server, and executing the continuation function associated with the selected link in the server including executing the remaining sequence of instructions. |

*FIG. 20*

| Concept Name: | | Text Scope Concept |
|---|---|---|
| Concept Type: | | Scope Concept |

If specification text is selected, specification text mapping will be considered as explicit mapping.

[Map]

| | | Type | Text |
|---|---|---|---|
| 2100 | ☑ | Claim 1 | 1. A method for communicating between a client and a server through a limited communication interface, the method comprising: providing continuation functions associated with each of a plurality of links, wherein a continuation function includes a reference to a continuation argument representing a remaining sequence of instructions for subsequent execution; sending the plurality of links through the limited communication interface from the server to the client; sending a selected one of the plurality of links from the client to the server, and executing the continuation function associated with the selected link in the server including executing the remaining sequence of instructions, |
| 2100 | ☑ | Claim 10 | 10. A method for communicating between a plurality of clients and a web server through a limited communication interface, the method comprising: providing continuation functions associated with each of a plurality of links, wherein a continuation functions includes a reference to a continuation argument representing a remaining sequence of instructions fro subsequent execution; sending the plurality of links through the limited communications interface from the server to the plurality of clients; sending a selected one of the plurality of links from one of the plurality of clients to the server, and executing the continuation function associated with the selected link in the server including executing the remaining sequence of instructions. |

*FIG. 21*

APPARATUS AND METHOD FOR AUTOMATED AND ASSISTED PATENT CLAIM MAPPING AND EXPENSE PLANNING

CROSS-REFERENCE TO RELATED APPLICATIONS

This patent application is a continuation of and claims the benefit of priority under 35 U.S.C. § 120 to U.S. patent application Ser. No. 15/722,868, filed on Oct. 2, 2017, which is a continuation of and claims the benefit of priority under 35 U.S.C. § 120 to U.S. patent application Ser. No. 13/464,598, filed on May 4, 2012, which claims the benefit of priority, under 35 U.S.C. § 119(e), to U.S. Provisional Patent Application Ser. No. 61/482,596, filed on May 4, 2011, each of which is incorporated herein by reference in its entirety.

This application also claims the benefit of priority under 35 U.S.C. 119(e) of U.S. Provisional Patent Application Ser. No. 61/542,515 filed Oct. 3, 2011, which is incorporated herein by reference in its entirety and made a part hereof.

This application also claims the benefit under 35 U.S.C. 119(e) of U.S. Provisional Patent Application Ser. No. 61/561,502 filed Nov. 18, 2011, which is incorporated herein by reference in its entirety and made a part hereof.

This application is also related to:
PCT Patent Application PCT/US2006/020950 (published as WO 2006/128183A2) filed May 30, 2006 by Lundberg et al. titled "Method and Apparatus for Cross-Referencing Important IP Relationships";
PCT Patent Application PCT/US2005/026768 (published as WO 2006/015110) filed Jul. 27, 2005 by Lundberg et al. titled "Patent Mapping";
U.S. Patent Publication US 2007/0198578 filed Jul. 27, 2006 by Lundberg . titled "Patent Mapping";
U.S. Patent Publication US 2008/0216013 filed Aug. 1, 2007 by Lundberg et al. titled "Patent Tracking"; and
U.S. Patent Publication US 2010/0131513 filed Oct. 23, 2009 by Lundberg et al. titled "Patent Mapping"; which are all incorporated by reference in their entirety,

TECHNICAL HELD

Example embodiments relate to the field of automated patent analysis, and more specifically to a method and apparatus for automatically delimiting and extracting claim text from a file containing the patent, automatically identifying phrases that are common to two or more claims and separately displaying the identified common phases on a display screen along with the claim text, eliciting and receiving user input to further classify at least portions of the identified common phases as concepts of the claims, and generating a concept map of the concepts. The present disclosure optionally also includes generating a computer-readable claim-concept data object that contains data representing the user-classified concepts and the concept map of the claims, an identification of the patent, and optionally including data representing at least one annuity or maintenance-fee-payment currency amount and due date, and/or data representing an identification of at least one related patent.

BACKGROUND

United States Patent Publication US 2010/0131513 by Lundberg et al., published May 27, 2010 and titled "Patent Mapping," is incorporated herein by reference. Lundberg et al. describe a system and method that permit patent mapping. Their method may include maintaining a database of patent portfolios and a database of patents with each patent stored in the database of patents associated with one or more patent portfolios stored in the database of patent portfolios. A search query may be received associated with a first patent portfolio and the first portfolio may be searched as a function of the search query. Search results may be generated that include one or more patent claims associated with the search query. The one or more patent claims may be mapped to a patent concept. They also describe a computer-implemented method that includes maintaining a database of patent portfolios and a database of patents, each patent stored in the database of patents associated with one or more patent portfolios stored in the database of patent portfolios; receiving a search query associated with a first patent portfolio; searching the first portfolio as a function of the search query; generating search results, the search results including one or more patent claims associated with the search query; and mapping the one or more patent claims to a patent concept.

United States Patent Publication US 2006/0036451 was filed Aug. 10, 2004 by Lundberg et al., published Feb. 16, 2006 titled "Patent mapping" and is incorporated herein by reference. In this application, Lundberg et al. describe systems, methods, software, and data structures for patent mapping, storage, and searching. Some such embodiments include mapping patent documents, claims, and claim limitations. Some further embodiments provide for searching a universe of patent documents by patent document, claim, limitation, class, element, or concept.

United States Patent Publication US 2006/0026174 was filed Jul. 27, 2004 by Lundberg et al. published Feb. 2, 2006 titled "Patent mapping" and is incorporated herein by reference. In this application, Lundberg et al. describe systems, methods, software, and data structures for patent mapping, storage, and searching. Some such embodiments include mapping patent documents, claims, and claim limitations. Some further embodiments provide for searching a universe of patent documents by patent document, claim, limitation, class, or element.

United States Patent Publication US 2008/0216013 was filed Aug. 1, 2007 by Lundberg et al. published Sep. 4, 2008 titled "Patent tracking" and is incorporated herein by reference. in this application, Lundberg et al. describe systems and methods for patent and claim tracking. Embodiments include tracking changes in claims through amendments, and displaying the claims in a marked-up format for viewing the changes, Other embodiments include recording and displaying references that may have been cited against a patent application and its claims. Other embodiments are described and claimed.

United States Patent Publication US 2003/0033295 filed Jul. 1, 2002 by Adler et al. published Feb. 13, 2003 titled "Method for analyzing and recording innovations" and is incorporated herein by reference. In this application, Adler et al. describe a data processing system having an interface, a query builder connected to the interface for receiving the factual information and for building a search query describing the innovation, a search engine connected to the interface and to the query builder, for selecting a database and accessing this database via a transmission network and for searching the query in the database, a relevancy filter for filtering the search result provided by the search engine, means for comparing the search query with the filtered prior art output by the relevancy filter and a statutory analyzer for analyzing the comparison to form a computer-implemented electronic records system and a data processing system for automatically maintaining an electronic laboratory records system and a corresponding method, and to a computer program product directly loadable into the internal memory of a computing apparatus or network.

United States Patent Publication US 2010006392.3 was filed Nov. 30, 2009 by Lundberg et al., published Mar. 11, 2010 titled "SYSTEM AND METHOD FOR ANNUITY PROCESSING," and was a national-stage entry from PCT Application PCT/US07/08822 filed Apr. 10, 2007, each of which is incorporated herein by reference. In United States Patent Publication US 2010/0063923, Lundberg et al. describe a system, apparatus, and method for annuity processing. In some embodiments, an annuity processing module is used in conjunction with an internet-based patent- and trademark-application management system. This annuity-processing module reflects a software implementation of various business rules or methods associated with paying the annuity due on a patent. These rules are, in some embodiments, derived front various laws relating to the payment of annuities. In some embodiments, these rules are provided to a workflow engine via a DTD or XML schema. The workflow engine manages the execution of the various business rules and states associated with this execution. These rules, including the decision to make a payment, can be manually executed or automatically executed by a member of an organization implementing the annuity payment module as a part of a larger system. This larger application could, in some embodiments, be an internet-based patent- and trademark-application management system.

U.S. Provisional Patent Application 60/685,759 filed May 27 2005 and PCT Patent Application PCT/US06/20950 (published as WO2006/128183A2) filed May 30, 2006 by Lundberg titled "Method and Apparatus for Cross-Referencing Important IP Relationships" are all incorporated herein by reference. In these applications Lundberg describes a system and method to provide cross-referencing of important IP relationships. The system includes software executing on a computing platform for displaying relationships between various domains of IP information selected from the group of claims, prosecution history, products, concepts or art.

U.S. Pat. No. 5,963,205 to Sotomayor issued Oct. 5, 1999 titled "Automatic index creation for a word processor", and is incorporated herein by reference. Sotomayor described a method and apparatus to enable scanning one or more documents, from within a word-processor program, wherein his disclosure automatically identifies key topics and phrases in a document's text. He also describes inserting identifying tokens for the index-generation program in the word-processor to generate an index to those key topics. One embodiment provides an apparatus and method for automatically identifying semantically important key topics within an integrated word-processor environment. A document is scanned. from within a word-processor program, automatically identifies significant key topics in the document, and creates and inserts index tokens for these key topics. One embodiment includes a process running in a word-processor program on a computer which (a) allows an author to select index generation for a document being processed (edited) and then, using a semantic analyzer program running on a computer, (h) automatically identifies significant key topics within the document, (c) generates and embeds index tokens into the text of the document.

What is needed is an improved. method and system for automated and assisted patent-claim mapping and expense planning.

SUMMARY

The present disclosure provides an apparatus and computer-implemented method that includes Obtaining, into a computer, text of a patent, automatically finding and extracting, using the computer, a set of claim text from the patent text, identifying, using the computer, text of independent claims from the set of claim text, displaying in a first row on a computer monitor the text of the independent claims, automatically determining a plurality of preliminary scope-concept phrases from the text of the independent claims, displaying in a second row on the computer monitor the text of the plurality of preliminary scope-concept phrases, eliciting and receiving user input to specify a first one of the plurality of preliminary scope-concepts phrases, and highlighting each occurrence of the specified first one of the plurality of preliminary scope-concept phrases in a plurality (e.g., in some embodiments, all) of the independent claims displayed in the first row.

The present disclosure also provides an apparatus comprising a computer; a storage unit operatively coupled to the computer; a module comprising one or more processors to obtain, into the storage unit, text of a first patent; find and identify, using the computer, claim text from the text of the first patent; automatically identify, using the computer, one or more keywords contained in the claim text of the first patent; display on a computer monitor the automatically identified keywords.

The present disclosure also provides a non-transitory computer-readable medium having instructions stored thereon that when executed on a suitably programmed computer cause the computer to perform a method comprising obtaining, into the computer, text of a first patent; finding and identifying, using the computer, claim text from the text of the first patent; automatically identifying, using the computer, one or more keywords contained in the claim text of the first patent; and displaying on a computer monitor the automatically identified keywords.

BRIEF DESCRIPTION OF THE DRAWINGS

FIG. 4B is a flow chart of a process 402 of one embodiment of the present disclosure having a claim-text extraction and claim-scope analysis assist functionality.

FIG. 8A is an example of a user interface display 801 of one embodiment of the present disclosure.

FIG. 8B is an example of a user interface display 802 of one embodiment of the present disclosure.

FIG. 8C is an example of a user interface display 803 of one embodiment of the present disclosure.

FIG. 9A is an example of a first portion 901A of a user interface display of one embodiment of the present disclosure.

FIG. 9B is an example of a second portion 901B of a user interface display of one embodiment of the present disclosure.

FIG. 9C is an example of a third portion 901C of a user interface display of one embodiment of the present disclosure.

FIG. 12 is an example of a final claim map 1200 with fee schedule.

FIG. 14 is a flow chart of a process 1400 of one embodiment of the present disclosure.

FIG. 15 is a flow chart of a process 1500 of one embodiment of the present disclosure.

FIGS. 16-21 show examples of user interface displays according to example embodiments.

DESCRIPTION OF PREFERRED
EMBODIMENTS

In the following detailed description of the preferred embodiments, reference is made to the accompanying drawings that form a part hereof, and in which are shown by way of illustration specific embodiments in which example embodiments may be practiced. It is understood that other embodiments may be utilized and structural changes may be made without departing from the scope of the present disclosure.

The leading digit(s) of reference numbers appearing in the FIGS. generally corresponds to the FIG. number in which that component is first introduced, such that the same reference number is used throughout to refer to an identical component which appears in multiple FIGS. . Signals and connections may be referred to by the same reference number or label, and the actual meaning will be dear from its use in the context of the description.

Figure 1A:
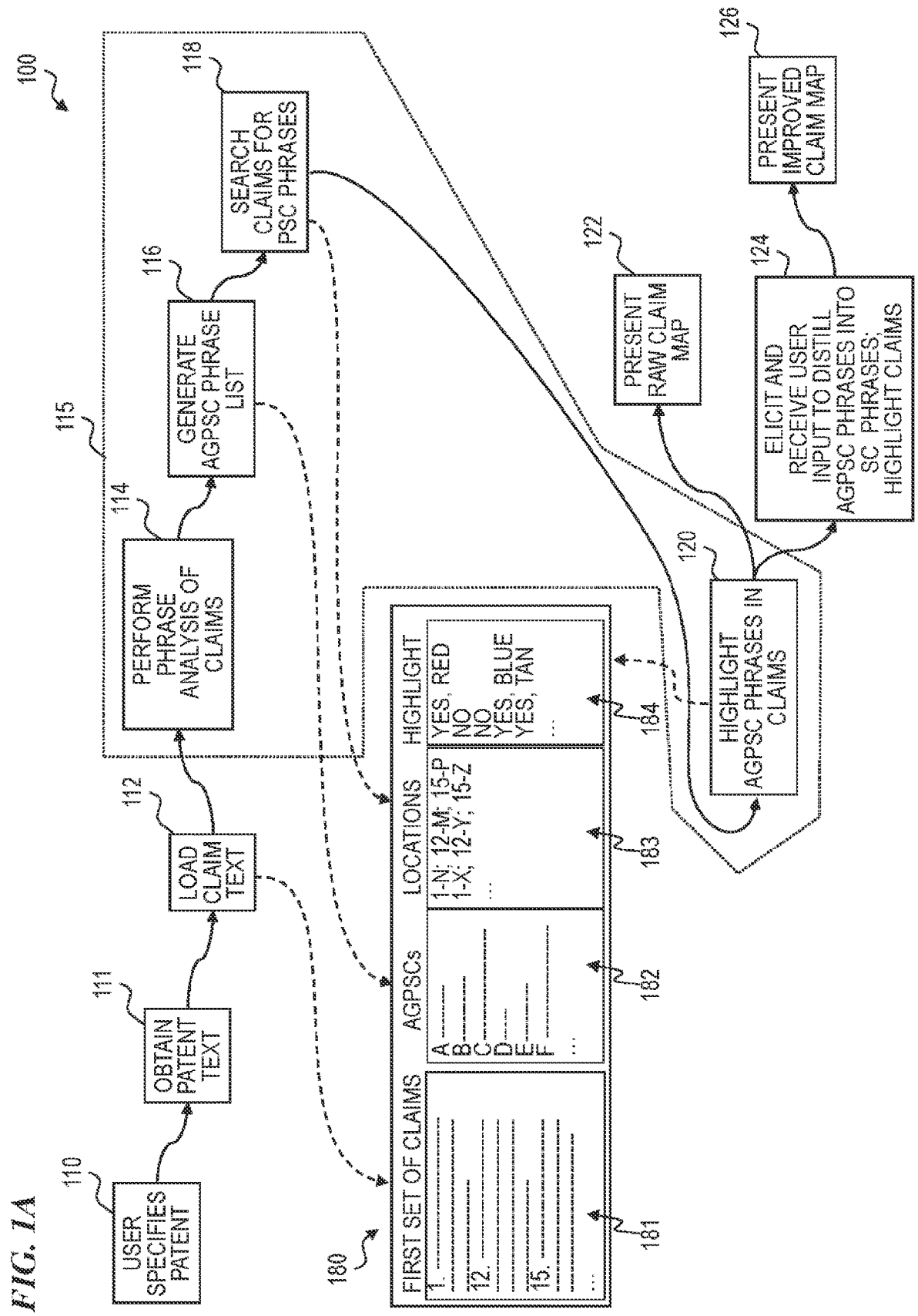
FIG. 1A is a flow chart of a process 100 of one embodiment of the present disclosure having a claim-text extraction and claim-scope analysis assist functionality.

FIG. 1A is a flow chart of a computer-implemented process 100 of one embodiment of the present disclosure having a claim-text extraction and claim-scope analysis assist functionality. In some embodiments, process 100 includes eliciting and receiving 110 indicia from a user that specifies a patent (in some embodiments, this will be an issued patent that is specified by a patent number, title text, inventor(s) or the like, while in other embodiments, this will be a pending patent application similarly specified), obtaining 111 some or all text of the specified patent document (e.g., via downloading the text of the patent from a patent office website or the like), and loading 112 claim text extracted from the text of the patent document (e.g., identifying the claim text of the patent using tags in the text, or the like). In some embodiments, a first selected subset of the claims are analyzed (for example, in some embodiments, only the independent claims of the patent are used for the claim text to be operated on by the rest of process 100, and the dependent claims are ignored). In some embodiments, process 100 further includes performing a phrase analysis 114 of the claim text to locate relevant phrases (e.g., in some embodiments, this analyzing includes locating "phrases" that are present in two or more of the claims; in some embodiments, the "phrases" are strings of contiguous-sequential, contiguous, adjacent, sequential, or near-by text (e.g., contiguous-sequential phrases include strings of two contiguous words, strings of three contiguous words, strings of four contiguous words, or strings of five or more contiguous words, in each case have the same sequential order and have no intervening words;

contiguous phrases include strings of two contiguous words, strings of three contiguous words, strings of four contiguous words, or strings of five or more contiguous words, but may have different sequential orders and have no intervening words (e.g., "pointed hot projection" would be equivalent to "hot pointed projection" but not equivalent to "hot very pointed projection";

for adjacent or near-by strings, the selected words may be in different orders unless the user specifies that the order is to be considered by specifying "sequential" as well, adjacent phrases include a plurality of adjacent words that, in some embodiments, ignore certain "trivial" words, e.g., article-type words such as "a", "the", "said", and the like, but in this case, the adjacent words need not be in the identical sequential order in each phrase), near-by phrases are strings of words (in some embodiments, one or more non-trivial words (as well as article-type words such as "a", "the", "said", and the like) are ignored as well as ignoring one or more words that are not in a set of pre-determined words, but in this case again, the near-by words need not be in the identical order in each phrase and would consist of N words within a slightly larger group of M words (e.g., a group of 4 words (N=4) within a group of 7 words (M=7))). In each of the above cases, a simple word-by-word analysis is done of each claim to be mapped. In other embodiments, a semantic analysis is performed to find equivalent noun clauses, verb clauses, adjective clauses, adverb clauses and the like that are in two or more claims). As used herein, words are considered "adjacent" even if there are certain "trivial" intervening words, such as articles "a", "the", "said", and the like, identifiers such as "first", "second" and the like, and in some cases other modifiers such as "upper", "lower", "larger", "smaller" and the like. As used herein, a sequence of words are considered "contiguous" only if there are no intervening words, in contrast to being "adjacent" even if there are "trivial" intervening words. In some embodiments, the selection of which words may be ignored as "trivial" is initially specified as a default set such as re, "the", "said", "first", "second" and the and this set can be selectively expanded or contracted as desired by the user to a set of activated "trivial" words that is used in the subsequent analysis of one or more sets of claims. In some embodiments, the activated set of "trivial" words that is used can be modified during one session of the claim mapping process, and/or on a claim-by-claim basis.

In some embodiments, the phrase analysis process parses each claim in the first selected subset of claims to locate word boundaries (the words are separated by separators such as spaces, punctuation, linefeeds and the like, which separators are then ignored). In some embodiments, various other words that are ubiquitous or very common in claims (such as "method", "process", "apparatus", "device", and the like) are also ignored, For the remaining words, analysis 114 selects successive pairs of claims; and for each pair of claims, selects a first ($N^{th}$) word in the first claim and determines whether that word is in the second claim (which, if it is in the second claim is designated the $M^{th}$ 1 word in the second claim); then the $N^{th}$+1 word of the first claim is compared to the $M^{th}$+1 word of the second claim; if so, then the $N^{th}$+2 word of the first claim is compared to the $M^{th}$+2 word of the second claim; if so, this process continues in this manner until the end of the claim or the end of the matching string. This results in a string of words (herein called an automatically generated preliminary scope concept (AGPSC) phrase) that exists identically in both of this pair of claims (it is the string from the $N^{th}$ to the $N^{th}$+n words of the first claim and the string from the $M^{th}$ to the $M^{th}$+n words of the second claim).

The process 100 then continues by generating 116 an automatically generated preliminary scope concept (AGPSC) phrase list, by adding each additional AGPSC phrase found to the list of AGPSC phrases.

The process 100 then continues by searching 118 the claims to identify and delimit the same or similar phases in each of a plurality of claims of the specified patent. Note that in some embodiments, the functions 114, 116, 118 and/or 120 are intermingled with one another as a function 115, since once the claim loading and selection function creates the first subset of claims and places those claims in the claim substructure 181 of data structure 180, the pair-wise phrase analysis of function 114 results in phrases that are accumulated in the phrase list substructure 182 by phrase list function 118, and function 118 is merely tracking the locations (in locations substructure 183, which in some embodiments, optionally also tracks the length in each claim, since the user may change the number of words to highlight by editing or adding equivalent phrases) of each phrase in the phrase list of function 116 in each claim as determined by function 114. In some embodiments, the highlighting function 120 also stores an indication (in highlighting substructure 184) of whether or not to highlight (and optionally what color or pattern to use when highlighting) each given phrase in the list 182. Thus, a. first n-word phrase "A" may be stored in list substructure 182, the locations may by stored in locations substructure 183 (e.g., phrase "A" starting at word N of claim 1, starting at word M in claim 12, starting at word P in claim 15; phrase "B" starting at word X of claim 1, starting at word Y in claim 12, starting at word Z in claim 15), and whether or not to highlight and which highlighting to use !nay by stored in highlighting substructure 184. If equivalent scope concept strings of different lengths are designated (either by user analysis, or automatic semantic analysis), the length (e.g., number of characters or number of words or the like) of each phrase may also be stored (e.g., in some embodiments, in the locations substructure 183 or the highlighting substructure 184).

In some embodiments, process 100 then continues by highlighting 120 each of the automatically generated preliminary scope concept (AGPSC) phrases (e.g., using colors to distinguish and draw attention to each of a plurality of phrases—for example, highlighting a first phrase in light yellow in each of its occurrences in a plurality of claims, highlighting a second phrase in light green in each of its occurrences in a plurality of claims, highlighting a third phrase in light tan in each of its occurrences in a plurality of claims, and so on). In other embodiments, highlighting can be accomplished using different cross-hatching, bolding or italicizing text, different fonts, blinking or the like. In some embodiments, a display of phrases (e.g., a plurality of phrases listed one after another in a first column of the display) along with a display of the entire claim text (e.g., a plurality of claims listed one after another in a second column of the display).

In some embodiments, as the user moves the mouse pointer over any one of the plurality of phrases (or tabs the display cursor, or otherwise indicates an interest in one of the listed phrases), that user-indicated phase (e.g., the "moused-over" phrase that is selected by the user moving a pointer on a computer monitor using a mouse-type input device) is highlighted (e.g., in some embodiments, the user-indicated phrase are shown as bold black text on a light-color-tinted background) in every one of the claims in which it occurs, while a plurality (e.g., in some embodiments, all) of the other phrases in the claims are not highlighted (e.g., in some embodiments, the other phrases are shown as not-bold black text on a white background, or grey text on a white background where the selected phrase is in black text on a white background). In some embodiments, the user selects a collection of two or more phrases e.g., by holding the "control" key while clicking on all of the desired phrases) and the computer-implemented process (e.g., a computer program) will highlight each phrase in the collection of phrases (e.g., in some embodiments, a plurality of modes of phrase-collection highlighting are provided: a first mode in which only those claims having all of the collection of phrases are highlighted (e.g., each phrase shown with a different background color, or all of the phrases shown in the same color), a second mode in which a plurality (e.g., in some embodiments, all) of the claims having any one of the phrases are highlighted (e.g., each claim having all the phrases would have each phrase shown with a different vivid, saturated or dark background color, or all of the phrases shown in the same vivid, saturated or dark color, while the other claims having only a subset of the selected collection of phrases would have those phrases highlighted in a pastel or light version of the respective color(s)), a third mode in which the user selects one subset of phrases or words as synonymous or equivalent (e.g., the user may decide to select "transistor", "electronic switch", "FET", and "gate" as all being synonyms of, or equivalent to, each other and thus all are considered to be the same first concept) while selecting other subsets of phrases or words as synonymous with one or more other concepts (e.g., the user may decide to select "CMOS", complementary transistors, and "N-channel and P-channel" as all being synonyms of, or equivalent to, the same second concept), such that the complex relationship of the synonymous-concept combination is highlighted (e.g., each claim having a plurality (e.g., in some embodiments, all) of the first-concept phrases and second-concept phrases (in some embodiments, any number of synonymous-concepts can be specified) would have each synonymous-concept phrase shown with a different vivid, saturated or dark background color, or all of the phrases shown in the same vivid, saturated or dark color, while the other claims having only a subset of the selected collection of synonymous-concept phrases would have those phrases highlighted in a pastel or light version of the respective color(s)).

In some embodiments, process 100 optionally presents 122 a raw claim map (e.g., a matrix of rows, each presenting a different automatically generated preliminary scope concept (AGPSC) phrase, and columns, each presenting a different claim (in some embodiments, only the independent claims are indicated, and each of the independent claims is represented by one column), wherein each cell at the intersection of an AGPSC row with a claim column of a claim containing that AGPSC is highlighted, and each cell at the intersection of a AGPSC row with a claim column of a claim not containing that AGPSC is not highlighted).

In some embodiments, process 100 elicits and receives 124 user input, wherein the user can indicate to the system scope concept (SC) derived from one or more AGPSCs. For example, the system will often extract several slightly different forms of a limitation with different wordings but with the same or substantially similar meanings, wherein the user can indicate to the system that two or more AGPSCs are the same SC. In some embodiments, the system indicates a distinction (e.g., a displayed indication that is different) between a plurality of claims having phrases that are word-for-word identical and another plurality of claims having phrases that are indicated by the user as being the same scope concept but not word-for-word identical. In some embodiments, process 100 optionally presents 126 an improved claim map (e.g., as described above, a matrix of rows, each presenting a different scope concept (SC) phrase, and columns, each presenting a different claim, wherein each cell at the intersection of an SC row with a claim column of a claim containing that SC is highlighted, and each cell at the intersection of an SC row with a claim column of a claim not containing that SC is not highlighted).

Figure 1B:
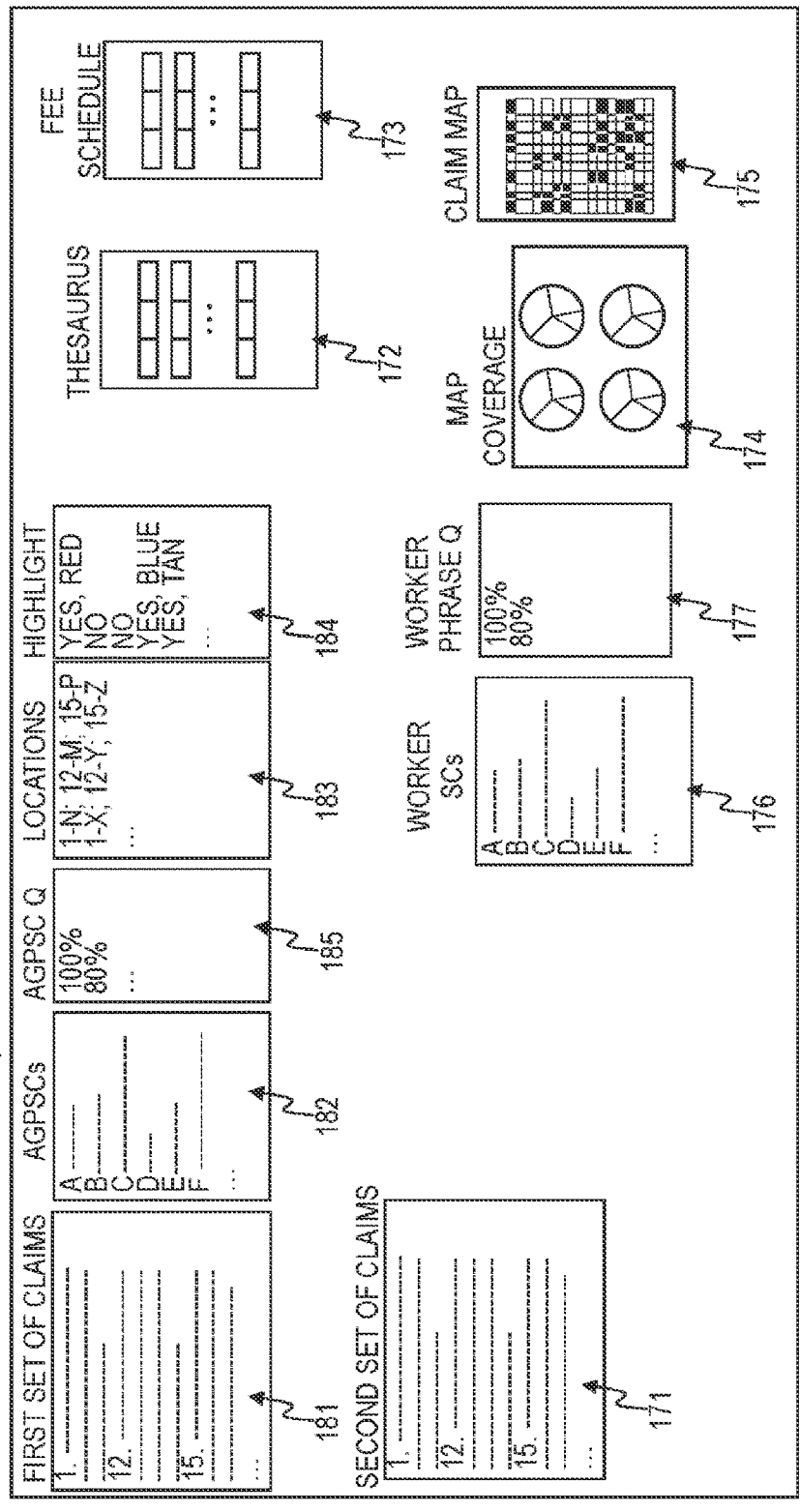
FIG. 1B is a diagram of a computer readable data structure 180 of one embodiment of the present disclosure having a claim-text extraction and claim-scope analysis assist functionality.

FIG. 1B is a diagram of a computer readable data structure 180. In some embodiments, data structure 180 described above for FIG. 1A includes additional data substructures. In some embodiments, the process 100 further include process 100 includes eliciting and receiving indicia from a user that specifies a second patent (in some embodiments, this will be an issued patent that is specified by a patent number, title text, inventor(s) or the like, while in other embodiments, this will be a pending patent application similarly specified). Applying process 100 to the second patent results in a second set of claims which are placed in the second claim substructure 171 of data structures 180. The remainder of process 100 is then carried out on this second set of claims. In some embodiments, data structure 180 includes a thesaurus 172 data substructure, which is used to generate a plurality of additional key phrases and AGPSCs that include different words but that have substantially the same meanings as phrases in the initial list. In some embodiments, data structure 180 includes annuity and maintenance-fee schedule(s) for the patent(s) being analyzed in data substructure 173, which is used to generate a schedule of payments due for the patent(s) being analyzed. In some embodiments, data structure 180 includes a set of user generated. scope concepts in data substructure 176, the scope concepts being elicited and received from a user 99 interacting with the system through a human-computer interface 89 (e.g., a personal computer, a computer terminal, a smart phone, a tablet computer, or other such devices).

In some embodiments, data structure 180 includes an AGPSC quality measure 185 data substructure, which contains for each of the plurality of AGPSCs a measure of the quality or potential importance of that AGPSC. In different embodiments, a variety of different quality measures are used, including but not limited to: length (number of words) of the AGPSC, number of claims containing the AGPSC, and the number of patents (of the patents being analyzed) containing the AGPSC. In some embodiments, data structure 180 includes a user-specified scope concept quality measure 177 data substructure which contains, for each of the plurality of user-specified scope concepts in 176, a measure of the quality or potential importance of that user-specified scope concept.

Figure 2:
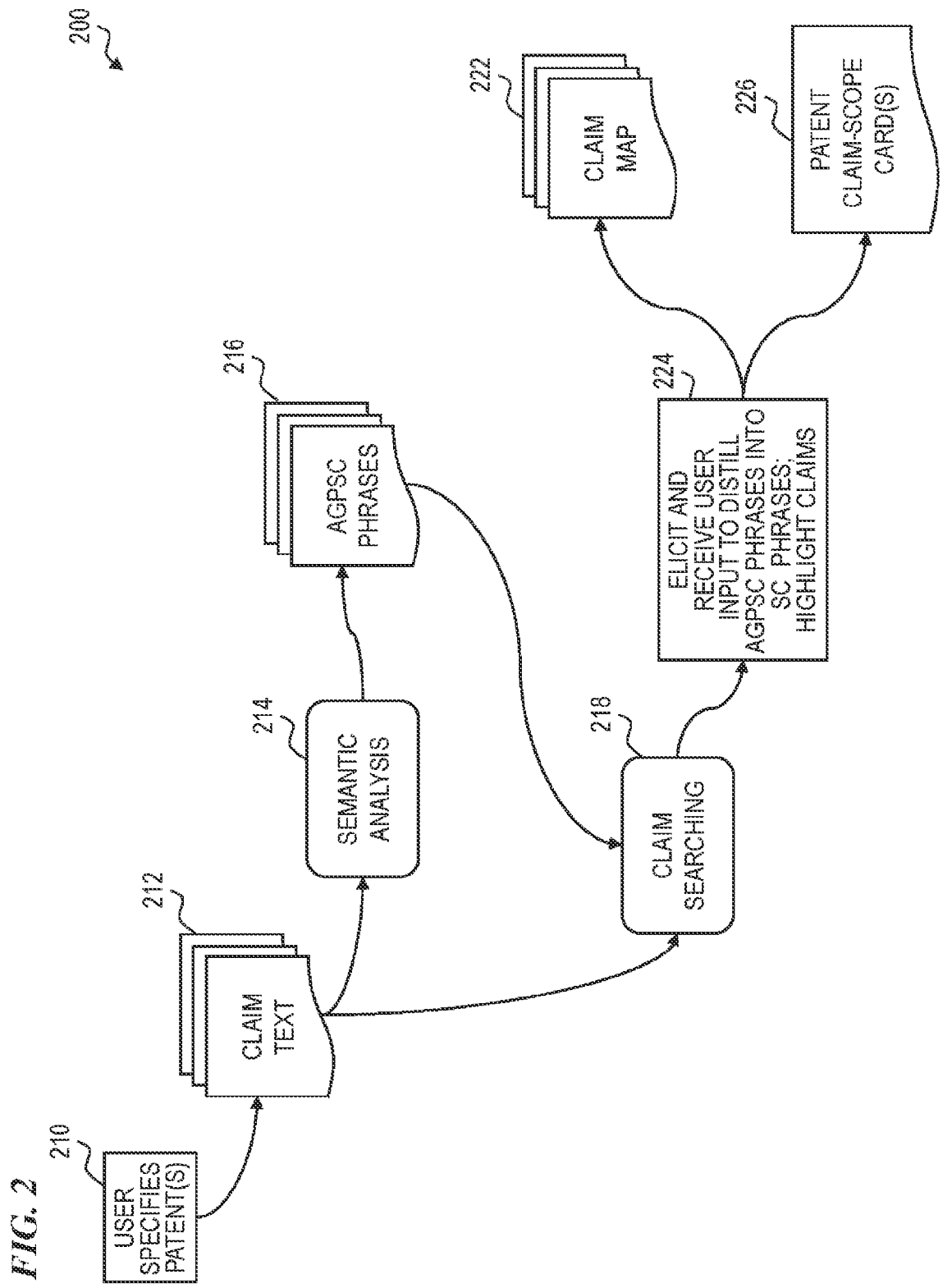
FIG. 2 is a flow chart of a process 200 of one embodiment of the present disclosure having a claim-text extraction and claim-scope analysis assist functionality.
Figure 6:
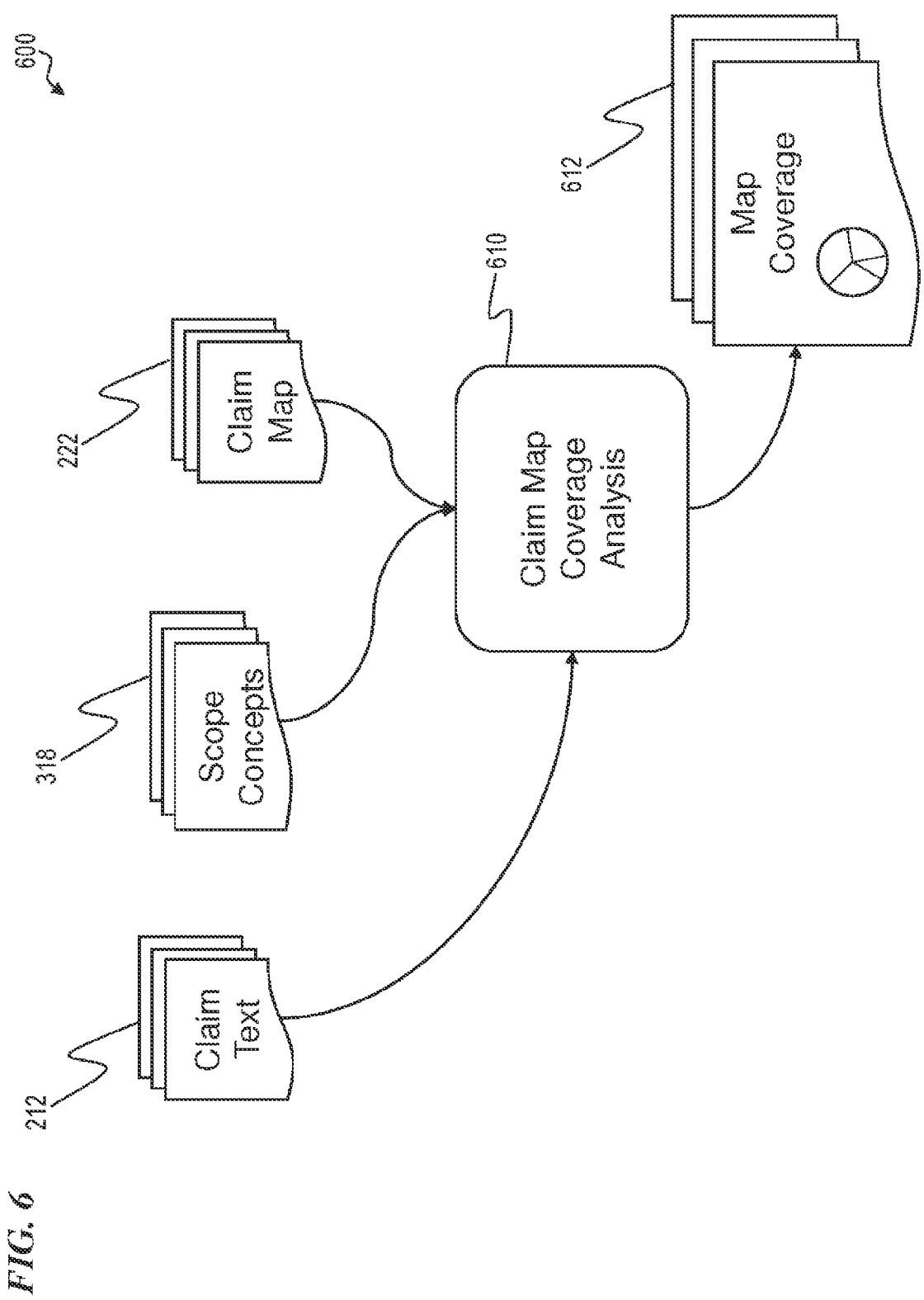
FIG. 6 is a flow chart of a process 600 of one embodiment of the present disclosure.

In some embodiments, data structure 180 includes a claim mapping coverage 174 data substructure. The process for generating the claim mapping coverage is shown in FIG. 6 and is described below. In some embodiments, data structure 180 includes a claim map 175 data substructure. The process for generating the claim map is shown in FIG. 2 and is described below. In some embodiments, some or all of the information contained in the plurality of data substructures in computer readable data structure 180 is presented to decision maker(s) 90 via a human-computer interface 80 (e.g., a personal computer, a computer terminal, a smart phone, a tablet computer, or other such devices). In some embodiments, the information includes claim scope and the maintenance/annuity fees and dates they are due. Such claim-scope information provides an easier-to-use way to present a high-level overview of a patent portfolio that presents the concepts that define the scope of the patents in a manner that allows prioritization and decisions as to which patents are important for litigation or maintenance-fee payments or like purposes.

Figure 1C:
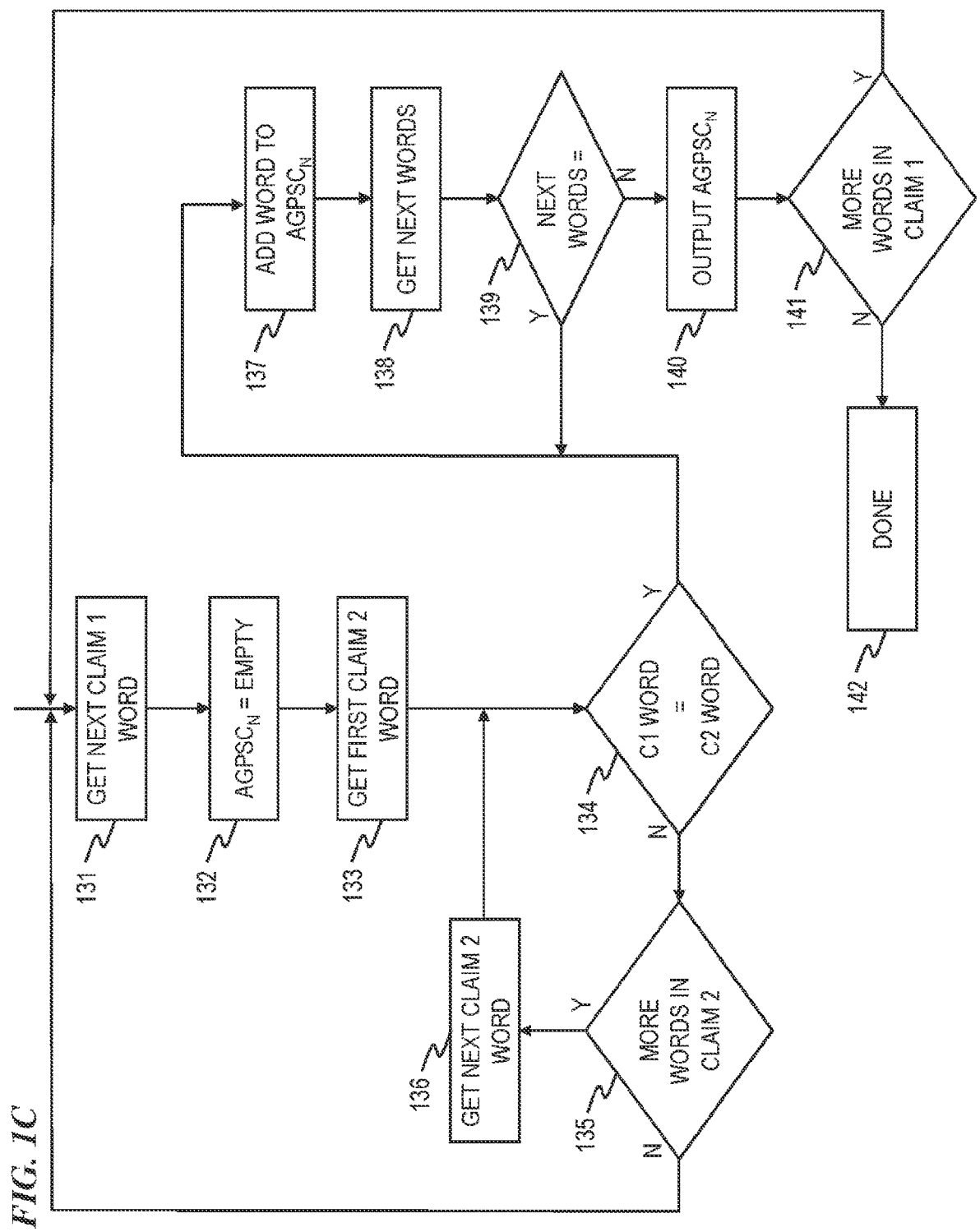
FIG. 1C is a flow chart of a process 130 of one embodiment of the present disclosure having a claim-text extraction and claim-scope analysis assist functionality.

FIG. 1C is a flow chart of a computer-implemented process 130 of one embodiment of the present disclosure having a claim-text extraction and claim-scope analysis assist functionality. Process 130 identifies AGPSCs in some embodiments. A first word in a first claim is selected 131. A potential new AGPSC is set to empty 132. A first word in a second claim is selected 132. The selected word from the first claim is compared to the selected word from second claim 134. If the selected words are not the same, a check is made to determine if there are more words in the second claim 135. If not, the process starts over with the next word in the first claim 131. If there are more words in the second claim, the next word in the second claim is selected 136, and the comparison of the selected words from the first claim and the second claim is repeated 134. If the comparison 134 determines that the selected word front the first claim is the same as the selected word from the second claim, that word is added to the new AGPSC 137. The next words in the first claim and the second claim are then selected 138, and compared 139. If the selected word from the first claim is the same as the selected word from the second claim, that word is added to the new AGPSC 137. If the comparison 139 determines that the selected words are not the same, a new AGPSC has been identified and is output 140. A check is made to determine if there are more words in the first claim 141. If there are more words in the first claim, the process repeats at 131. if there are no more words in the first claim, the process is complete 142.

FIG. 2 is a flow chart of a computer-implemented process 200 of one embodiment of the present disclosure having a claim-text extraction and claim-scope analysis assist functionality. In some embodiments, except as follows, process 200 is similar to process 100 described above, and includes one or more subprocesses described above for FIG. 1 but not shown here for clarity of this discussion. In some embodiments, process 200 includes eliciting and receiving 210 indicia from a user that specifies one or more patents (in some embodiments, these will be issued patents that are specified by patent numbers, text of titles, inventor(s) or the like), and loading 212 claim text extracted from the text of the patent document(s). In other embodiments, process 200 includes eliciting and receiving 210 indicia from a user that specifies a family of related patents is to be analyzed, and loading 212 claim text extracted from the text of the patent document(s) of all member(s) of the family of related patents. In some embodiments, the indicia from a user include specific patent family members to include or exclude (e.g., include only continuation applications). In some embodiments, process 200 further includes semantically analyzing 214 the claim text to identify relevant phrases, generating 216 an automatically generated preliminary scope concept (AGPSC) phrase list, searching 218 the claim text to identify and delimit the same or similar phases in each of a plurality of claims of the specified patent(s). In some embodiments, a display of phrases (e.g., a plurality of phrases listed one after another in a first column of the display) along with a display of the entire claim text (e.g., a plurality of claims listed one after another in a second column of the display) is presented to the user on a computer monitor (e.g., an LCD display, a projector, a screen, a portable electronic device etc). In some embodiments, process 200 further elicits and receives 224 user input, wherein the user can indicate to the system a scope concept (SC) derived from one or more AGPSCs. In some embodiments, process 200 presents 222 an improved claim map (e.g., as described above, a matrix of rows, each presenting a different scope concept (SC) phrase, and columns, each presenting a different claim, wherein each cell at the intersection of an SC row with a claim column of a claim containing that SC is highlighted, and each cell at the intersection of an SC row with a claim column of a claim not containing that SC is not highlighted). In some embodiments, a separate "card" 226 is produced (either a virtual card that can be electronically displayed on a computer monitor (e.g., a LCD display or a projector), or a real physical card (printed on card stock (such as, e.g., Avery 28878 Clean Edge® business card stock available from Avery Dennison Office Products, Brea Calif.; or the like) for ease of handling and presentation to a group of decision makers, or even printed on regular paper). In some embodiments, the map format of FIG. 12 (described further below) is used to show claim scope and the maintenance/annuity fees and dates they are due, all printed on cards (with one or more patents per card). Such claim-scope cards provide an easier-to-use way to present a high-level overview of a patent portfolio that presents the concepts that define the scope of the patents in a manner that allows prioritization and decisions as to which patents are important for litigation or maintenance-tee payments or like purposes.

Figure 3:
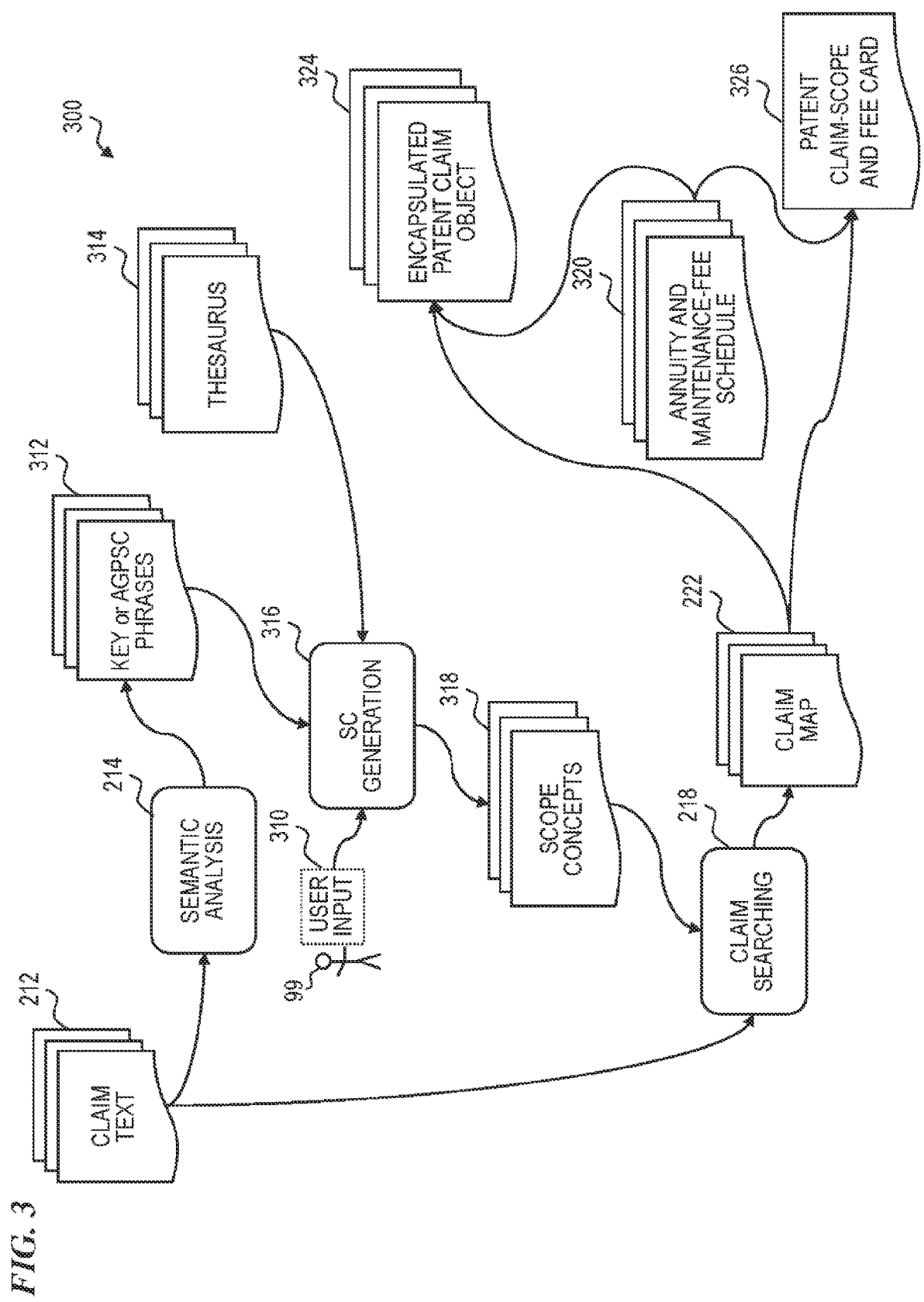
FIG. 3 is a flow chart of a process 300 of one embodiment of the present disclosure having a claim-text extraction, claim-scope analysis assist, and fee scheduling functionality.

FIG. 3 is a flow chart of a computer-implemented process 300 of one embodiment of the present disclosure having a claim-text extraction, claim-scope analysis assist, and tee scheduling functionality. In some embodiments, except as follows, process 300 is similar to process 200 described above, and includes one or more subprocesses described above for FIG. 2 but not shown here for clarity of this discussion. Process 300 includes loading 212 claim text for one or more patents. In some embodiments, process 300 further includes semantically analyzing 214 the claim text to identify relevant phrases, generating 312 a phrase list, wherein the phrase list includes automatically generated preliminary scope concepts (AGPSCs), and in other embodiments, the phrase list further includes key phrases that will assist a user in identifying scope concepts. In some embodiments, process 300 further includes generating 316 a list of one or more scope concepts 318. Generating 316 scope concepts includes starting with a initial phrase list (generated at 312) that includes AGPSCs and key phases, generating with the use of a thesaurus 314 a plurality of additional key phrases and AGPSCs that include different words but that have substantially the same meanings as phrases in the initial list. In some embodiments, process 300 further elicits and receives 310 user input, wherein the user can indicate to the system a scope concept (SC) derived from one or more AGPSCs and key phrases. In some embodiments, process 300 further includes searching 218 the claim text to identify and delimit the same or similar phases in each of a plurality of claims of the specified patent(s), and presents 222 an improved claim map (e.g., as described above, a matrix of rows, each presenting a different scope concept (SC) phrase, and columns, each presenting a different claim, wherein each cell at the intersection of an SC row with a claim column of a claim containing that SC is highlighted, and each cell at the intersection of an SC row with a claim column of a claim not containing that SC is not highlighted).

In some embodiments, process 300 further includes loading 320 annuity and maintenance-fee schedule(s) for the patent(s) being analyzed, encapsulating 324 the schedule information with the improved claim map, thereby creating an encapsulated patent claim object. In some embodiments, the encapsulated patent claim object includes the schedule of payments due and the improved claim map for a single patent. In other embodiments, the encapsulated patent claim object includes the schedule of payments due and the claim map for a plurality of patents. In some embodiments of the present disclosure, the encapsulated patent claim object is presented to a user, providing the user a more straightforward high-level overview of a patent portfolio in a manner that allows prioritization and decisions as to which patents are important for litigation or maintenance-fee payments or like purposes. In some embodiments, a separate "card" 326 is produced either a virtual card that can be electronically displayed on a computer monitor (e.g., a LCD display or a projector), or a real physical card (printed on card stock (such as, e.g., Avery 28878 Clean Edge® business card stock available from Avery Dennison Office Products, Brea Calif.; or the like) for ease of handling and presentation to a group of decision makers, or even printed on regular paper.

Figure 4A:
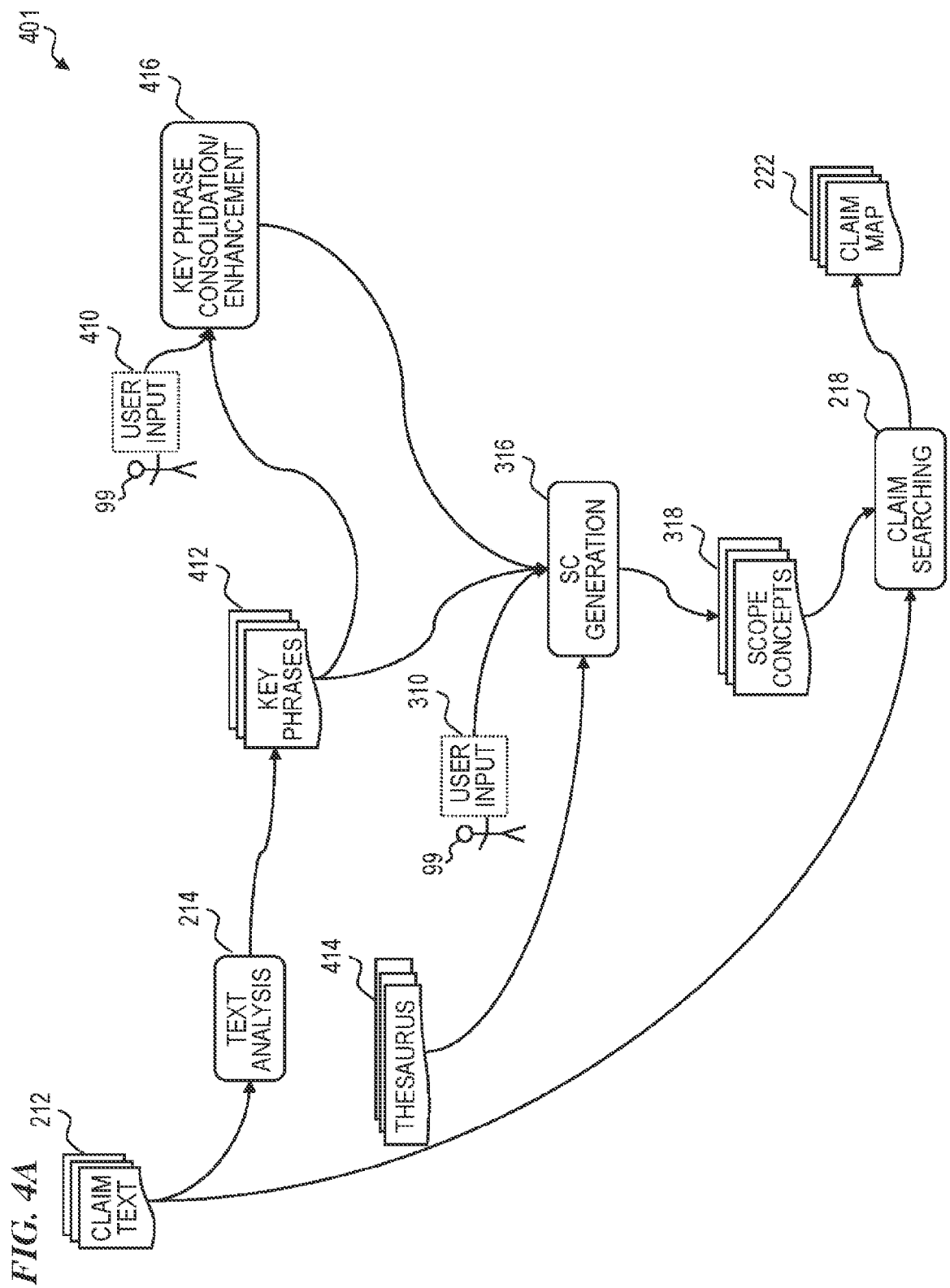
FIG. 4A is a flow chart of a process 401 of one embodiment of the present disclosure having a claim-text extraction and claim-scope analysis assist functionality.

FIG. 4A is a flow chart of a computer-implemented process 401 of one embodiment of the present disclosure having a claim-text extraction and claim-scope analysis assist functionality. In some embodiments, except as follows, process 401 is similar to processes 100, 200 and 300 described above, and includes one or more subprocesses described above for FIGS. 1, 2 and 3 but not shown here for clarity of this discussion. Process 401 includes loading 212 claim text for one or more patents. In some embodiments, process 401 further includes semantically analyzing 214 the claim text to identify key phrases, generating a key phrase list 412. wherein the key phrase list includes relevant phrases that will assist a user in identifying scope concepts in the claims. Key phrases are word sequences (sentence fragments) identified in and extracted from the claim text that are likely components of a claim limitation. In other embodiments, the key phrase list can include automatically generated preliminary scope concepts. In some embodiments, process 401 further includes key phrase consolidation and enhancement 416 wherein the process 401 elicits and receives 410 input from a user 99 specifying modifications to the process-generated key phrases, wherein such user specified modification can include but are not limited to editing the text of a key phrase, combining multiple key phases into a single key phase, adding a new key phrase to the key phase list, and removing a process-generated key phrase from the list.

In some embodiments, the process 401 further includes generating 316 a list of scope concepts 318, wherein scope concept generation includes amalgamating the key phrases, as originally identified and/or in some embodiments, as modified and enhanced by the user, into list a of automatically generated preliminary scope concepts (AGPSCs). In some embodiments, scope concept generation includes using one or more thesauri and/or other collections of sets of associated words to generate additional AGPSCs using terminology that is different but similar in meaning to terminology in already created AGPSCs. For example, from a first AGPSC including the term "phone", one or more .additional AGPSCs could be created using the terms "telephone", "cell phone", "mobile phone", and "cellular phone." Such additional AGPSCs would make it easier fur a user to apply very specific scope concepts for claim mapping.

In other embodiments, scope concept generation 316 includes using one or more thesauri and/or other collections of sets of associated words to automatically combine one or more AGPSCs into a single AGPSC that has similar but more general meaning. For example, a first AGPSC incorporating the term "helix", a second AGPSC incorporating the term "monopole", and a third AGPSC incorporating the term "dipole" could be combined into a single consolidated scope concept incorporating the term "antenna." The original AGPSC terms, "helix", "monopole" and "dipole", along with consolidated term "antenna", would employed used when searching claim text for this consolidated scope concept. Such additional AGPSCs would make it easier for a user to apply broader scope concepts for claim mapping.

In some embodiments, the thesauri 414 used in process 401 can include, but are not limited to, general local-language thesauri (for example, English, German, Spanish or French), technical subject matter specific thesauri (for example, for electronics, chemistry, or horticulture), and user supplied word association lists. In some embodiments, one or a plurality of thesauri can be used.

In some embodiments, process 401 further includes eliciting and receiving 310 user input wherein the user can indicate to the system final scope concepts 318, with each scope concept being derived from one or a plurality of AGPSCs that have been generated by the system. In other embodiments, the user can include one or a plurality of key phrases identified by the system and/or enhanced by the user, in the derivation of the final scope concepts 318. Each of the plurality of final scope concepts has associated with it one or more search phrases, wherein a search phrase is a text string used by the system when searching claim text for a particular final scope concept. In some embodiments, the search phrase may be identical with the final scope concept name. In other embodiments, each search phrase associated with a given final scope concept will have a substantially similar meaning, but not use identical wording. In some embodiments, process 401 further includes, searching 218 the claim text to identify and delimit the scope concepts in each of the plurality of claims of the specified patent(s). In some embodiments, process 401 includes presenting a claim map 222.

FIG. 4B is a flow chart of a computer-implemented process 402 of one embodiment of the present disclosure having a claim-text extraction and claim-scope analysis assist functionality. In some embodiments, except as follows, process 402 is similar to process 402 described above, and includes one or more subprocesses described above for FIGS. 4A. In some embodiments, process 401 includes key phrase consolidation and enhancement 416 wherein the process 402 elicits and receives 410 input from a user 99 specifying modifications to the process-generated key phrases, wherein such user specified modification can include but are not limited to editing the text of a key phrase, combining multiple key phases into a single key phase, adding a new key phrase to the key phase list, and removing a process-generated key phrase from the list. In some embodiments, key phrase consolidation and enhancement 416 further includes referencing and possibly incorporating claim text from the plurality of claims of the specified patent(s).

Figure 4C:
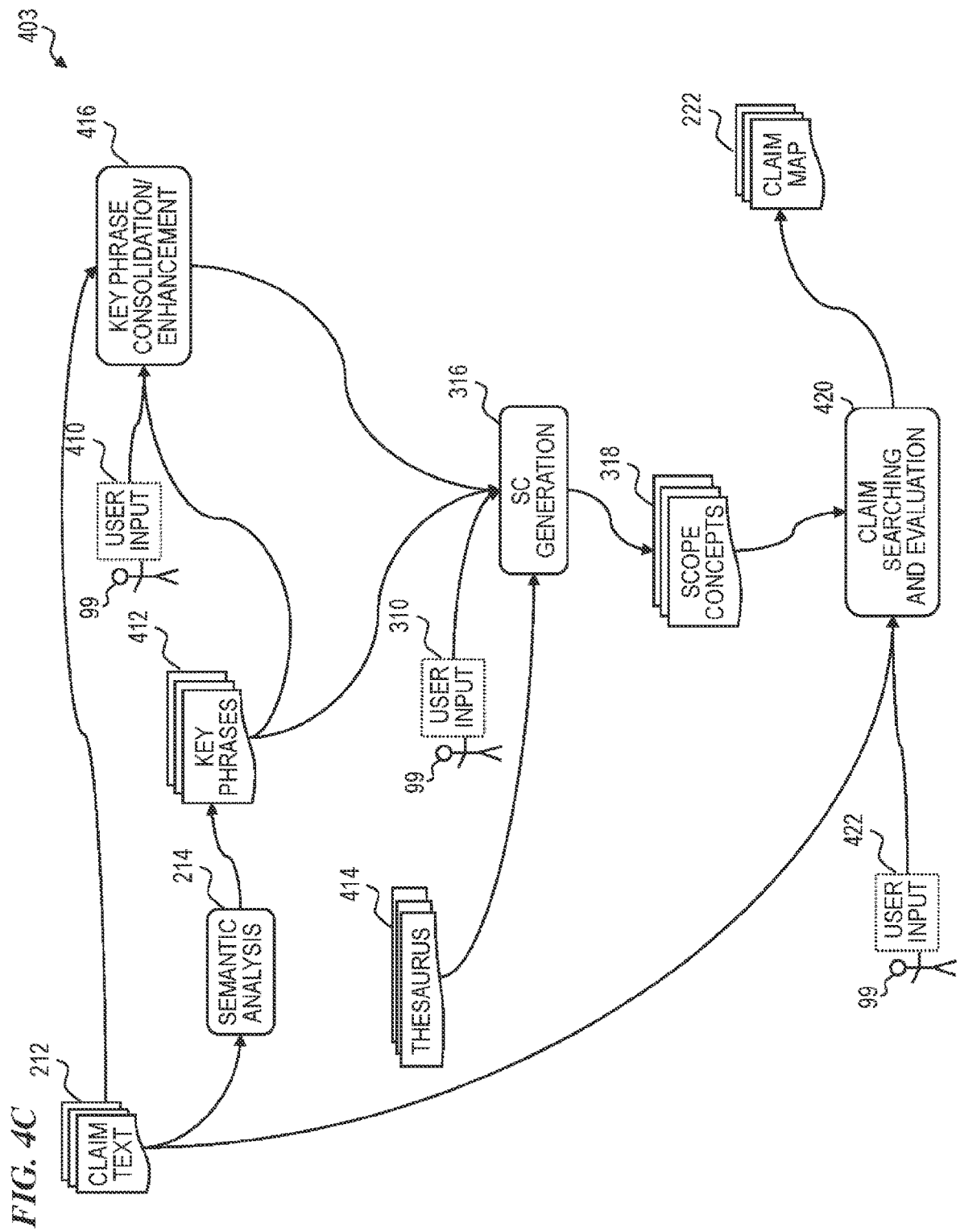
FIG. 4C is a flow chart of a process 403 of one embodiment of the present disclosure having a claim-text extraction and claim-scope analysis assist functionality.

FIG. 4C is a flow chart of a computer-implemented process 403 of one embodiment of the present disclosure having a claim-text extraction and claim-scope analysis assist functionality. In some embodiments, except as follows, process 403 is similar to process 402 described above, and includes one or more subprocesses described above for FIGS. 4B. In some embodiments, process 403 further includes claim searching and evaluation 420 wherein claim searching includes searching the claim text to identify and delimit scope concepts 318 in each of the plurality of claims of the specified patent(s). In some embodiments, a display of scope concepts (e.g., a plurality of scope concepts listed one after another in a first column of the display) along with a display of the entire claim text (e.g., the plurality of claims listed one after another in a second column of the display) is presented to the user on a computer monitor (e.g., an LCD display or a projector), wherein the scope concepts 318 are highlighted (e.g., displayed in a different color of text, or displayed in a different font, or displayed with some other visual indicator) in the claim text. In some embodiments, process 403 further elicits and receives 422 user input, wherein the user can specify refinements of how the scope concepts are identified in the claim text, (e.g., adding to what is highlighted in the claim text for a particular scope concept, or removing some of the highlighting for a particular scope concept in the claim text). In some embodiments, process 403 presents 222 an improved claim map.

Figure 5:
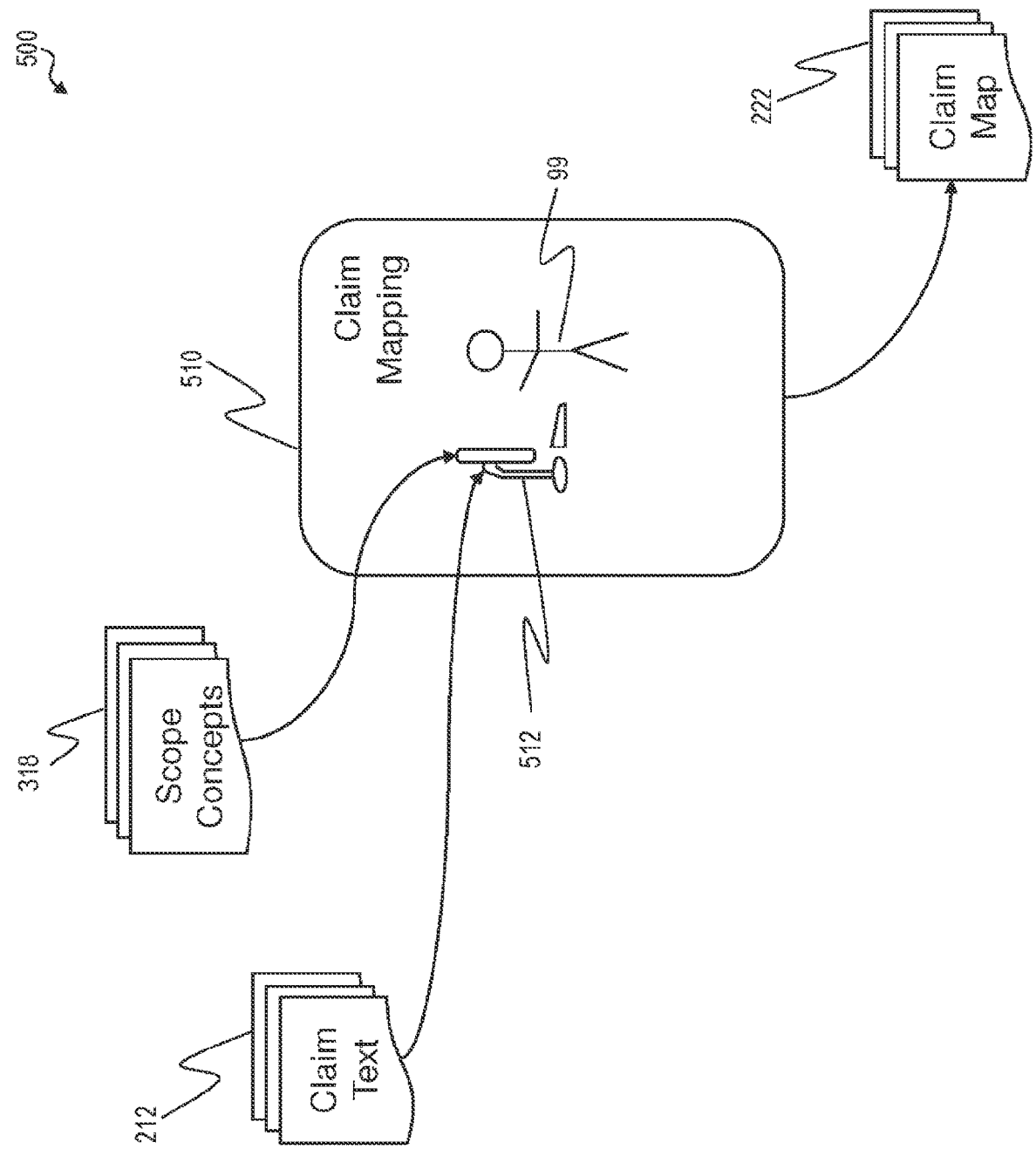
FIG. 5 is a flow chart of a process 500 of one embodiment of the present disclosure.

FIG. 5 is a flow chart of a computer-implemented process 400 of one embodiment of the present disclosure having a claim-text extraction and claim-scope analysis assist functionality. In some embodiments, except as follows, process 500 is similar to processes 100, 200 300 and 403 described above, and includes one or more subprocesses described above for FIGS. 1, 2, 3, and 4C but not shown here for clarity of this discussion. Process 500 includes loading 212 claim text for one or more patents. Process 500 further includes further includes the generation of scope concepts 318, which, in some embodiments, is by the method. described above for process 300 in FIG. 3 and in other embodiments is by the method described above for process 403 in FIG. 4C. In some embodiments, process 500 further includes claim mapping 510, wherein the claim text 212 is searched for each of the scope concepts 318 to identify and delimit the scope concepts in each of a plurality of claims of the specified patent(s). In some embodiments, a display of scope concepts (e.g., a plurality of scope concepts listed one after another in a first column of the display) along with a display of the entire claim text (e.g., a plurality of claims listed one after another in a second column of the display) is presented to the user 99 on a computer monitor 512 (e.g., a LCD display or a projector) wherein the scope concepts 318 are highlighted (e.g., displayed in a different color of text, or displayed in a different font, or displayed with some other visual indicator) in the claim text. In some embodiments, process 500 further elicits and receives user input, wherein the user can indicate to the system changes to be made in how the system identified scope concepts in the claim text. In some embodiments, changing the identification of scope concepts in the claim text can include highlighting additional text in the claim. In other embodiments, changing the identification of scope concepts in the claim text can include highlighting alternative text in the claim. In some embodiments, process 500 presents 222 an improved claim map.

FIG. 6 is a flow chart of a computer-implemented process 600 of one embodiment of the present disclosure. In some embodiments, except as follows, process 600 is similar to processes 100, 200, 300, 401, 402, 403, and 500 described above, and includes one or more subprocesses described above for FIGS. 1-5, but not shown here for clarity of this discussion. In some embodiments, process 600 further includes claim-map-coverage analysis 610, wherein claim-map-coverage analysis evaluates the amount of non-trivial claim text in each of the plurality of claims that is mapped to a scope concept. In some embodiments, the input to the claim-map-coverage analysis includes loaded claim text 212, and scope concepts 318 and claim map 222 generated by any of the processes 100, 200, 300, 401, 402, 403 or 500, described above. For each scope concept, the system searches the claim text for the one or the plurality of search phrases associated with that scope concept, and stores an indication of a plurality (e.g., in some embodiments, all) of the claim text that matches any of the search phrases for each scope concept. if any of the text in a claim matches any of the search phrases of a particular scope concept, that claim is said to "map" that scope concept. The system further determines, for each claim, the claim-mapping coverage, wherein the claim-mapping coverage is the portion of all non-trivial claim text in that claim that maps to any scope concept. As used herein, non-trivial claim text is that text of a claim that is significant in identifying the limitations of the claim. The system ignores trivial claim text when determining the portion of claim text that maps to one or more scope concepts. In some embodiments, trivial claim text includes boiler-plate language (e.g., "a method comprising" and "further includes"). In other embodiments, trivial claim text includes connector words (e.g., "and", "or", and "wherein") and/or articles (e.g., "a", "an", the "the"). In some embodiments, the claim-mapping coverage is determined by dividing the number of non-trivial words in the claim text that match the search phrases of one or more scope concepts by the total number of non-trivial words in the claim text. In other embodiments, claim-mapping coverage is computed based on non-trivial phrases in the claim, wherein mapping coverage is determined by dividing the number of non-trivial phrases in the claim text that match the search phrases of one or more scope concepts by the total number of non-trivial phrases in the claim text. In still other embodiments, claim-mapping coverage is computed based on characters in non-trivial words in the claim, wherein mapping coverage is determined by dividing the number characters in non-trivial words in the claim text that match the search phrases of one or more scope concepts by the total number of characters in non-trivial words in the claim text.

In some embodiments, the system determines claim-mapping coverage on a per scope concept basis. That is, the system determines the claim-mapping coverage of each scope concept in each claim. The claim-mapping coverage of a claim is determined by combining the claim-mapping coverage of all of the scope concepts to which the claim maps. Any given claim can map to one or a plurality of scope concepts. Determining claim-mapping coverage on per claim basis provides the user with a more detailed perspective of claims and the scope concepts to which they map.

Figure 7:
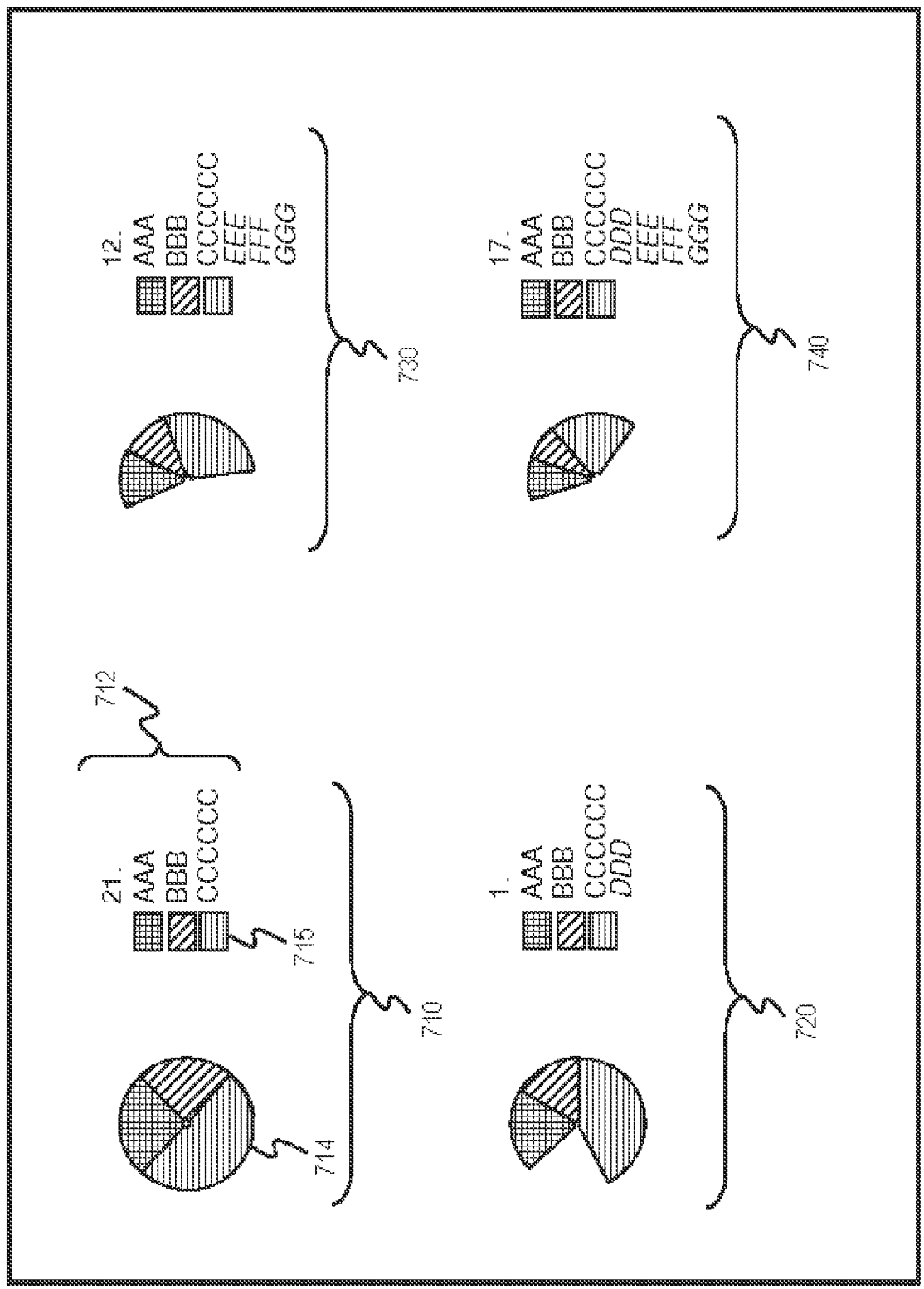
FIG. 7 is a depiction of one embodiment of a coverage-proportion map 700 of the present disclosure.

In some embodiments, the process 600 further includes generating a coverage map 612, wherein the coverage map is a visual display of the claim-mapping coverage. In some embodiments, the coverage map is displayed as a plurality of pie chart and claim text pairs, with one pie chart associated with the text of each claim in a patent, wherein each slice in the pie chart represents the mapping coverage of a single scope concept in the associated claim. (This embodiment is shown in FIG. 7 which is described in more detail below.) In other embodiments, the coverage map is displayed with other visual indications including may be other visual indication such as graying out a plurality (e.g., in some embodiments, all) of the words in the claim text mapped to any scope concept, along with all trivial text. In some embodiments, the coverage map is displayed to the user on a computer monitor (e.g., a LCD display or a projector).

FIG. 7 is a depiction of a visual display of a coverage map 700 produced in one embodiment of the present disclosure. The claim-mapping coverage data presented in the coverage map 700 is generated as described above in process 600, shown FIG. 6. In some embodiments, claim-mapping coverage is displayed for each claim (e.g., in some embodiments, as a numerical "score" of the coverage, and/or in other embodiments, as a color score red-yellow-green for various proportions of coverage)). The coverage map for a first claim 710 includes the claim text 712, and, in some embodiments, a pie chart 714 depicting the claim-mapping coverage for that claim. In the example shown in FIG. 7, the first mapped claim is claim 21. All of the text of the claim is displayed. For claim 21, a first scope concept in the claim is represented by "AAA", a second scope concept is represented by "BBB" and a third scope concept is represented by "CCC". The non-trivial claim text that has been mapped to a scope concept is indicated to the user. In one embodiment, shown in the example in FIG. 7, phrases in the claim text are displayed on individual lines, and those phrases that map to some scope concept are flagged is a visual key 715. The set of visual keys serves as the legend for interpreting the pie chart. In this example, various different line patterns (e.g., diagonal parallel lines, horizontal parallel lines, cross-hatching), commonly referred to as fill patterns, are used to differentiate the keys and associated pie slices. In some embodiments, other fill patterns are used. In other embodiments, the text is displayed in colors that correspond to colors used in the pie chart, Each slice of the pie chart 714 represents a single scope concept, wherein the size of a pie slice corresponds to the portion of the non-trivial claim text that maps to the scope concept represented by that particular pie slice. In the mapping example 710, all non-trivial claim text has been mapped to a scope concept, indicated by the circle forming the pie chart being completely filled. The example of FIG. 7 includes the claim-mapping coverage 720 is for claim 1. In this case, come non-trivial claim text, represented by "DDD", is not mapped to a scope concept, and the associated pie chart shows only about 80% claim mapping coverage. The coverage maps for claim 12 (730) and claim 17 (740) show decreasing amount of claim-mapping coverage.

FIGS. 8A, 8B and 8C are examples of a user interface displays 801, 802, and 803 for some embodiments of the present disclosure. The data presented to the user with this user interface are generated with any of the processes: process 100 shown in FIG. 1, process 200 shown in FIG. 2, process 300 shown in FIG. 3, process 403 shown in FIG. 4C, process 500 shown in FIG. 5 or process 600 shown in FIG. 6, all of which are described above. FIG. 8A shows the visual display 801 of the independent claims extracted from the text of the patent(s) loaded into the system. In some embodiments, this visual display is presented to the user on a computer monitor (e.g., a LCD display or a projector). As described above, in some embodiments of the present disclosure, the system identifies scope concept phrases, searches the claim text for the scope concept phrases and identifies the locations of the scope concept phrases in the text, 810 in the display screen 802 of FIG. 8B. In other embodiments, the system also performs claim-mapping coverage analysis and generates a visual indication of the claim-mapping coverage results, e.g., pie charts 820 in FIG. 8B. The scope concept phrase locations and claim-mapping coverage results are visually presented to the user along with the independent claim text, in the display screen 803 of FIG. 8C. In some embodiments, the scope concept phrase locations are displayed on the computer monitor by highlighting the claim text (e.g., displaying text in a different color, in a different font, or with some other visual indication). In some embodiments, the claim-mapping coverage for each claim is displayed as a pie chart near the claim text on the computer monitor. in some embodiments, claim-mapping coverage is a displayed as a stacked bar chart or other visual indication. In other embodiments, the claim-mapping coverage is displayed as a number.

FIGS. 9A, 9B and 9C are an example of a user interface display in one embodiment of the present disclosure. The three figures together represent a single display (e.g., a single computer monitor), wherein FIG. 9A is a top portion 901A of a user interface display, FIG. 9B is a middle portion 901B of a user interface, and FIG. 9C is a bottom portion 901C of a user interface display. The data presented to the user with this user interface are generated with any of the processes: process 100 shown in FIG. 1, process 200 shown in FIG. 2, process 300 shown in FIG. 3, process 403 shown in FIG. 4C, process 500 shown in FIG. 5 or process 600 shown in FIG. 6, all of which are described above. The text of the first set of claims (in this example, independent claims) is presented in a first area along the right side of the display. Scope concepts are presented in a second area of the display. In some embodiments, AGPSCs are presented in a third area of the display, labeled "STRING" in this example. In other embodiments, key phrases and/or equivalent phrases are also displayed in the third area of the display. In some embodiments, scope concepts are highlighted in the claim text, as is shown in this example in FIG. 9. In some embodiments, other information about the patent or patents may be presented including a count of the number of times a particular scope concept appears in the claims, and, in some embodiments, a list of the claim numbers in which the scope concept is found. In some embodiments, a variety of control buttons are presented on the display which allow the user to control what phrases are highlighted in the claim text, to edit the scope concepts or key phrases and to map a specific scope concepts. Detailed description of the button operation and highlighting is in FIGS. 11A and 11B described below.

The analysis of any given patent described herein (e.g., any example shown in FIGS. 9A, 9B, 9C, 10, 12, 14, or 15) is merely an example of text extraction and presentation used in some embodiments of the present disclosure, and is not meant to represent or limit the legal claim scope of any patent, nor is it intended for any use except as an example of an automated process that can be used to assist in an analysis by a competent professional patent attorney who is experienced in such matters.

Figure 10:
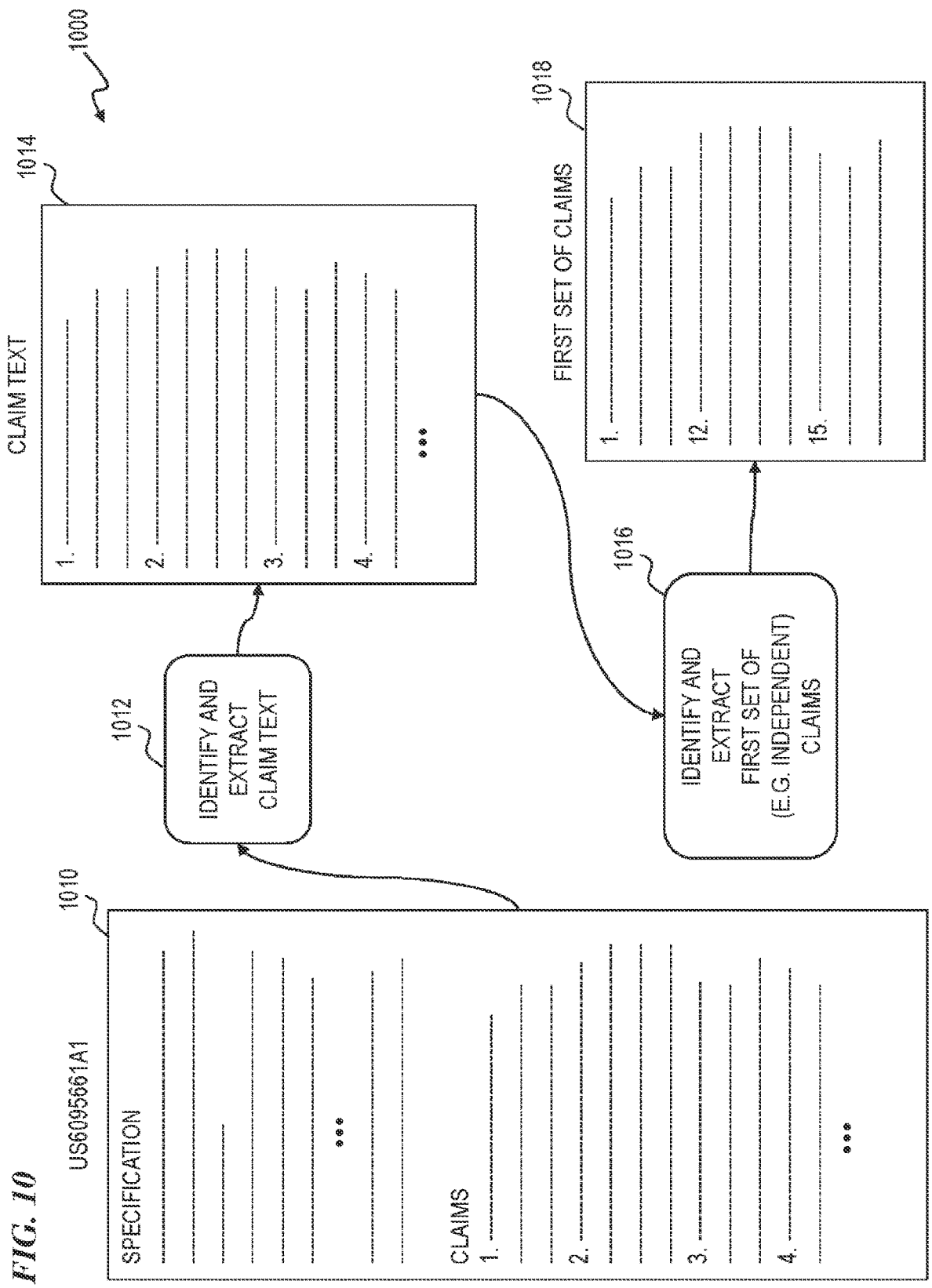
FIG. 10 is a flow chart of a process 1000 of claim identification in one embodiment of the present disclosure.

FIG. 10 is a flow chart of a computer-implemented process 1000 of claim identification in one embodiment of the present disclosure. Process 1000 includes loading the text for a patent 1010. In some embodiments, this will be an issued patent that is specified by a patent number, title text, inventor(s) or the like, while in other embodiments, this will be a pending patent application similarly specified. In some embodiments, more than one issued patent or pending patent application is specified and the text for a plurality (e.g., in some embodiments, all) of the patents or applications are loaded. In sonic embodiments, process 1000 further includes identifying and extracting 1012 claim text 1014, wherein the system semantically analyzes the text of the patent, identifies, and extracts the text of the claims from the text of the entire patent (or patents). In some embodiments, process 1000 further includes identifying and extracting 1016 a first set of claims 1018, (e.g., all of the independent claims of the patent) wherein the system semantically analyzes the text of the extracted claim text, identifies, and extracts the text of the set of claims from the entire claim text. . In some embodiments, the subprocesses of identifying and extracting 1012 claim text, and identifying and extracting 1016 a first set of claims are combined into a single subprocess.

Figure 11A:
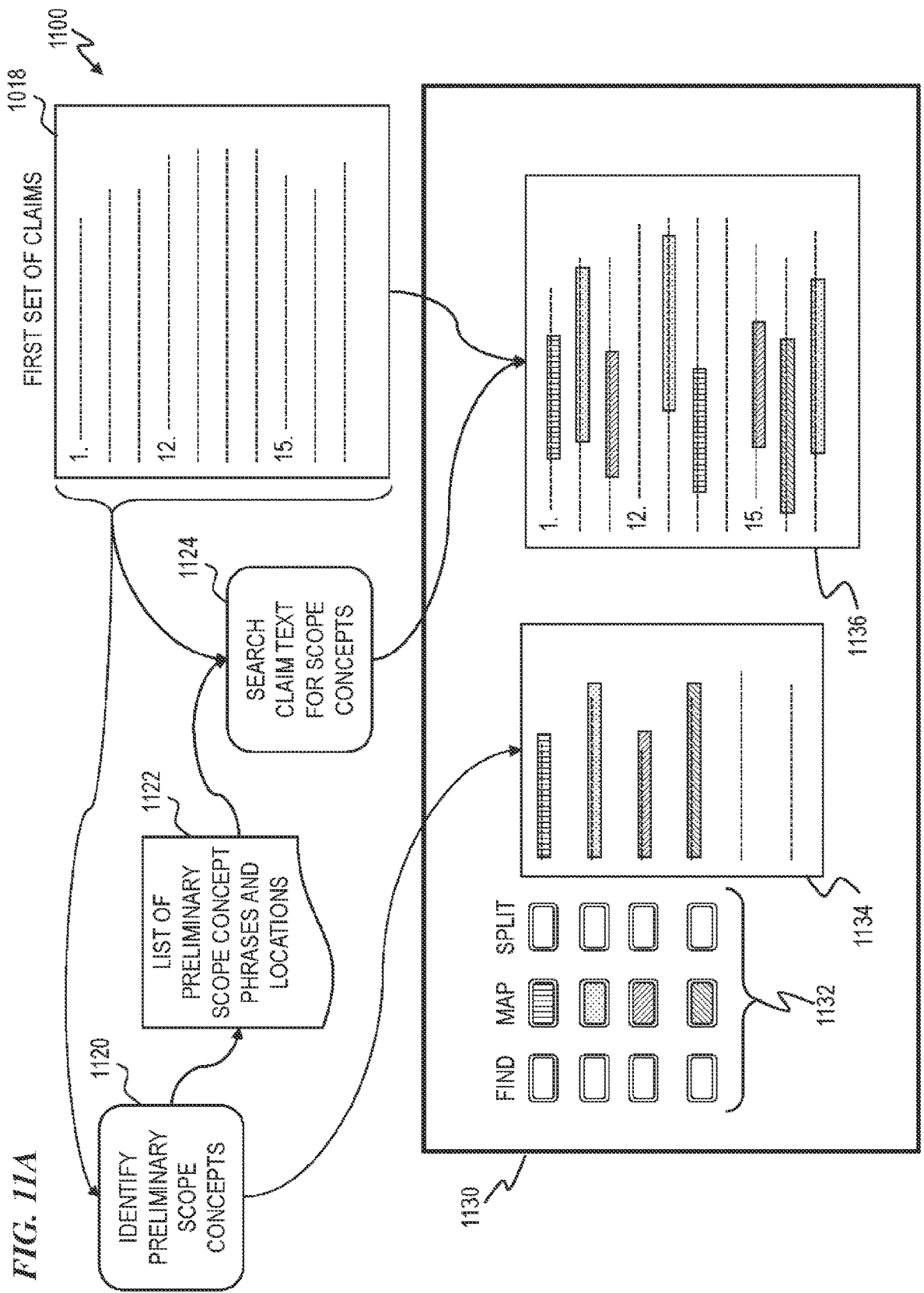
FIG. 11A is a flow chart of a process 1100 of scope concept identification in one embodiment of the present disclosure.

FIG. 11A is a flow chart of a computer-implemented process 1100 of scope concept identification in one embodiment of the present disclosure. Process 1100 includes identifying 1120 automatically generated preliminary scope concepts (AGPSCs), wherein indentifying automatically generated preliminary scope concepts includes semantically analyzing the first set of claims 1018 to identify phrases (word sequences or sentence fragments) that are likely components of a claim limitation, and generating a list of these phrases 1122. In some embodiments, process 1100 further includes presenting the list of AGPSCs to the user on a computer monitor 1130 in a first area of the display 1134. In some embodiments, process 1100 includes presenting the first set of claims to the user on a computer monitor 1130 in a second area of the display 1136. In some embodiments, process 1100 includes eliciting input from the user by displaying on the computer monitor sets of functional buttons 1132, wherein each set of buttons correlates to an AGPSC, and wherein the system receives input from the user when the user activates a button (e.g., clicking on a button with a mouse, touching a button on a touch screen, selecting the button via a keyboard, or activating a button by other means). The buttons allow the user to specify a variety of operations with the AGPSCs. In one embodiment shown in FIG. 11A, activating the "FIND" button causes the system to search the claim text 1124 for the AGPSC associated with the button and to highlight the AGPSC in the claim text 1136 on the computer monitor 1130. Activating the "MAP" button causes the system to accept the associated AGPSC as a scope concept and to highlight the scope concept in the claim text 1136 on the computer monitor 1130. In some embodiments, activating the "MAP" button further causes the system to elicit and receive input from the user specifying changes to be made to the associated scope concept (e.g., editing the text or title of the scope concept). In some embodiments, the text for each scope concept or AGPSC highlighted in the claims 1136 is highlighted differently. For example, in one embodiment, text of the first scope concept is displayed with a first color of text, while text of the second scope concept is displayed with a second color of text, and so on. In other embodiments, other text highlighting techniques are used. In one embodiment of the present disclosure in FIG. 11A, activating the "SPLIT" button causes the system to elicit and receive input from the user specifying the associated AGPSC is to be divided into one or more scope concepts.

Figure 11B:
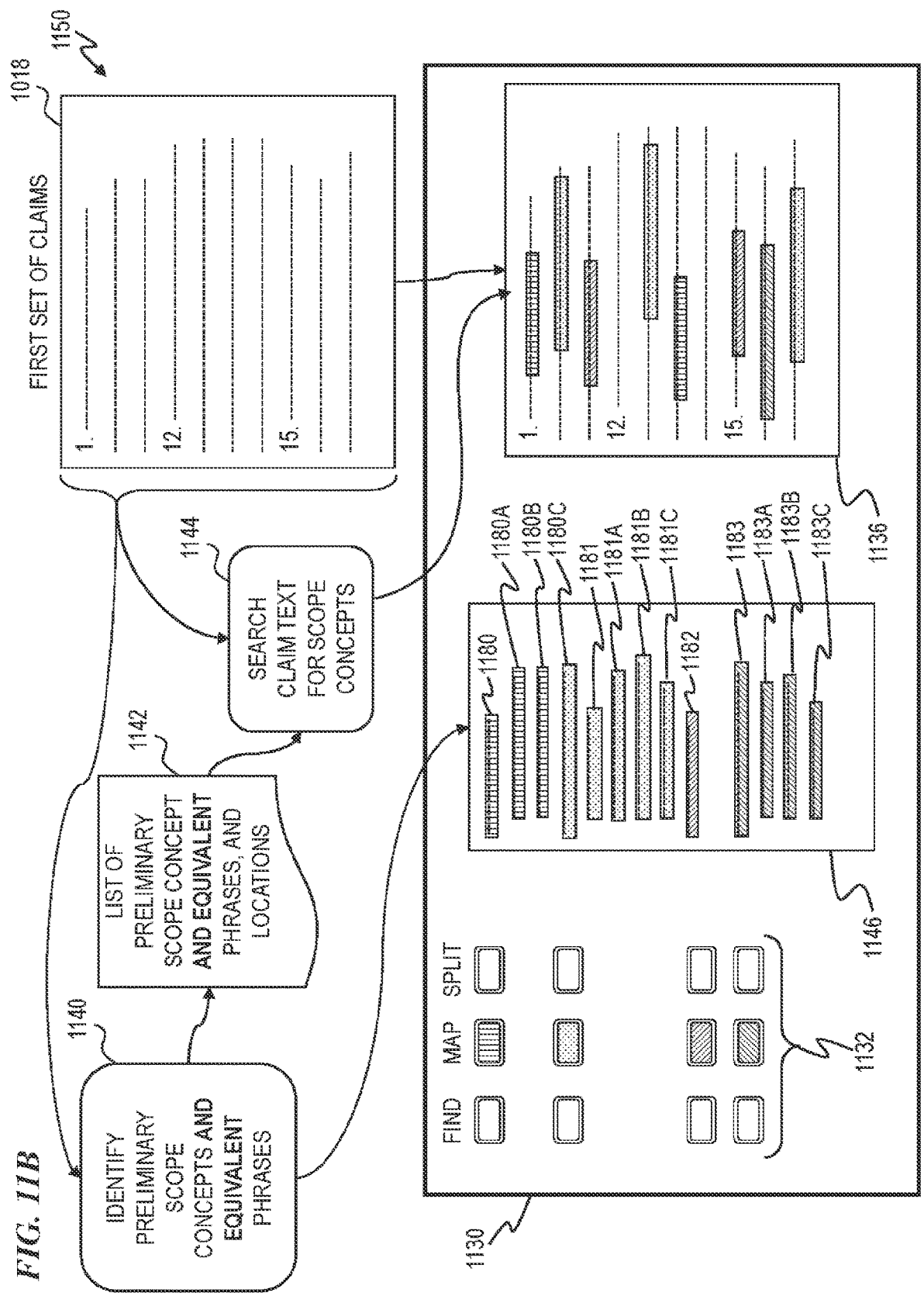
FIG. 11B is a flow chart of a process 1150 of scope concept identification in one embodiment of the present disclosure.

FIG. 11B is a flow chart of a computer-implemented process 1150 of scope concept identification in one embodiment of the present disclosure. In some embodiments, except as follows, process 1150 is similar to process 1100 described above, and includes one or more subprocesses described above for FIG. 11A but not described here for clarity of this discussion. Process 1150 includes identifying 1140 automatically generated preliminary scope concepts (AGPSCs), wherein indentifying automatically generated preliminary scope concepts includes semantically analyzing the first set of claims 1018 to identify initial phrases (word sequences or sentence fragments) that are likely components of a claim limitation, and generating a list of these phrases 1142. Process 1150 further includes identifying 1140 equivalent phrases to the AGPSCs, and generating a list of these phrases 1142, wherein the equivalent phrases include different words but that have substantially the same meanings as phrases in the initial list. In some embodiments, process 1150 further includes presenting the list of AGPSCs and equivalent phrases to the user on a computer monitor 1130 in a first area of the display 1146. In some embodiments, activating the "MAP" button further causes the system to elicit and receive input from the user specifying which equivalent phrases are to be ignored, and specifying changes to be made to the scope concept or equivalent phrases (e.g., editing the text, or editing the title of the scope concept). In some embodiments, the text of the scope concepts and equivalent phrase are highlighted in displayed claim text 1136.

Figure 11C:
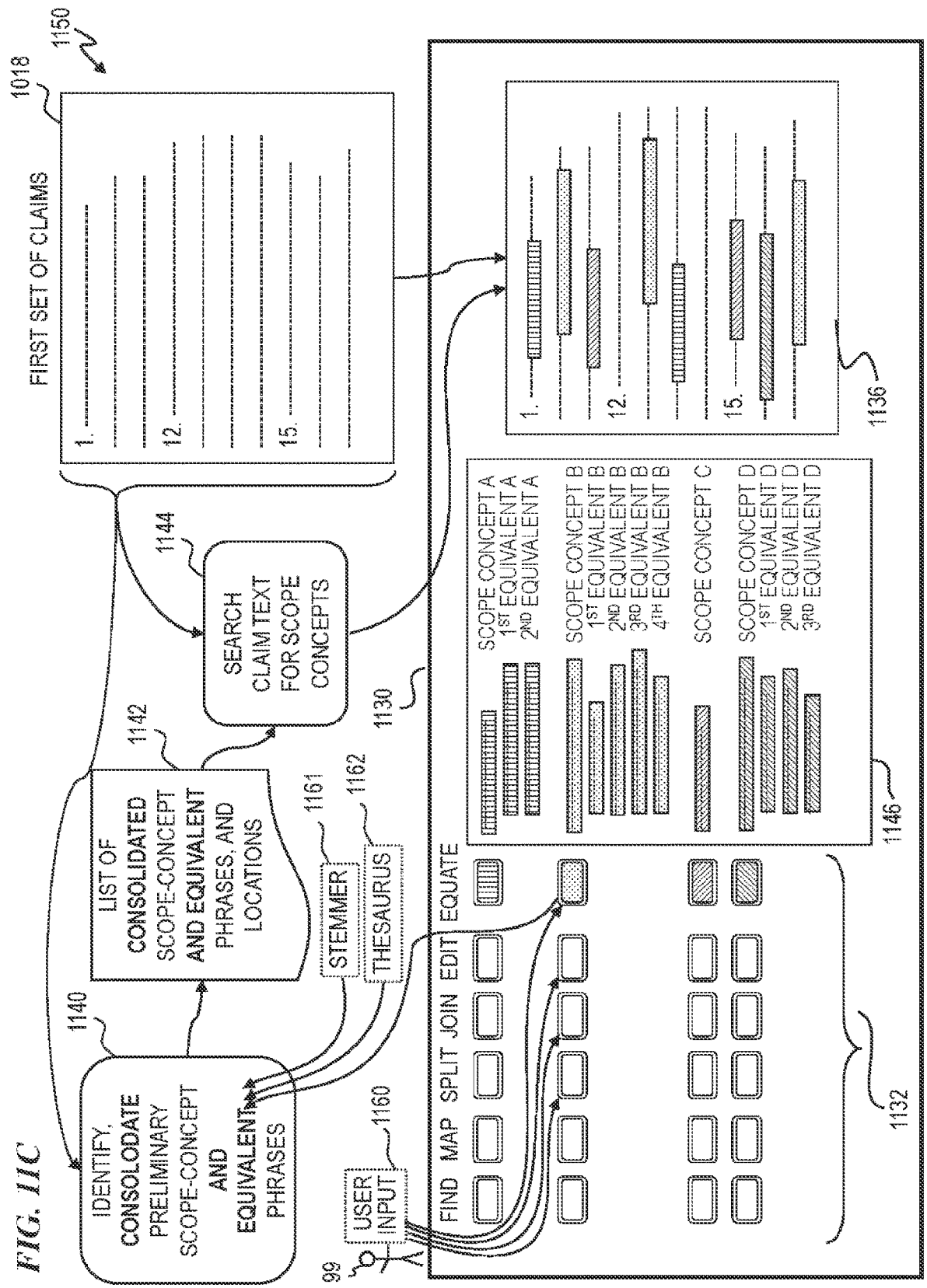
FIG. 11C is a flow chart of a process 1150 of scope concept identification in one embodiment of the present disclosure.

FIG. 11C is a flow chart of a computer-implemented process 1150 of scope concept identification in one embodiment of the present disclosure. In some embodiments, except as follows, process 1150 includes one or more subprocesses described above for FIG. 11B but not repeated here for clarity of this discussion. Process 1150 further includes identifying 1140 equivalent phrases to the AGPSCs, and generating a list of these phrases 1142, wherein the equivalent phrases include different words but that have substantially the same meanings as phrases in the initial list. In some embodiments, a word stemmer 1161 is used to identify equivalent words and phrases, where a word stemmer identifies the base or root of a word. An example of a simple stemming algorithm is the removal of suffixes or "suffix stripping." Words are considered the same it their roots are the same, independent of any suffix used (e.g., "evaluates" is considered by the software process to be the same as "evaluated"). In some embodiments, one or a plurality of more-complex stemming algorithms are used. In some embodiments, one or a plurality of thesauri 1162 are used to identify equivalent words and phrases. The thesauri can include standard language thesauri as well as specialized thesauri for technical terminology or other jargon. In some embodiments, process 1150 further includes presenting the list of AGPSCs and equivalent phrases to the user on a computer monitor 1130 in a first area of the display 1146. In some embodiments, activating the "MAP" button further causes the system to elicit and receive input 1160 from the user specifying which equivalent phrases are to be ignored. In some embodiments, activating the "SPLIT" button further causes the system to separate a single AGPSC into two smaller AGPSCs. In some embodiments, activating the "JOIN" button further causes the system to combine two or more individual AGPSCs into a single AGPSC. In some embodiments, activating the "EDIT" button further causes the system elicit and receive input from the user specifying changes to be made to the scope concept or equivalent phrases (e.g., editing the text, or editing the title of the scope concept). In some embodiments, activating the "EQUATE" button further causes the system to treat two or more different AGPSCs having different wordings as a single scope concept. In some embodiments, the text of the scope concepts and equivalent phrase are highlighted in displayed claim text 1136.

FIG. 12 is an example of a final claim map that is generated with any of the processes: process 100 shown in FIG. 1, process 200 shown in FIG. 2, process 300 shown in FIG. 3, process 401 shown in FIG. 4A, process 402 shown in FIG. 4B, process 403 shown in FIG. 4C, or process 500 shown in FIG. 5, all of which are described above. Scope concepts are listed in the first column of the claim map. Patent information is presented in multiple columns, with one column for each claim. In some embodiments, as shown in this example, only independent claims are included. The example claim map in FIG. 12 includes a first patent with 8 independent claims, and a second patent with 3 independent claims. In some embodiments, 3 or more patents are included. The cell at the intersection of a scope concept row and a claim column is highlighted if the claim identified in a particular column maps to the scope concept identified in that row. In this example, the first scope concept listed is "LED HOUSING". The claim map shows that claims 1, 12, 21, 31 and 34 of the first patent map to this scope concept, and claims 1, and of the second patent map to this scope concept. Similarly, in this example, claims 12, 26 and 30 of the first patent and no claims of the second patent map to the scope concept "BATTERY POWER". In some embodiments, the claim map further includes a maintenance fee schedule which identifies future maintenance fee payments due for each patent, and includes for each payment a due date, an amount, and a receiving body (e.g., USA, PCT, or other specific country). In this example, maintenance tees due are shown in the bottom two rows of the claim map. In sonic embodiments, 3 or more maintenance fees are presented.

Figure 13:
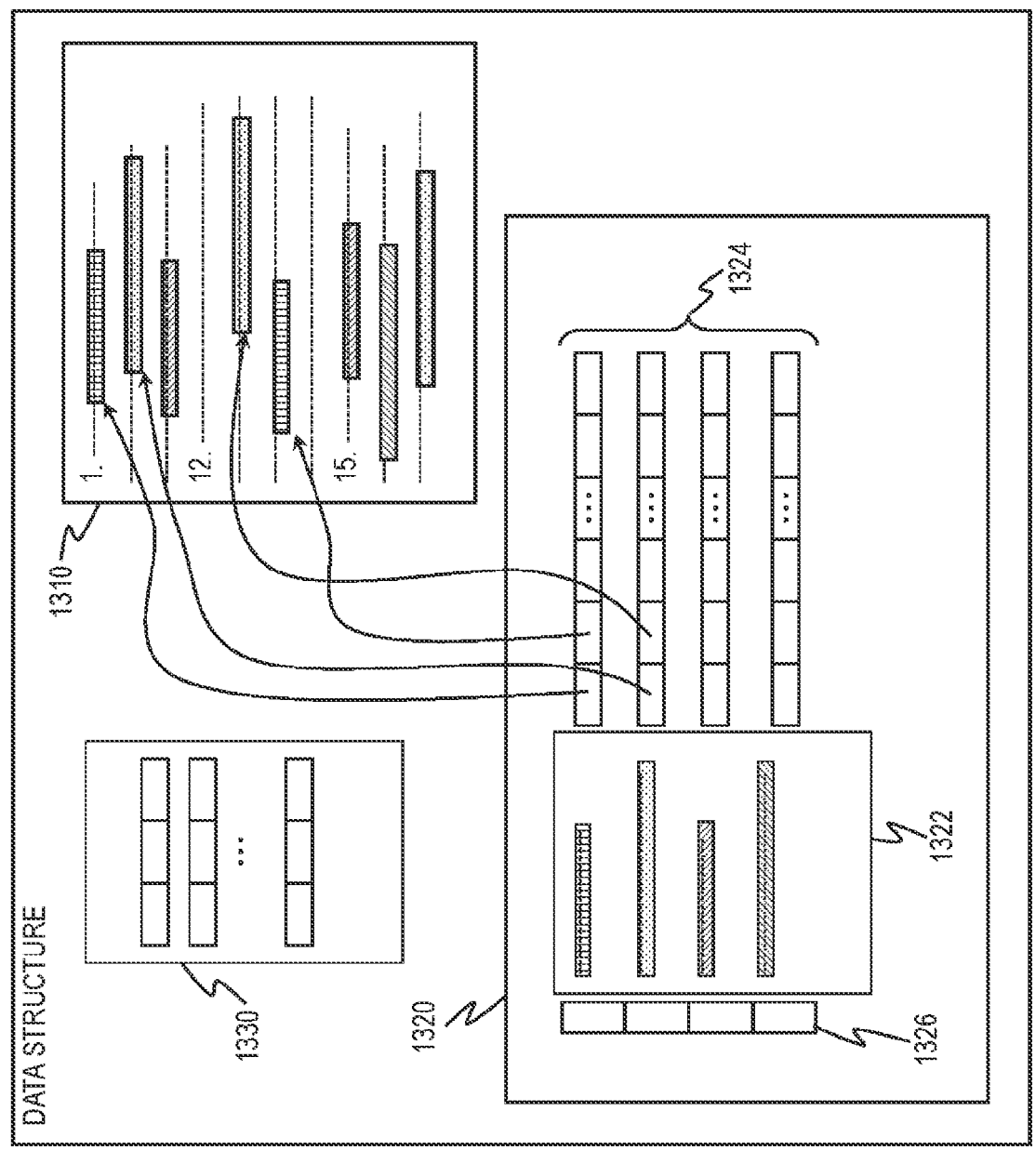
FIG. 13 is a diagram of a data structure 1300 in one embodiment of the present disclosure.

FIG. 13 is a diagram of a data structure 1300 used by the computer system in some embodiments of the present disclosure. The data structure 1300 includes in some embodiments a substructure 1310 which contains the text of the claims of a patent or patent application. In some embodiments, the text of a plurality (e.g., in some embodiments, all) of the claims in the patent is included. In other embodiments, only the text of a first set of claims (e.g., independent claims) is included. In some embodiments, the data structure further includes a claim map substructure 1320 which includes a list of scope concepts 1322. In some embodiments, the list of scope concepts includes final scope concepts. In other embodiments, the list of scope concepts includes AGPSC, key phrases, and/or equivalent phrases. In sonic embodiments, the claim map substructure 1320 further includes a list of position mappings between the scope concepts list 1322 and the claim text 1310. For each item (e.g., scope concept, key phrase, AGPSC or equivalent phrase) in the scope concept list 1322, the position mapping list includes references (e.g., storage address, offset, or other such identifying means) into the claim text structure 1310 for each occurrence of the item in the text, wherein the reference identifies the position of the item in the claim text, and wherein the reference, in some embodiments, further includes a length of the item. In some embodiments, the claim map substructure further includes a list of display flags 1326, wherein there is one display flag for each item in the scope concept list, and wherein the display flag indicates to the system if the text associated with the scope concept list item is to be highlighted on the user's computer monitor. In some embodiments, data structure 1300 further includes a maintenance-fee-schedule substructure 1330, which identifies future maintenance fee payments due for the patent, and for each payment includes a due date, an amount, and a receiving body (where the payment is to be made, e.g, US, PCT, or other specific country).

FIG. 14 is a flow chart of a computer-implemented process 1400 of one embodiment of the present disclosure. In some embodiments, except as follows, process 1400 is similar to processes 100, 200, 300, 401, 402, 403, and 500 described above, and includes one or more subprocesses described above for FIGS. 1-5, but not shown here for clarity of this discussion. In some embodiments, process includes eliciting and receiving indicia from a user that specifies a patent (in some embodiments, this will be an issued patent that is specified by a patent number, title text, inventor(s) or the like, while in other embodiments, this will be a pending patent application similarly specified), obtaining some or all text of the specified patent document (e.g., via downloading the text of the patent from a patent office website or the like), and loading claim text extracted from the text of the patent document (e.g., identifying the claim text of the patent using tags in the text, or the like). In some embodiments, 2 or more patents are specified.

FIG. 15 is a flow chart of a computer-implemented process 1500 of one embodiment of the present disclosure. In some embodiments, except as follows, process 1400 is similar to processes 100, 200, 300, 401, 402, 403, and 500 described above, and includes one or more subprocesses described above for FIGS. 1-5, but not shown here for clarity of this discussion. In some embodiments, process 1500 includes loading claim text shown in process 1400 and further includes semantically analyzing the claim text to identify and extract the independent claims from full claim text.

Finding Phrases Common to A Plurality of Claims

In some embodiments of each of the processes set forth herein, the present disclosure finds phrases that are the same in each of a plurality of claims by doing a word-by-word claim comparison between sets of claims (for example, between a plurality (e.g., in some embodiments, all) of the possible pairs, or between three or more claims as a set) (in much the same way as word-processing programs, such as Microsoft's WORD®, use when performing document comparison operations of two documents) to identify strings of words that occur in a plurality (e.g., in some embodiments, all) of the claims of each set of claims.

In other embodiments of each of the processes set forth herein, the present method and apparatus use concepts, such as automatically identifying key topics and phrases in a documents text, as described in U.S. Pat. No. 5,963,205 to Sotomayor issued Oct. 5, 1999 titled "Automatic index creation for a word processor", which is incorporated herein by reference. Those claims that contain each of the key phrases are then identified in order to find phrases that occur in two or more claims.

In some embodiments, the present disclosure provides a computer-implemented method that includes obtaining, into a computer, text of a first patent; automatically finding and extracting, using the computer, claim text from the text of the first patent; identifying, using the computer, text of a first plurality of claims from the set of claim text of the first patent; displaying in a first area on a computer monitor the text of the first plurality of claims; automatically generating, from the first plurality of claims, text of a plurality of preliminary scope-concept phrases derived from the first plurality of claims, wherein the plurality of preliminary scope-concept phrases includes a first preliminary scope-concept phrase and a second. preliminary scope-concept phrase; displaying in a second area on the computer monitor the text of at least the first and second preliminary scope-concept phrases from the first plurality of claims; eliciting and receiving user input to select a first specified one of the displayed preliminary scope-concepts phrases; and highlighting each occurrence of the first specified one of the displayed preliminary scope-concept phrases in a plurality (e.g., in some embodiments, all) of the of the first plurality of claims displayed in the first row that contain the first specified one of the plurality of preliminary scope-concept phrases.

In some embodiments of the method, the first area and the second area are each vertical rows, and the method further includes eliciting and receiving user input to modify the first one of the displayed plurality of preliminary scope-concepts phrases to generate text of a modified first scope-concept; and highlighting each occurrence of the text of the modified first scope-concept in a plurality (e.g., in some embodiments, all) of the first plurality of claims displayed in the first area.

In some embodiments of the method, the first area and the second area are each vertical rows, and the method further includes eliciting and receiving user input to shorten the first one of the displayed plurality of preliminary scope-concepts phrases to generate text of a shortened first scope-concept; and highlighting each occurrence of the text of the shortened first scope-concept in a plurality (e.g., in some embodiments, all) of the first plurality of claims displayed in the first area.

In some embodiments of the method, the first area and the second area are each vertical rows, and the method further includes eliciting and receiving user input to specify a first equivalent scope concept, wherein the first equivalent scope concept is associated with a first set of scope concepts having text of more than one of the plurality of preliminary scope-concepts phrases; and highlighting each occurrence of the text of the first set of scope concepts in a plurality (e.g., in some embodiments, all) of the first plurality of claims displayed in the first area.

In some embodiments of the method, the first area and the second area are each vertical rows, and the method further includes eliciting and receiving user input to specify at least two of the plurality of preliminary scope-concepts phrases as being equivalent scope-concept phrases; and highlighting each occurrence of each of the equivalent scope-concept phrases in a plurality (e.g., in some embodiments, all) of the first plurality of claims displayed in the first area.

In some embodiments of the method, the generating of the plurality of preliminary scope-concept phrases further includes automatically generating, using the computer, a plurality of sets of equivalent search phrases including a first set and a second set, wherein equivalent search phrases in the first set each have different wordings but meanings that are substantially equivalent to the first preliminary scope-concept phrase, wherein equivalent search phrases in the second set each have different wordings but meanings that are substantially equivalent to the second preliminary scope-concept phrase; and highlighting, in the first plurality of claims displayed in the first row, each occurrence of the equivalent search phrases in the first set and the second set of equivalent search phrases.

In some embodiments of the method, the automatically generating of the plurality of sets of search phrases further includes eliciting and receiving user input to distinguish which of the automatically generated equivalent search phrases are to be highlighted when highlighting claims equivalent search phrases in the first plurality of claims displayed in the first row versus those that are to be ignored when highlighting equivalent search phrases in the first plurality of claims displayed in the first row.

Some embodiments of the method further include identifying the maintenance fee schedule for the first patent, wherein the maintenance fee schedule includes at least the next maintenance fee payment due for the first patent; and displaying on the computer monitor the maintenance fee schedule.

In some embodiments of the method, the automatically generating of the first preliminary scope-concept phrase includes selecting a first contiguous string of words that exists in each of a plurality of the first plurality of claims of the first patent, and wherein the automatically generating the second preliminary scope-concept phrase includes selecting a second contiguous string of words that exists in each of a plurality of the first plurality of claims of the first patent.

In some embodiments of the method, the computer-implemented method further includes automatically determining a first subset of the text of the first plurality of claims that is to be considered trivial text and a second remaining subset that is to be considered non-trivial text; eliciting and receiving user input to specify at least two of the plurality of preliminary scope-concepts phrases as being mapped scope-concept phrases; evaluating how much of the non-trivial text has been covered by each one of the mapped scope-concept phrases; and displaying a graphical representation of how much of the non-trivial text has been covered by each one of the mapped scope-concept phrases.

Some embodiments of the method further include generating a data structure having a scope-concept map from the specified mapped scope-concept phrases; and displaying the scope concept map on the computer monitor.

Some embodiments of the method further include eliciting and receiving user input to specify a second one of the displayed plurality of preliminary scope-concepts phrases; and highlighting each occurrence of the specified second one of the plurality of preliminary scope-concept phrases in each of the first plurality of claims displayed in the first area that contains the specified second one of the plurality of preliminary scope-concept phrases, wherein a visual appearance of the highlighting of the second one of the plurality of preliminary scope-concept phrases is different than a visual appearance of the highlighting of the first one of the plurality of preliminary scope-concept phrases.

In some embodiments of the method, the generating of the plurality of preliminary scope-concept phrases further includes: processing word-by-word through a first selected claim, and for a first selected word in the first claim identifying a plurality of other claims having that first selected word (thus identifying a first one-word preliminary scope-concept phrase), for a second selected word in the first claim identifying a plurality of other claims having that second selected word, thus identifying a second one-word preliminary scope-concept phrase, and repeating this process for a plurality of words in the first selected claim; processing word-by-word through the first selected claim, and for a first selected two-word sequence of words consisting of the first selected word and the second selected word of the first selected claim, identifying a plurality of other claims having that first selected two-word sequence (thus identifying a first two-word preliminary scope-concept phrase), for a second two-word sequence of words consisting of the second selected word and a third selected word of the first claim, identifying a plurality of other claims having that second two-word sequence, thus identifying a second two-word preliminary scope-concept phrase, and repeating this process for a plurality of two-word sequences of words in the first selected claim; processing word-by-word through the first selected claim for selected three-word sequences of words. In some embodiments, this process is repeated for up to N-word sequences of words, until no other claims contain any of the N-word sequences from the first claim. In some embodiments, this process is repeated starting with a second claim, for one-word, two-word, through N-word sequences, identifying one-word preliminary scope-concept phrases, two-word preliminary scope-concept phrases, through N-word preliminary scope-concept phrases, and further repeated for a third claim, a fourth claim and a plurality of other claims in the patent.

Some embodiments further include eliciting and receiving user input that specifies at least two of the plurality of preliminary scope-concepts phrases as being mapped scope-concept phrases; eliciting and receiving user input that specifies one or more modifications to the text of the mapped scope-concept phrases; eliciting and receiving user input that includes a hypothetical set of one or more claims for a target product or technology, wherein the hypothetical set of claims is generated based on a human-user examination of the product or technology, and human-user awareness of mapped scope-concept phrases; identifying a plurality of the mapped scope-concept phrases that are in the hypothetical claims; and displaying to the user the mapped scope-concept phrases that are in the hypothetical claims.

In some embodiments, the present disclosure provides an apparatus that includes a computer; a storage unit operatively coupled to the computer, wherein the storage unit has text of a first patent; a location-and-extraction unit in the computer that finds and extracts claim text from the text of the first patent, and places the extracted set of claim text of the first patent into the storage unit; a first-claim-identifier unit in the computer that identifies text a first plurality of claims from the claim text of the first patent; an automatic preliminary scope-concept-phrase locator in the computer that locates, from the first plurality of claims, a plurality of preliminary scope-concept phrases including a first preliminary scope-concept phrase and a second preliminary scope-concept phrase; a user input device operatively coupled to the computer and to elicit and receive a specification of a first one of the plurality of preliminary scope-concepts phrases; and a display unit operatively coupled to the computer and to display in a first area on a computer monitor the text of the first plurality of claims, and to display in a second area on the computer monitor the text of the plurality of preliminary scope-concept phrases from the first plurality of claims , and to highlight each occurrence of the specified first one of the plurality of preliminary scope-concept phrases in a plurality (e.g., in some embodiments, all) of the of the first plurality of claims displayed in the first area.

In some embodiments of the apparatus, the first area and the second area are each vertical rows; the user input device is also to elicit and receive user input to modify the first one of the displayed plurality of preliminary scope-concepts phrases to generate text of a modified first scope-concept; and the display unit is also to highlight each occurrence of the text of the modified first scope-concept in a plurality (e.g., in some embodiments, all) of the first plurality of claims displayed in the first area.

In some embodiments of the apparatus, the automatic preliminary scope-concept-phrase locator is further to automatically generate a plurality of sets of equivalent search phrases including a first set and a second set, wherein equivalent search phrases in the first set each have different wordings but meanings that are substantially equivalent to the first preliminary scope-concept phrase, wherein equivalent search phrases in the second set each have different wordings but meanings that are substantially equivalent, to the second preliminary scope-concept phrase; and the display unit is also to highlight, in the first plurality of claims displayed in the first row, each occurrence of the equivalent search phrases in the first set and the second set of equivalent search phrases.

In some embodiments of the apparatus, the user input device is also to elicit and receive user input to distinguish which of the automatically generated equivalent search phrases are to be highlighted when highlighting claims equivalent search phrases in the first plurality of claims displayed in the first row versus those that are to be ignored when highlighting equivalent search phrases in the first plurality of claims displayed in the first row.

In some embodiments of the apparatus, the apparatus further includes a maintenance fee schedule identifier that identifies the maintenance fee schedule for the first patent, wherein the maintenance fee schedule includes at least the next maintenance fee payment due for the first patent; and the display unit is also to display the maintenance fee schedule.

In some embodiments of the apparatus, the user-input device further elicits and receives user input to specify at least two of the plurality of preliminary scope-concepts phrases as being mapped scope-concept phrases, and the apparatus further includes non-triviality unit that automatically determines a first subset of the text of the first plurality of claims that is to be considered trivial text and a second. remaining subset that is to be considered non-trivial text; a map unit that generates a data structure having a scope-concept map from the specified mapped scope-concept phrases; and an evaluation unit that evaluates how much of the non-trivial text has been covered by each one of the mapped scope-concept phrases, wherein the display unit displays a graphical representation of how much of the non-trivial text has been covered by each one of the mapped scope-concept phrases, and wherein the display unit displays the scope concept map on the computer monitor.

In some embodiments of the apparatus, the user input device is also to elicit and receive user input to specify a second one of the displayed plurality of preliminary scope-concepts phrases; and the display unit is also to highlight each occurrence of the specified second one of the plurality of preliminary scope-concept phrases in each of the first plurality of claims displayed in the first area that contains the specified second one of the plurality of preliminary scope-concept phrases, wherein a visual appearance of the highlight of the second one of the plurality of preliminary scope-concept phrases is different than a visual appearance of the highlight of the first one of the plurality of preliminary scope-concept phrases.

In some embodiments of the apparatus, the scope-concept-phrase locator further includes: a first word-by-word processor that processes through a first selected claim, and for a first selected word in the first selected claim identifies a plurality of other claims that have that first selected word, thus identifies a first one-word preliminary scope-concept phrase, then for a second selected word in the first selected claim identifies a plurality of other claims that have that second selected word, thus identifies a second one-word preliminary scope-concept phrase, wherein the first word-by-word processor repeats such process for each of a plurality of words in the first selected claim; a second word-by-word processor that processes through the first selected claim, and for a first selected two-word sequence of words that consists of the first selected word and the second selected word of the first selected claim, identifies a plurality of other claims that have that first selected two-word sequence, thus identifies a first two-word preliminary scope-concept phrase, then for a second two-word sequence of words that consists of the second selected word and a third selected word of the first claim, identifies a plurality of other claims having that second two-word sequence, and thus identifies a second two-word preliminary scope-concept phrase, wherein the second word-by-word processor repeats such process for a plurality of two-word sequences of words in the first selected claim; and a third word-by-word processor that processes through the first claim for three-word sequences of words to generate three-word scope concepts; wherein the scope-concept-phrase locator invokes the first word-by-word processor, the second word-by-word processor, and the third word-by-word processor for a second selected claim relative to a plurality of other claims in the patent. In some embodiments, the word-by-word processors are invoked to find longer and longer word sequences until the word sequences are not found in other claims. In some embodiments, the word-by-word processors are invoked to find a plurality of occurrences of a word sequence in a single claim.

In some embodiments of the apparatus, the user input device is further to elicit and receive user input that specifies at least two of the plurality of preliminary scope-concepts phrases to be mapped scope-concept phrases; the user input device is further to elicit and receive user input that specifies one or more modifications to the text of the mapped scope-concept phrases; the user input device is further to elicit and receive user input that includes a hypothetical set of one or more claims for a target product or technology, wherein the hypothetical set of claims is generated based on a human-user examination of the product or technology, and human-user awareness of mapped scope-concept phrases; the automatic preliminary scope-concept-phrase locator is to locate a plurality of the mapped scope-concept phrases that are in the hypothetical claims; and the display unit is to display the mapped scope-concept phrases that are in the hypothetical claims.

In some embodiments, the present disclosure provides an apparatus that includes a computer; a storage unit operatively coupled to the computer; means for obtaining, into a computer, text of a first patent; means for automatically finding and extracting, using the computer, claim text from the text of the first patent; means for identifying, using the computer, text of a first plurality of claims from the set of claim text of the first patent; means for displaying in a first area on a computer monitor the text of the first plurality of claims; means for automatically determining, from the first plurality of claims, text of a plurality of preliminary scope-concept phrases including a first preliminary scope-concept phrase and a second preliminary scope-concept phrase; means for displaying in a second. area on the computer monitor the text of the plurality of preliminary scope-concept phrases from the first plurality of claims; means for eliciting and receiving user input to specify a first one of the displayed plurality of preliminary scope-concepts phrases; and means for highlighting each occurrence of the specified first one of the plurality of preliminary scope-concept phrases in a plurality (e.g., in some embodiments, all) of the first plurality of claims displayed in the first row that contain the specified first one of the plurality of preliminary scope-concept phrases.

In some embodiments, the present disclosure provides a non-transitory computer-readable medium having instructions stored thereon that when executed on a suitably programmed computer cause the computer to perform a method that includes obtaining, into a computer, text of a first patent; automatically finding and extracting, using the computer, claim text from the text of the first patent; identifying, using the computer, text of a first plurality of claims from the set of claim text of the first patent; displaying in a first area on a computer monitor the text of the first plurality of claims; automatically determining, from the first plurality of claims, text of a plurality of preliminary scope-concept phrases including a first preliminary scope-concept phrase and a second preliminary scope-concept phrase; displaying in a second area on the computer monitor the text of the plurality of preliminary scope-concept phrases from the first plurality of claims; eliciting and receiving user input to specify a first one of the displayed plurality of preliminary scope-concepts phrases; and highlighting each occurrence of the specified first one of the plurality of preliminary scope-concept phrases in a plurality (e.g., in some embodiments, all) of the first plurality of claims displayed in the first row that contain the specified first one of the plurality of preliminary scope-concept phrases.

In some embodiments, the present disclosure provides a non-transitory computer-readable medium having a data structure stored thereon, wherein the data structure includes claim text of a first plurality of claims from a first patent; and a first claim-map data substructure that specifies text of a plurality of preliminary scope-concept phrases including a first preliminary scope-concept phrase and a second preliminary scope-concept phrase, and that specifies first locations in the first plurality of claims at which the first preliminary scope-concept phrase occurs and locations in the first plurality of claims at which the second preliminary scope-concept phrase occurs; and a highlighting data substructure that identifies for a computer which of the first preliminary scope-concept phrase and the second preliminary scope-concept phrase to selectively highlight in a display the first plurality of claims.

In some embodiments, the data structure further includes data identifying a first fee amount for the first patent and a first due date for the first payment amount.

In some embodiments, the data structure further includes claim text of a second plurality of claims from a second patent; a second claim-map data substructure that specifies locations in the second plurality of claims at which the first preliminary scope-concept phrase occurs and locations in the second plurality of claims at which the second preliminary scope-concept phrase occurs, wherein the highlighting data substructure also identifies for the computer which of the first preliminary scope-concept phrase and the second preliminary scope-concept phrase to selectively highlight in a display the second plurality of claims; and data identifying a second fee amount for the second patent and a second due date for the first payment amount.

In some embodiments, the non-transitory computer-readable medium further includes instructions stored thereon that when executed on a suitably programmed information processor perform a method that includes obtaining, into a computer, text of a first patent; automatically finding and extracting, using the computer, claim text from the text of the first patent; identifying, using the computer, text of a first plurality of claims from the set of claim text of the first patent; displaying in a first area on a computer monitor the text of the first plurality of claims; automatically generating, from the first plurality of claims, text of a plurality of preliminary scope-concept phrases derived from the first plurality of claims, wherein the plurality of preliminary scope-concept phrases includes a first preliminary scope-concept phrase and a second preliminary scope-concept phrase; displaying in a second area on the computer monitor the text of at least the first and second preliminary scope-concept phrases from the first plurality of claims; eliciting and receiving user input to select a first specified one of the displayed preliminary scope-concepts phrases; highlighting each occurrence of the first specified one of the displayed preliminary scope-concept phrases in a plurality (e.g., in some embodiments, all) of the first plurality of claims displayed in the first row that contain the first specified one of the plurality of preliminary scope-concept phrases; wherein the automatically generating the first preliminary scope-concept phrase includes selecting a first contiguous string of words that exists in each of a plurality of the first plurality of claims of the first patent, and wherein the automatically generating the second preliminary scope-concept phrase includes selecting a second contiguous string of words that exists in each of a plurality of the first plurality of claims of the first patent; automatically determining a first subset of the text of the first plurality of claims that is to be considered trivial text and a second remaining subset that is to be considered non-trivial text; eliciting and receiving user input to specify at least two of the plurality of preliminary scope-concepts phrases as being mapped scope-concept phrases; evaluating how much of the non-trivial text has been covered by the mapped scope-concept phrases; displaying a graphical representation of how much of the non-trivial text has been covered by each one of the mapped scope-concept phrases; generating a data structure having a scope-concept map from the specified mapped scope-concept phrases; and displaying the scope concept map on the computer monitor.

In some embodiments, scope concepts are automatically identified by going word-by-word through a first claim, and for a first word in the first claim identifying a plurality (e.g., in some embodiments, all) of the other claims having that first word (thus identifying a first one-word scope concept), then for a second word in the first claim, identifying a plurality (e.g., in some embodiments, all) of the other claims having that second word (thus identifying a second one-word scope concept), and repeating this process for a plurality (e.g., in some embodiments, all) of the words in the first claim. In some embodiments, scope concepts are further automatically identified by going word-by-word through the first claim, and for a first two-word sequence of words consisting of the first word and the second word of the first claim, identifying a plurality (e.g., in some embodiments, all) of the other claims having that first two-word sequence (thus identifying a first two-word scope concept), for a second two-word sequence of words consisting of the second and a third word of the first claim, identifying a plurality (e.g., in some embodiments, all) of the other claims having that second two-word sequence (thus identifying a second two-word scope concept), and repeating this process for a plurality (e.g., in some embodiments, all) of the two-word sequences of words in the first claim. In sonic embodiments, scope concepts are further automatically identified by going word-by-word through the first claim repeating the above process for three-word sequences of words, four-word sequences of words, increasing to N-word sequences of words, where no other claims contain any of the N-word sequences from the first claim. In some embodiments, scope concepts are further automatically identified by repeating the above process starting with a second claim, for one-word, two-word, through N-word sequences, identifying one-word scope concepts, two-word scope concepts, through N-word scope concepts, and further repeating the process for a third claim, a fourth claim and a plurality (e.g., in some embodiments, all) of the other claims in the patent.

As used herein, a "sequence" of words in a claim means a plurality of words found in one claim whether or not in a given order, and whether or not there are other intervening words. For example, the four-word sequence of words "transistor; source; gate; drain" would match "one or more transistors each having a metallic source, a drain and a gate" (note that in this case, the word transistor versus transistors), and would match "source, gate, and drain of the field-effect transistor" but would not match "FET with source, gate and drain" nor "transistor with source, input node and drain". As used herein, a "sequence" of concepts in a claim means a plurality of words or their equivalents found in one claim whether or not in a given order, and whether or not there are other intervening words. For example, the four-word sequence of concepts "transistor; source; gate; drain" would match "transistor having a metallic source, a drain and a gate" and would match "source, gate, and drain of the field-effect transistor" and would match "FET with source, gate and drain" and would match "transistor with source, input node and drain".

In some embodiments, the software system, having automatically selected a series having a plurality of words from one claim in a patent or patent application, then scans the rest of that claim and or the other claims of one or more patents or patent applications to identify and display the other claims having those words in a sequential-word-series phrase (as used herein, defined as the same words next to one another in the same order), or a contiguous-word phrase (defined as the same words immediately adjacent one another in any order), or nearby-word phrase (defined as the same words nearly adjacent one another in any order but with N=one or more other words interspersed (a user-specified value for the number of other words that may be within a group of words containing the words specified for the given scope concept)), where the other claims are displayed with the identified scope concept phrase being highlighted (e.g., by font, bold, size, color, highlighting or other emphasis or de-emphasis).

In some embodiments, rather than searching for identical words or word-stem phrases, the software system of the present disclosure identifies similar or equivalent words (e.g., transistor, FET, MOSFET, CMOS and the like may be determined to be equivalent concepts for some purposes), and searches the set of claims of one or more patents or patent applications to identify and display the other claims having those words in a sequential-concept-series phrase (defined as the equivalent words or concepts next to one another in the same order), or a contiguous-concept phrase (defined as the equivalent words or concepts adjacent one another in any order), or nearby-concept phrase (defined as the equivalent words or concepts nearly adjacent one another in any order but with N=one or more other words interspersed (a user-specified value for the number of other words that may be within a group of words containing the equivalent words or concepts specified for the given scope concept)), where the other claims are displayed with the identified scope concept phrase being highlighted.

In some embodiments, the text for a claim is displayed for the user, and the system elicits and receives user input (e.g., in some embodiments, by the user dragging a mouse pointer across a series of two or more words) to specify a user-identified scope concept. The software system then scans the rest of that claim and the other claims of one or more patents or patent applications to identify and display the other claims having those words in a sequential word-series phrase, contiguous-word phrase, nearby-word phrase, sequential-concept-series phrase, contiguous-concept phrase, or nearby-concept phrase. In some embodiments, the claims are displayed with the identified scope concept phrase being highlighted.

In some embodiments of the present disclosure, user input is elicited and received, where the user input includes a hypothetical set of claims directed toward a target product or technology and based on examination of the product or technology, and the automatically generated scope-concept phrases of a set of claims for a patent or patent application. A plurality (e.g., in some embodiments, all) of the scope concepts that are in the user-generated set of hypothetical claims are identified and displayed to the user. In some embodiments, both the hypothetical claims directed to the product or technology, and the claims of one or more selected patents or patent applications are shown, along with a list of scope concepts found in both. In some such embodiments, the user can select (e.g., by mouse click or other suitable means) one or more scope concepts, and those scope concepts are highlighted in each of the hypothetical claims, and/or patent or patent application claims.

With reference to FIG. 16, in some embodiments, a scope concept builder is provided, which in various example embodiments is automated. The purpose of this feature is to help users (mappers) to find common claim scope concepts to map to multiple claims.

In an example embodiment, a user may want to find scope concepts they can map to more than one claim. In order to do this, the user needs to figure out which concepts are common between different claims. For example, in the example claims 1 and 10 (for now, all in one patent) shown in FIG. 16, a user needs to read these claims to determine, for example, that both claims have the scope concept (limitation) "sending the plurality of links through the limited communication interface". In order to verify that the limitation is present in both claims in the way the user was intending to read them, the user may, and often will, do a keyword search on the claims to see that all the keywords are present. This is shown by the highlighted keywords in FIG. 17, for example. The highlighted keywords are shown in block outlines in this view, but other methods of highlighting are possible (yellow shading, for example). It will be seen that both claims 1 and 10 have these keywords, and they are in the same location. This gives the user assurance that the scope concept maps to (i.e., is present in) both claims.

In some embodiments, a "scope concept builder" mapping tool is provided that will help the mapper with the task of identifying scope concepts shared by claims. In using such a tool, a user picks for example one patent to work on by using a Paperclip function, for example. In other embodiments, a user may pick several patents to work on and may want to work across any claim displayed in an "Omnimap" feature of the mapping system. The Omnimap feature allows the display of a selection of claims in a grouped set to allow simultaneous mapping of one or more claims across the grouped set. The grouped set may extend across one or more patents. In the illustrative example described here, the user starts with just one patent at a time.

In proceeding, a user highlights a phrase in a claim, for example in claim 1 as shown in FIG. 18 attached. In this example, the selected and highlighted phase is again "sending the plurality of links through the limited communication interface". The scope concept builder tool automatically generates list of keywords from the phrase, and displays the phrase with generated keywords as a "Draft Scope Concept" as shown for example in FIG. 19. In an example embodiment, the builder tool will also show the smallest block of text that contains all the keywords in all the claims of the patent. This is shown, for example, in claim 10 in FIG. 20. In an example embodiment, if not all the keywords are found in a claim, then the tool will show the smallest block of text that contains all the keywords actually found in the claim. In some embodiments, the tool highlights or contrasts these fewer keywords with a different color than if all the keywords are found.

The Draft Scope Concept can be identified or displayed as follows: "sending the plurality of links through the limited communication interface". The mapping tool shows that these keywords are found in the claim that the phrase was taken from, and also shows what other claims the keywords were found in. The user can then edit to stem keywords, or to change the keywords in any way, for example they might stem "limited" to "limit" or edit "communication" to "communication interface". Or, a user can add a keyword to the list, or delete a keyword from list. Keywords may be one or multiple words.

In some embodiments, the user hits a "refresh" button and the tool recalculates the matching keyword columns and blocks of claim text containing the keywords. In some embodiments, the user can also edit the Draft Scope Concept and refresh, to see what keywords (or stemmed keywords) now appear in the list. In some embodiments, the user can then map the Draft Scope Concept to claims that contain all the keywords. In some embodiments, if a user wants to map the Draft Scope Concept to a claim that does not contain all the keywords, the user will be warned for example: "Are you sure? Claim X does not contain all the keywords in the Draft Scope Concept."

The example format for mapping the Draft Scope Concept facilitates mapping as only claims with all matching keywords are highlighted, but optionally a user can pick other claims and be warned if the user tries to map a claim when not all keywords are found. Selection by a user of claims to be mapped to the Draft Scope Concept is shown for example by the checked boxes 2100 in FIG. 21 attached.

Figure 22:
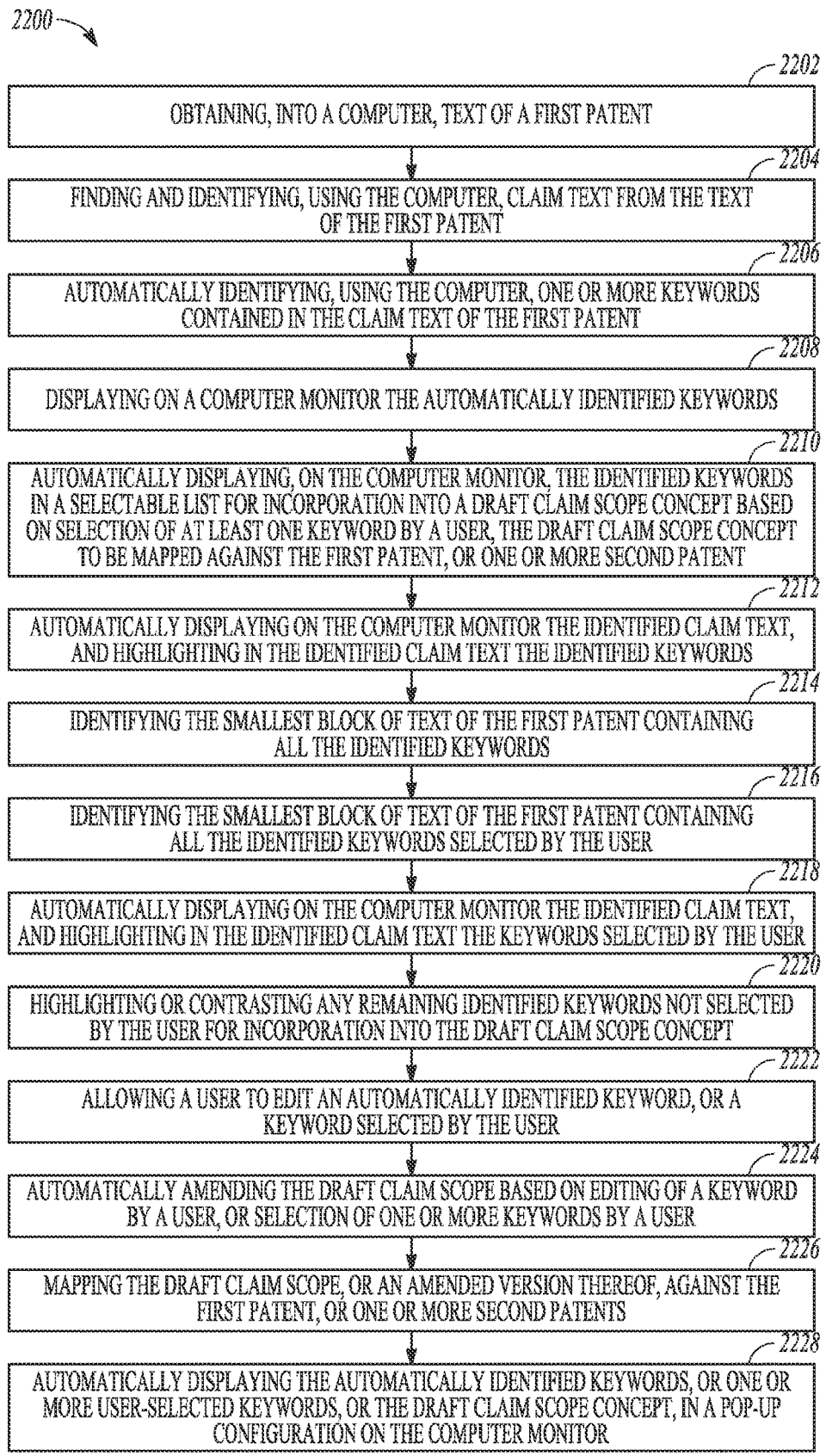
FIG. 22 is a flow chart of a method according to example embodiments.

The present disclosure also provides methods of mapping. One such embodiment is show in FIG. 22. In that FIG., a computer-implemented method 2200 comprises: at 2202, obtaining, into a computer, text of a first patent; at 2204, finding and identifying, using the computer, claim text from the text of the first patent; at 2206, automatically identifying, using the computer, one or more keywords contained in the claim text of the first patent; and at 2208, displaying on a computer monitor the automatically identified keywords.

The method 2200 may also comprise at 2210, automatically displaying, on the computer monitor, the identified keywords in a selectable list for incorporation into a draft claim scope concept based on selection of at least one keyword by a user, the draft claim scope concept to be mapped against the first patent, or one or more second patents.

In some embodiments, at 2212, the method 2200 may further comprise automatically displaying on the computer monitor the identified claim text, and highlighting in the identified claim text the identified keywords. At 2214, the method may further comprise identifying the smallest block of text of the first patent containing all the identified keywords.

In some embodiments, the method 2200 may further comprise at 2216 identifying the smallest block of text of the first patent containing all the identified keywords selected by the user. Still further, the method may comprise at 2218 automatically displaying on the computer monitor the identified claim text, and highlighting in the identified claim text the keywords selected by the user.

In some embodiments, the method may further comprise, at 2220 highlighting or contrasting any remaining identified keywords not selected by the user for incorporation into the draft claim scope concept. The method may further comprise at 2222 allowing a user to edit an automatically identified keyword, or a keyword selected by the user. In some embodiments, the method 2200 further comprises at 2224 automatically amending the draft claim scope based on editing of a keyword by a user, or selection of one or more keywords by a user. At 2226, the method may further comprise mapping the draft claim scope, or an amended version thereof, against the first patent, or one or more second patents. In some embodiments, the method further comprises at 2228 automatically displaying the automatically identified keywords, or one or more user-selected keywords, or the draft claim scope concept, in a pop-up configuration on the computer monitor.

The scope concept builder tool may in some embodiments thus assist, or at least partially automate, mapping for a user. In an example embodiment, the mapping tool is implemented in a "pop-up" configuration, such that keywords, claims or Draft Scope Concepts "pop-up" automatically for consideration and further selection, editing or mapping by a user. In some embodiments, the present disclosure is used as an aid for a patent practitioner to help in drafting a patent application, in order to improve the set of claims to be submitted in a patent application. In some embodiments, the present disclosure is used as an aid for a patent litigator to help in comparing a patent to a product or method, in order to improve the proof of infringement or lack thereof. In some embodiments, the present disclosure is used as an aid for a commercial company to help in patent clearance of a product or method relative to one or more adversely held patents, in order to avoid patent-infringement liability.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the disclosure should be, therefore, determined with reference to the appended claims, along with the full scope of equivalents to which. such. claims are entitled. In the appended claims, the terms "including" and "in which" are used as the plain-English equivalents of the respective terms "comprising" and "wherein," respectively. Moreover, the terms "first," " "second," and "third," etc., are used merely as labels, and are not intended to impose numerical requirements on their objects.

What is claimed is:
1. A method comprising:
receiving a textual representation of a set of patent claims;

processing word-by-word through each claim of the set of patent claims to identify sequences of words as a scope-concept phrase;

adding each scope-concept phrase to a set of scope-concept phrases;

identifying synonymous words from a thesaurus for words from each scope-concept phrase of the set of scope-concept phrases;

generating additional scope-concept phrases using the identified synonymous words;

adding the additional scope-concept phrases to the set of scope-concept phrases;

receiving product description text, wherein the product description text describes a product;

automatically classifying a first subset of the product description text as trivial text and classifying a second remaining subset of the product description text as non-trivial text;

identifying occurrences of each scope-concept phrase from the set of scope-concept phrases in the non-trivial text;

determining an amount of the non-trivial text covered by each scope concept-phrase of the set of scope-concept phrases based on the occurrences; and displaying a graphical representation of the amount of the non-trivial text covered by each scope-concept phrase of the set of scope-concept phrases.

2. The method of claim 1, wherein identifying the occurrences includes stripping prefixes and suffixes from the words of each scope-concept phrase of the set of scope-concept phrases to identify similar base words in the non-trivial text.

3. The method of claim 1, further comprising:
displaying, in a graphical user interface, the synonymous words;
receiving a user selection of the synonymous words, via the graphical user interface; and
providing the user selection of the synonymous words as the identified synonymous words.

4. The method of claim 1, further comprising:
determining a measure of quality for each scope-concept phrase of the set of scope-concept phrases; and
displaying with the graphical representation the measure of quality for the occurrences of each scope-concept phrase from the set of scope-concept phrases in the non-trivial text.

5. The method of claim 2, wherein the measure of quality is based on at least one of length of a respective scope-concept phrase or number of patent claims from the set of patent claims including the respective scope-concept phrase.

6. The method of claim 1, wherein identifying occurrences of each scope-concept phrase from the set of scope-concept phrases in the non-trivial text includes identifying non-sequential occurrences of the words of each scope-concept phrase from the set of scope-concept phrases.

7. The method of claim 1, further comprising:
displaying, in a graphical user interface, the set of scope-concept phrases;
receiving a user selection of scope-concept phrases, via the graphical user interface; and
providing the user selection of the scope-concept phrases as the set of scope-concept phrases.

8. A system for identifying scope-concept phrases comprising:
at least one processor; and
memory including instructions that, when executed by the at least one processor, cause the at least one processor to:
receive a textual representation of a set of patent claims;
process word-by-word through each claim of the set of patent claims to identify sequences of words as a scope-concept phrase;
add each scope-concept phrase to a set of scope-concept phrases;
identify synonymous words from a thesaurus for words from each scope-concept phrase of the set of scope-concept phrases;
generate additional scope-concept phrases using the identified synonymous words;
add the additional scope-concept phrases to the set of scope-concept phrases;
receive product description text, wherein the product description text describes a product;
automatically classify a first subset of the product description text as trivial text and classifying a second remaining subset of the product description text as non-trivial text;
identify occurrences of each scope-concept phrase from the set of scope-concept phrases in the non-trivial text;
determine an amount of the non-trivial text covered by each scope concept-phrase of the set of scope-concept phrases based on the occurrences; and
display a graphical representation of the amount of the non-trivial text covered by each scope-concept phrase of the set of scope-concept phrases.

9. The system of claim 8, wherein identifying the occurrences includes stripping prefixes and suffixes from the words of each scope-concept phrase of the set of scope-concept phrases to identify similar base words in the non-trivial text.

10. The system of claim 8, further comprising instructions to:
display, in a graphical user interface, the synonymous words;
receive a user selection of the synonymous words, via the graphical user interface; and
provide the user selection of the synonymous words as the identified synonymous words.

11. The system of claim 8, further comprising instructions to:
determine a measure of quality for each scope-concept phrase of the set of scope-concept phrases; and
display with the graphical representation the measure of quality for the occurrences of each scope-concept phrase from the set of scope-concept phrases in the non-trivial text.

12. The system of claim 11, wherein the measure of quality is based on at least one of length of a respective scope-concept phrase or number of patent claims from the set of patent claims including the respective scope-concept phrase.

13. The system of claim 8, wherein identifying occurrences of each scope-concept phrase from the set of scope-concept phrases in the non-trivial text includes identifying non-sequential occurrences of the words of each scope-concept phrase from the set of scope-concept phrases.

14. The system of claim 8, further comprising instructions to:
display, in a graphical user interface, the set of scope-concept phrases;
receive a user selection of scope-concept phrases, via the graphical user interface; and provide the user selection of the scope-concept phrases as the set of scope-concept phrases.

15. At least one computer readable medium including instructions for identifying scope-concept phrases that when executed by at least one processor, cause the at least one processor to:
   receive a textual representation of a set of patent claims;
   process word-by-word through each claim of the set of patent claims to identify sequences of words as a scope-concept phrase;
   add each scope-concept phrase to a set of scope-concept phrases;
   identify synonymous words from a thesaurus for words from each scope-concept phrase of the set of scope-concept phrases;
   generate additional scope-concept phrases using the identified synonymous words;
   add the additional scope-concept phrases to the set of scope-concept phrases;
   receive product description text, wherein the product description text describes a product;
   automatically classify a first subset of the product description text as trivial text and classifying a second remaining subset of the product description text as non-trivial text;
   identify occurrences of each scope-concept phrase from the set of scope-concept phrases in the non-trivial text;
   determine an amount of the non-trivial text covered by each scope concept-phrase of the set of scope-concept phrases based on the occurrences; and
   display a graphical representation of the amount of the non-trivial text covered by each scope-concept phrase of the set of scope-concept phrases.

16. The at least one computer readable medium of claim 15, wherein identifying the occurrences includes stripping prefixes and suffixes from the words of each scope-concept phrase of the set of scope-concept phrases to identify similar base words in the non-trivial text.

17. The at least one computer readable medium of claim 15, further comprising instructions to:
   display, in a graphical user interface, the synonymous words;
   receive a user selection of the synonymous words, via the graphical user interface; and
   provide the user selection of the synonymous words as the identified synonymous words.

18. The at least one computer readable medium of claim 15, further comprising instructions to:
   determine a measure of quality for each scope-concept phrase of the set of scope-concept phrases; and
   display with the graphical representation the measure of quality for the occurrences of each scope-concept phrase from the set of scope-concept phrases in the non-trivial text.

19. The at least one computer readable medium of claim 18, wherein the measure of quality is based on at least one of length of a respective scope-concept phrase or number of patent claims from the set of patent claims including the respective scope-concept phrase.

20. The at least one computer readable medium of claim 15, wherein identifying occurrences of each scope-concept phrase from the set of scope-concept phrases in the non-trivial text includes identifying non-sequential occurrences of the words of each scope-concept phrase from the set of scope-concept phrases.

* * * * *